US011765336B2

(12) United States Patent
Hayasaka et al.

(10) Patent No.: US 11,765,336 B2
(45) Date of Patent: Sep. 19, 2023

(54) IMAGE-CAPTURING APPARATUS, INFORMATION PROCESSING METHOD, AND PROGRAM

(71) Applicant: Sony Group Corporation, Tokyo (JP)

(72) Inventors: Kengo Hayasaka, Kanagawa (JP); Katsuhisa Ito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 81 days.

(21) Appl. No.: 17/434,920

(22) PCT Filed: Dec. 20, 2019

(86) PCT No.: PCT/JP2019/050029
§ 371 (c)(1),
(2) Date: Aug. 30, 2021

(87) PCT Pub. No.: WO2020/188929
PCT Pub. Date: Sep. 24, 2020

(65) Prior Publication Data
US 2022/0132096 A1 Apr. 28, 2022

Related U.S. Application Data

(60) Provisional application No. 62/819,759, filed on Mar. 18, 2019.

(51) Int. Cl.
*H04N 13/282* (2018.01)
*H04N 13/172* (2018.01)
(Continued)

(52) U.S. Cl.
CPC ......... *H04N 13/282* (2018.05); *H04N 5/2628* (2013.01); *H04N 13/156* (2018.05); *H04N 13/172* (2018.05)

(58) Field of Classification Search
USPC .......................................... 348/49
See application file for complete search history.

(56) References Cited

U.S. PATENT DOCUMENTS

2002/0071616 A1\* 6/2002 Yoshida ............... H04N 19/597
   348/E13.072
2003/0234907 A1   12/2003 Kawai
(Continued)

FOREIGN PATENT DOCUMENTS

JP   2008118495 A  \*  5/2008 ............. H04N 5/232
JP   2011124965 A     6/2011
(Continued)

OTHER PUBLICATIONS

Dari Kuhn, "Image Processing Based on Light Source Position ED", ip.com, ip.com Inc., West Henrietta, NY, US, Sep. 23, 2014 (Sep. 23, 2014), XP013164915, ISSN: 1533-0001.
(Continued)

*Primary Examiner* — Behrooz M Senfi
(74) *Attorney, Agent, or Firm* — Michael Best & Friedrich LLP

(57) ABSTRACT

Viewpoint-related information is associated with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image. The present disclosure is applicable to, for example, image-
(Continued)

capturing apparatus, electronic devices, interchangeable lenses or camera systems in which a plurality of monocular lenses is extended, information processing methods, programs, or the like.

21 Claims, 23 Drawing Sheets

(51) Int. Cl.
  *H04N 13/156* (2018.01)
  *H04N 5/262* (2006.01)

(56) References Cited

U.S. PATENT DOCUMENTS

| | | | |
|---|---|---|---|
| 2010/0111489 A1 | 5/2010 | Presler | |
| 2012/0229628 A1* | 9/2012 | Ishiyama | H04N 13/239 348/135 |
| 2012/0235990 A1* | 9/2012 | Yamaji | H04N 13/225 345/419 |
| 2012/0301044 A1* | 11/2012 | Nakada | H04N 23/80 382/255 |
| 2013/0329068 A1 | 12/2013 | Hamanaka | |
| 2014/0232830 A1 | 8/2014 | Ichige | |
| 2015/0055010 A1 | 2/2015 | Eguchi | |
| 2015/0146014 A1 | 5/2015 | Black et al. | |
| 2015/0229815 A1 | 8/2015 | Nonaka et al. | |
| 2017/0124689 A1 | 5/2017 | Doba et al. | |
| 2019/0014244 A1 | 1/2019 | Naruse et al. | |

FOREIGN PATENT DOCUMENTS

| | | | | |
|---|---|---|---|---|
| JP | 2011247965 A | * | 12/2011 | ............ G03B 17/14 |
| JP | 2013009274 A | | 1/2013 | |
| JP | 2014014071 A | | 1/2014 | |
| JP | 2017112526 A | | 6/2017 | |
| WO | 2015/037473 A1 | | 3/2015 | |
| WO | WO-2015037473 A1 | * | 3/2015 | ........... H04N 13/161 |
| WO | 2019/078032 A1 | | 4/2019 | |

OTHER PUBLICATIONS

Extended European Search Report dated Mar. 4, 2022 for corresponding European Application No. 19920192.2.
International Search Report (PCT/ISA/210), International Application No. PCT/JP2019/050029, dated Feb. 13, 2020.
Notification of Transmittal of the International Search Report and the Written Opinion of the International Searching Authority, or the Declaration (PCT/ISA/220), international Application No. PCT/JP2019/050029, dated Feb. 25, 2020.
Written Opinion of the International Search Authority (PCT/ISA/237), International Application No. PCT/JP2019/050029, dated Feb. 25, 2020.
Bennett Wilburn, et al., "High Performance Imaging Using Large Camera Arrays", ACM Trans. Graph. 24(3), 765-776, 2005.

* cited by examiner

IMAGE-CAPTURING APPARATUS, INFORMATION PROCESSING METHOD, AND PROGRAM

TECHNICAL FIELD

The present disclosure relates to image-capturing apparatuses, information processing methods, and programs. More particularly, it relates to an image-capturing apparatus, an information processing method, and a program, capable of performing image processing using a viewpoint image.

BACKGROUND ART

Various studies have been conducted on image processing technology that performs refocusing or performs focusing like an optical lens from multiple parallax images in the related art. In one example, refocusing using an array of 100 cameras is considered (see, e.g., Non-Patent Document 1).

CITATION LIST

Non-Patent Document

Non-Patent Document 1: Bennett Wilburn, Neel Joshi, Vaibhav Vaish, Eino-Ville Talvala, Emilio Antunez, Adam Barth, Andrew Adams, Mark Horowitz, Marc Levoy, "High Performance Imaging Using Large Camera Arrays", ACM Trans. Graph. 24(3), 765-776, 2005

SUMMARY OF THE INVENTION

Problems to be Solved by the Invention

However, Non-Patent Document 1 does not teach the configuration for performing image processing, such as refocusing, with an image-capturing apparatus that has performed image capturing, other apparatuses, or the like.

The present disclosure is given in view of such a situation and is intended to enable image processing using a viewpoint image.

Solutions to Problems

An image-capturing apparatus according to an aspect of the present technology is an image-capturing apparatus including an association unit configured to associate viewpoint-related information with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

An information processing method according to an aspect of the present technology is an information processing method including associating viewpoint-related information with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

A program according to an aspect of the present technology is a program causing a computer to function as an association unit configured to associate viewpoint-related information with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

In an image-capturing apparatus, an information processing method, and a program according to an aspect of the present technology, viewpoint-related information is associated with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

MODE FOR CARRYING OUT THE INVENTION

Embodiments for carrying out the present disclosure (hereinafter referred to as an embodiment) are now described. Moreover, the description is given in the following order.

1. First embodiment (Camera)
2. Second embodiment (Use of spotlight)
3. Third embodiment (Image processing apparatus)
4. Fourth embodiment (Camera system)
5. Additional remark 1. First Embodiment <Appearance of Camera>

Figure 1:
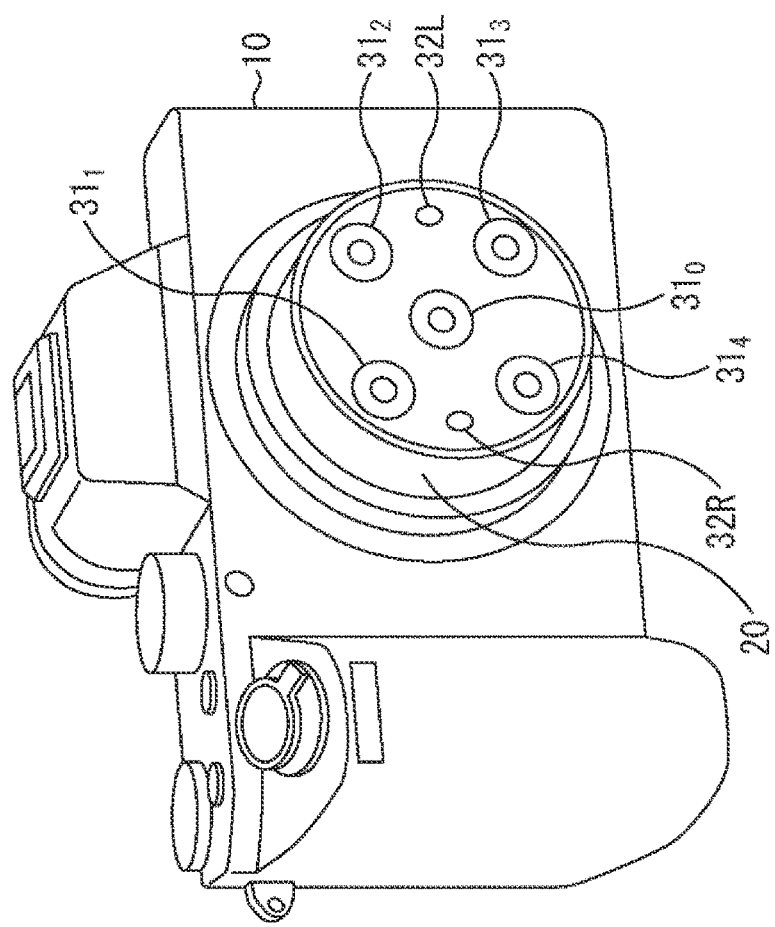
FIG. 1 is a perspective view illustrating an exemplary configuration of an embodiment of a camera to which the present technology is applied.

FIG. 1 is a perspective view illustrating an exemplary configuration of an embodiment of a camera to which the present technology is applied.

A camera 10 having a built-in image sensor receives light rays focused by a lens and performs photoelectric conversion to capture a subject's image. An image obtained by such image capturing is also hereinafter referred to as a captured image.

The camera 10 has five monocular optical systems $31_0$, $31_1$, $31_2$, $31_3$, and $31_4$ as plural components on the front side (a light-receiving surface) of the image sensor. In the case where the monocular optical systems $31_0$ to $31_4$ are unnecessary to be distinguished from each other in the description, all or each of which is now referred to as the monocular optical system 31 (or the monocular optical system $31_1$).

The plurality of monocular optical systems 31 has the optical paths of light passing individually through the monocular optical systems independent of each other. In other words, different positions on a light-receiving surface (e.g., an effective pixel region) of the image sensor are irradiated with the light passing through the corresponding monocular optical system 31, without being incident on the other monocular optical system 31. Optical axes of the monocular optical system 31 are located at least at different positions on the light-receiving surface of the image sensor, and different positions on the light-receiving surface of the image sensor are irradiated with at least a part of the light rays passing through each monocular optical system 31.

Thus, in the captured image generated by the image sensor (the entire image output by the image sensor), the subject's images formed through the respective monocular optical systems 31 are formed at different positions. Specifically, from the captured image, a captured image in which each monocular optical system 31 is used as a viewpoint (also referred to as a viewpoint image) is obtained. In other words, the camera 10 is capable of obtaining a plurality of viewpoint images by capturing a subject's image. The plurality of viewpoint images is capable of being used, for example, for the generation of depth information or processing such as refocusing using the depth information.

Moreover, an example in which the camera 10 has five monocular optical systems 31 is now described, but the number of the monocular optical systems 31 is optional as long as it is two or more.

The five monocular optical systems 31 are provided on a two-dimensional plane orthogonal to the optical axis of a lens barrel (parallel to the light-receiving surface (image-capturing surface) of the image sensor). These optical systems are arranged in such a way that the monocular optical system $31_0$ is located at the center (center of gravity) and the other four monocular optical systems $31_1$ to $31_4$ form rectangular vertices. Of course, the arrangement illustrated in FIG. 1 is merely illustrative, and the positional relationship between the monocular optical systems 31 is optional as long as the optical paths are independent of each other.

Further, for the camera 10, the surface on the side where the light from a subject is incident is defined as the front face.

<Exemplary Electrical Configuration of Camera>

Figure 2:
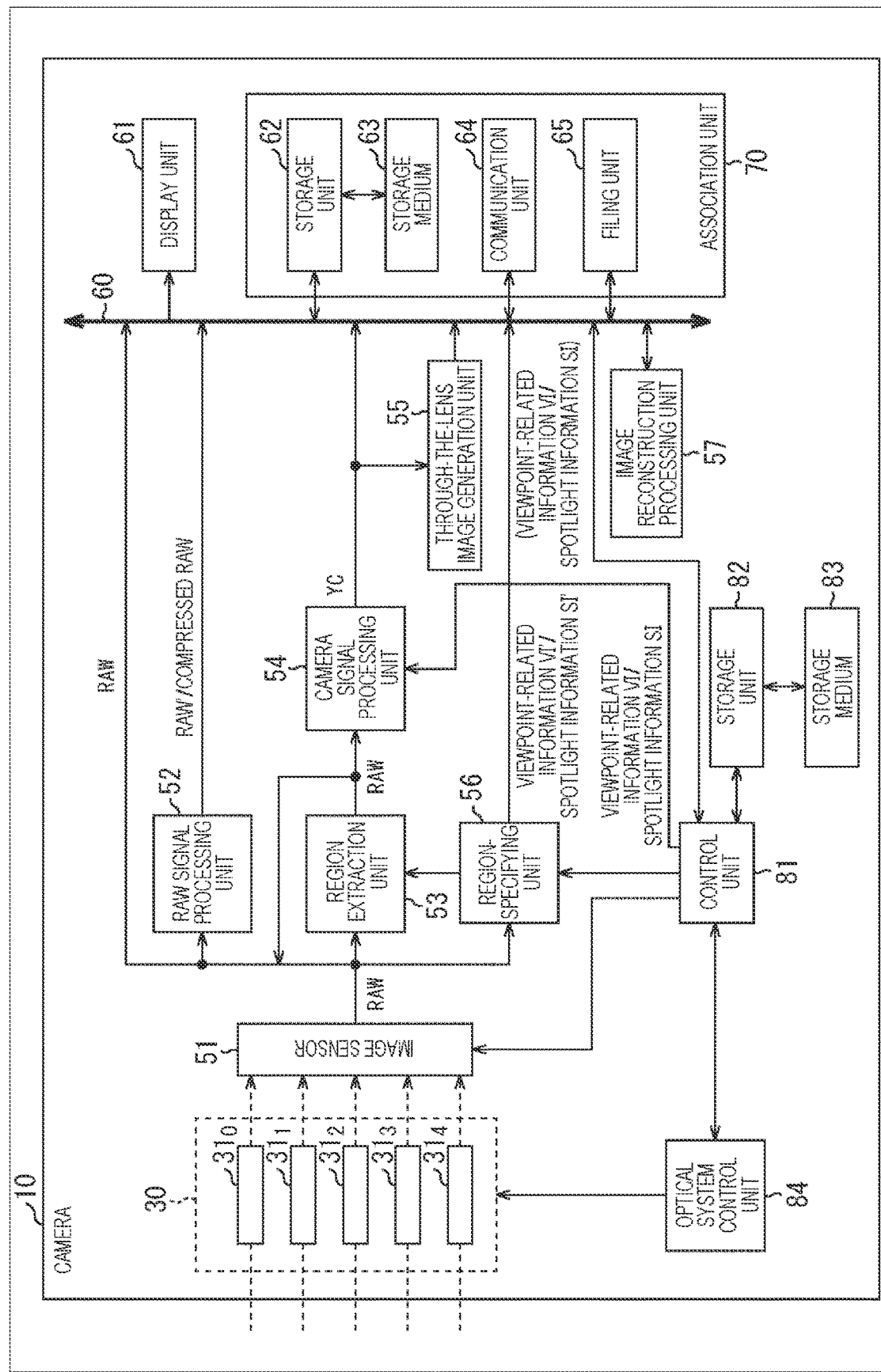
FIG. 2 is a block diagram illustrating an exemplary electrical configuration of a camera.

FIG. 2 is a block diagram illustrating an exemplary electrical configuration of a camera 10 in FIG. 1. The camera 10 includes a multi-ocular optical system 30, an image sensor 51, a RAW signal processing unit 52, a region extraction unit 53, a camera signal processing unit 54, a through-the-lens image generation unit 55, a region-specifying unit 56, an image reconstruction processing unit 57, a bus 60, a display unit 61, a storage unit 62, a communication unit 64, a filing unit 65, a control unit 81, a storage unit 82, and an optical system control unit 84.

<Multi-Ocular Optical System>

The multi-ocular optical system 30 includes the monocular optical system 31 mentioned above (e.g., the monocular optical system $31_0$ to $31_4$). Each monocular optical system 31 of the multi-ocular optical system 30 collects light rays from a subject on the image sensor 51 of the camera 10. Specifications such as the focal length or F-stop of each monocular optical system 31 are optional and are not necessarily identical to each other, but herein, they are assumed to be identical.

The monocular optical system 31 has optical system components such as a plurality of lenses and a diaphragm. The plurality of lenses is arranged in the optical axis direction of the optical axis of a lens barrel, and the diaphragm is a mechanism for adjusting the amount of light (F-stop) incident on the image sensor 51 through the plurality of lenses by controlling the degree of opening of a shield. Moreover, the monocular optical system 31 can have the ability to control the position of the lens to control zoom magnification.

<Image Sensor>

The image sensor 51 is, for example, a complementary metal-oxide-semiconductor (CMOS) image sensor that captures a subject and generates a captured image. The light-receiving surface of the image sensor 51 is irradiated with light rays collected by each of the monocular optical systems $31_0$ to $31_4$. The image corresponding to the region receiving the irradiation light illuminated to the image sensor 51 through one monocular optical system 31 in the captured image is also referred to as a monocular image. In other words, the image sensor 51 receives the light rays (irradiation light) and performs photoelectric conversion to generate a captured image including a monocular image obtained by using each monocular optical system 31 as a viewpoint. Moreover, the monocular image has a portion that is not effective as an image around it. In addition, a captured image including all monocular images (i.e., the entire captured image generated by the image sensor 51 or an image in which the entirety or a part of regions outside all the monocular images included in the captured image is deleted from the captured image) is also referred to as an entire image.

Moreover, the image sensor 51 can be a single-color (so-called monochrome) image sensor or a color image sensor in which, for example, a Bayer array color filter is arranged in a pixel group. In other words, the captured image output by the image sensor 51 can be a monochrome image or a color image. The description below is given of the image sensor 51, which is the color image sensor that generates and outputs a captured image in RAW format.

Moreover, in the present embodiment, the assumption is made that the RAW format image means an image in which the positional relationship of the arrangement of color filters of the image sensor 51 is maintained. Besides, the assumption is made that the RAW format image includes an image subjected to signal processing or compression coding, such as image size conversion processing on an image output from the image sensor 51, noise reduction processing, or defect correction processing by the image sensor 51. In addition, the assumption is made that the captured RAW format image does not include a monochrome image.

The image sensor 51 is capable of outputting the captured RAW format image (entire image) generated by performing photoelectric conversion on the irradiation light. In one example, the image sensor 51 is capable of supplying at least one of the bus 60, the RAW signal processing unit 52, the region extraction unit 53, or the region-specifying unit 56 with the captured RAW format image (entire image).

In one example, the image sensor 51 is capable of supplying the storage unit 62 via the bus 60 with the captured RAW format image (entire image), causing it to be stored in a storage medium 63. In addition, the image sensor 51 is capable of supplying the communication unit 64 via the bus 60 with the captured RAW format image (entire image), causing it to be transmitted to the outside of the camera 10. Furthermore, the image sensor 51 is capable of supplying the filing unit 65 via the bus 60 with the captured RAW format image (entire image), causing it to be filed. In addition, the image sensor 51 is capable of supplying the image reconstruction processing unit 57 via the bus 60 with the captured RAW format image (entire image), causing it to be subjected to the image reconstruction processing.

Moreover, the image sensor 51 can be a single-imager image sensor or can be a set of image sensors (also referred to as a multi-imager image sensor) having a plurality of image sensors such as a three-imager image sensor.

Figure 3:
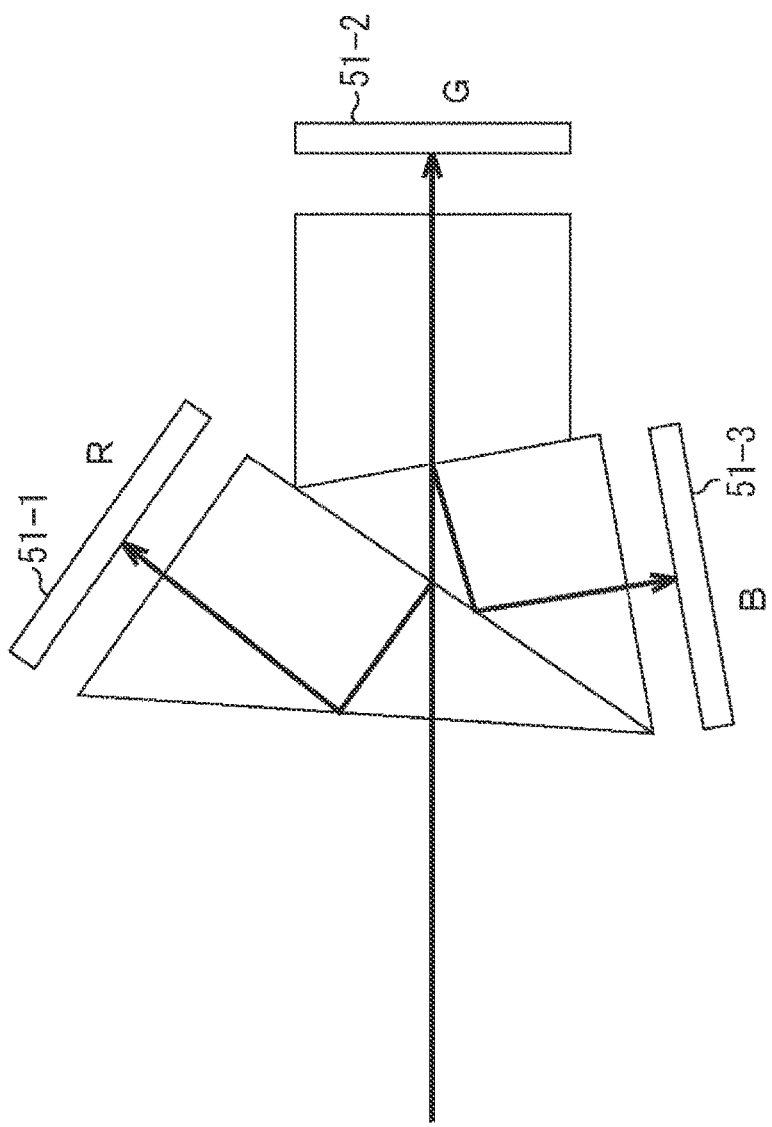
FIG. 3 is a diagram illustrating an example of a three-imager image sensor.

In one example, one type of three-imager image sensor is one having three image sensors (image sensors 51-1 to 51-3) for each of red, green, and blue (RGB) as illustrated in FIG. 3. In this case, the light rays from a subject are separated for each wavelength range by using an optical system (an optical path separation unit) such as a prism and are incident on each image sensor. Each of the image sensors 51-1 to 51-3 performs photoelectric conversion on the incident light. In other words, the image sensors 51-1 to 51-3 perform photoelectric conversion on the light with different wavelength ranges at substantially the same timing. Thus, in the case of a multi-imager image sensor, each image sensor obtains images captured at substantially the same time and at substantially the same angle of view (i.e., images having substantially the same pattern only in different wavelength ranges). Thus, the position and size of a viewpoint image region (described later) in the captured images obtained by each image sensor are substantially identical to each other. In this case, the combination of R, G, and B images can be regarded as the captured RAW format image.

Moreover, in the case of the multi-imager image sensor, each image sensor is not limited to an image sensor for each RGB, and they can be all monochrome or can be all provided with a color filter such as a Bayer array. Moreover, in the case where they are all color filters such as Bayer array, by causing all the arrays to be identical and the positional relationship between the pixels to be matched, it is possible to perform, for example, noise reduction. In addition, shifting the positional relationship of each RGB image sensor makes it also possible to improve image quality using the effect obtained by what is called spatial pixel shift.

Even in the case of such a multi-imager image-capturing apparatus, a plurality of monocular images or a plurality of viewpoint images is included in the captured image output from each image sensor, that is, one image sensor.

<RAW Signal Processing Unit>

The RAW signal processing unit 52 performs processing relating to the signal processing on the RAW format image. In one example, the RAW signal processing unit 52 is capable of acquiring a captured RAW format image (entire image) supplied from the image sensor 51. In addition, the RAW signal processing unit 52 is capable of performing predetermined signal processing on the acquired captured image. It is optional as to what signal processing is performed. In one example, it can be defect correction, noise reduction, compression (encoding), or the like, or it can be other signal processing tasks than the above. Of course, the RAW signal processing unit 52 is also capable of performing a plurality of signal processing tasks on the captured image. Moreover, various signal processing tasks on the RAW format image are limited to an image in which the signal-processed image is in a state where the positional relationship of the arrangement of color filters of the image sensor 51 is maintained as described above (for the multi-imager image-capturing apparatus, R, G, and B images remain as they are).

The RAW signal processing unit 52 is capable of supplying the storage unit 62 via the bus 60 with a captured RAW format image subjected to the signal processing (RAW') or a compressed (encoded) captured image (compressed RAW), causing it to be stored in the storage medium 63. In addition, the RAW signal processing unit 52 is capable of supplying the communication unit 64 via the bus 60 with the captured RAW format image subjected to the signal processing (RAW') or the compressed (encoded) captured image (compressed RAW), causing it to be transmitted. Furthermore, the RAW signal processing unit 52 is capable of supplying the filing unit 65 via the bus 60 with the captured RAW format image subjected to the signal processing (RAW') or the compressed (encoded) captured image (compressed RAW), causing it to be filed. In addition, the RAW signal processing unit 52 is capable of supplying the image reconstruction processing unit 57 via the bus 60 with the captured RAW format image subjected to the signal processing (RAW') or the compressed (encoded) captured image (compressed RAW), causing it to be subjected to the image reconstruction processing. Moreover, in the case where it is unnecessary to distinguish between RAW, RAW', and compressed RAW (they are all illustrated in FIG. 2), they are referred to as a RAW image.

<Region Extraction Unit>

The region extraction unit 53 performs processing relating to the extraction of a part of the region (cutting out a partial image) from the captured RAW format image. In one example, the region extraction unit 53 is capable of acquiring the captured RAW format image (entire image) supplied from the image sensor 51. In addition, the region extraction unit 53 is capable of acquiring information (also referred to as extraction region information) indicating a region to be extracted from the captured image, which is supplied from the region-specifying unit 56. Then, the region extraction unit 53 is capable of extracting a part of the region (cutting out a partial image) from the captured image on the basis of the extraction region information.

In one example, the region extraction unit 53 is capable of cutting out an image using each monocular optical system 31 as a viewpoint from the captured image (entire image). In other words, the region extraction unit 53 is capable of cutting out an effective portion from the region of each monocular image included in the captured image as an image obtained using each monocular optical system 31 as a viewpoint. The image of the effective cutout portion (a part of the monocular image) is also referred to as a viewpoint image. In addition, the region to be cut out (the region corresponding to the viewpoint image) in the captured image is also referred to as a viewpoint image region. In one example, the region extraction unit 53 is capable of acquiring viewpoint-related information used for specifying the viewpoint image region, which is supplied from the region-specifying unit 56 as the extraction region information. The region extraction unit 53 is capable of extracting each viewpoint image region (cutting out each viewpoint image) indicated in the viewpoint-related information from the captured image. Then, the region extraction unit 53 is capable of supplying the camera signal processing unit 54 with each cutout viewpoint image (RAW format).

Further, in one example, the region extraction unit 53 is capable of synthesizing viewpoint images that are cut out from the captured image (entire image) to generate a synthesized image. The synthesized image is one in which the viewpoint images are synthesized into one piece of data or one image. In one example, the region extraction unit 53 is capable of generating one image (synthesized image) in which the viewpoint images are arranged in a plane. The region extraction unit 53 is capable of supplying the camera signal processing unit 54 with the generated synthesized image (RAW format).

Further, in one example, the region extraction unit 53 is capable of supplying the camera signal processing unit 54 with the entire image. In one example, the region extraction unit 53 is capable of extracting a part of the region including all the monocular images from the acquired captured image (i.e., cutting out the partial image including all the monocular images). The region extraction unit 53 is capable of supplying camera signal processing unit 54 with the partial cutout image (i.e., an image in which the entirety or a part of the regions outside all the monocular images included in the captured image are deleted) as the entire image in RAW format. The location (range) of the region to be extracted in this case can be predetermined in the region extraction unit 53 or can be specified by the viewpoint-related information supplied from the region-specifying unit 56.

Further, the region extraction unit 53 is capable of supplying the camera signal processing unit 54 with the acquired captured image (i.e., the entire captured image, not the partial image including all the cutout monocular images) as the entire image in RAW format.

Moreover, the region extraction unit 53 is capable of supplying the storage unit 62, the communication unit 64, the filing unit 65, the image reconstruction processing unit 57, or the like via the bus 60 with the partial image in RAW format. This partial image in RAW format (entire image, viewpoint image, or synthesized image) is an image cut out from the captured image as described above, similarly to the case of the image sensor 51.

Further, the region extraction unit 53 is capable of supplying the RAW signal processing unit 52 with the partial image in RAW format (entire image, viewpoint image, or synthesized image), causing it to be subjected to the predetermined signal processing or compressed (encoded). Also in this case, the RAW signal processing unit 52 is capable of supplying the storage unit 62, the communication unit 64, the filing unit 65, the image reconstruction processing unit 57, or the like via the bus 60 with the captured RAW format image subjected to the signal processing (RAW') or the compressed (encoded) captured image (compressed RAW).

In other words, at least one of the captured image (or entire image), the viewpoint image, or the synthesized image can be a RAW image.

<Camera Signal Processing Unit>

The camera signal processing unit 54 performs processing relating to camera signal processing on an image. In one example, the camera signal processing unit 54 is capable of acquiring the image (entire image, viewpoint image, or synthesized image) supplied from the region extraction unit 53. In addition, the camera signal processing unit 54 is capable of performing camera signal processing (a camera process) on the acquired image. In one example, the camera signal processing unit 54 is capable of performing color separation processing, YC transformation processing, or the like on the image as a processing target. In the color separation processing, each RGB color for the processing target image is separated to generate R, G, and B images with the same number of pixels as the processing target image (demosaicing in a case of using a mosaic color filter such as Bayer array). In addition, in the YC transformation processing, the color space of the image after color separation is transformed from RGB to YC (luminance-color difference) on the processing target image. In addition, the camera signal processing unit 54 is capable of performing processing such as defect correction, noise reduction, automatic white balance (AWB), or gamma correction on the processing target image. Furthermore, the camera signal processing unit 54 is also capable of compressing (encoding) the processing target image. Of course, the camera signal processing unit 54 is also capable of performing a plurality of camera signal processing tasks on the processing target image and is also capable of performing other camera signal processing tasks than the above-described example.

Moreover, the assumption below is given that the camera signal processing unit 54 acquires a RAW format image, performs color separation processing and YC transformation on the image, and outputs a YC format image (YC). This image can be an entire image, each viewpoint image, or a synthesized image. In addition, the YC format image (YC)

can be encoded or not encoded. In other words, the data that is output from the camera signal processing unit 54 can be encoded data or unencoded image data.

In other words, at least one of the captured image (or entire image), the viewpoint image, or the synthesized image can be the YC format image (also referred to as a YC image).

Further, the image output by the camera signal processing unit 54 is one that is not completely developed and can be one that is not subjected to some or all of the processing tasks relating to lossy image quality adjustment (color adjustment) such as gamma correction or color matrix as the YC format image (YC). In this case, the YC format image (YC) can be restored to the RAW format image with substantially no deterioration, for example, in the subsequent stages or during playback.

The camera signal processing unit 54 is capable of supplying the display unit 61 via the bus 60 with the YC format image (YC) subjected to, for example, the camera signal processing, causing it to be displayed. In addition, the camera signal processing unit 54 is capable of supplying the storage unit 62 via the bus 60 with the YC format image (YC) subjected to the camera signal processing, causing it to be stored in the storage medium 63. Furthermore, the camera signal processing unit 54 is capable of supplying the communication unit 64 via the bus 60 with the YC format image (YC) subjected to the camera signal processing, causing it to be transmitted to the outside. In addition, the camera signal processing unit 54 is capable of supplying the filing unit 65 via the bus 60 with the YC format image (YC) subjected to the camera signal processing, causing it to be filed. Furthermore, the camera signal processing unit 54 is capable of supplying the image reconstruction processing unit 57 via the bus 60 with the YC format image (YC) subjected to the camera signal processing, causing it to be subjected to the image reconstruction processing.

Further, in one example, the camera signal processing unit 54 is also capable of supplying the through-the-lens image generation unit 55 with the YC format image (YC).

Moreover, in the case where the RAW format image (entire image, viewpoint image, or partial image) is stored in the storage medium 63, the camera signal processing unit 54 can be configured to read out the RAW format image from the storage medium 63 and perform signal processing. Also in this case, the camera signal processing unit 54 is capable of supplying the display unit 61, the storage unit 62, the communication unit 64, the filing unit 65, the image reconstruction processing unit 57, or the like via the bus 60 with the YC format image (YC) subjected to the camera signal processing.

Further, the camera signal processing unit 54 can perform the camera signal processing on the captured RAW format image (entire image) output from the image sensor 51, and the region extraction unit 53 can extract a part of the region from the captured image (entire image) subjected to the camera signal processing.

<Through-the-Lens Image Generation Unit>

The through-the-lens image generation unit 55 performs processing relating to the generation of a through-the-lens image. The through-the-lens image is an image displayed for the user to check an image being prepared for shooting at the time of shooting or preparation for shooting (during non-recording). The through-the-lens image is also referred to as a live-view image or an electronic-to-electronic (E-E) image. Moreover, upon shooting a still image, the image is an image before shooting, but upon shooting a moving image, a through-the-lens image corresponding to the image being shot (recorded) as well as being prepared for the shooting is displayed.

In one example, the through-the-lens image generation unit 55 is capable of acquiring the image (entire image, viewpoint image, or synthesized image) supplied from the camera signal processing unit 54. In addition, the through-the-lens image generation unit 55 is capable of performing the image size (resolution) conversion that converts the image's size into that corresponding to the resolution of the display unit 61 using the acquired image to generate the through-the-lens image that is the image to be displayed, for example. The through-the-lens image generation unit 55 is capable of supplying the display unit 61 via the bus 60 with the generated through-the-lens image, causing it to be displayed.

<Region-Specifying Unit>

The region-specifying unit 56 performs processing relating to the specifying (setting) of the region extracted from the captured image by the region extraction unit 53. In one example, the region-specifying unit 56 specifies the viewpoint-related information (VI) and supplies the region extraction unit 53 with the viewpoint image region.

The viewpoint-related information (VI) includes, for example, the viewpoint region information indicating the viewpoint image region in the captured image. The viewpoint region information can represent the viewpoint image region in any way. In one example, the viewpoint image region can be represented by coordinates indicating the position corresponding to the optical axis of the monocular optical system 31 in the captured image (also referred to as the center coordinates of the viewpoint image region) and the resolution (number of pixels) of the viewpoint image (viewpoint image region). In other words, the viewpoint region information can include the center coordinates of the viewpoint image region in the captured image and the resolution of the viewpoint image region. In this case, it is possible to specify the location of the viewpoint image region in the entire image from the center coordinates of the viewpoint image region and the resolution (number of pixels) of the viewpoint image region.

Moreover, the viewpoint region information is set for each viewpoint image region. In other words, in the case where the captured image includes a plurality of viewpoint images, the viewpoint-related information (VI) can include viewpoint identification information (e.g., an identification number) and the viewpoint region information which are used for identifying the viewpoint image (region) for each viewpoint image (each viewpoint image region).

Further, the viewpoint-related information (VI) can include any other pieces of information. In one example, the viewpoint-related information (VI) can include viewpoint time information indicating a time when the captured image from which the viewpoint image is extracted is captured. In addition, the viewpoint-related information (VI) can include viewpoint image inclusion region information that indicates a viewpoint image inclusion region nesting the viewpoint image region, which is a region cut out from the monocular image. In addition, the viewpoint-related information (VI) can include spotlight information (SI) that is information relating to an image of spotlight formed in a region that is neither a viewpoint image region nor a monocular image region of the captured image.

The region-specifying unit 56 supplies the region extraction unit 53 with such viewpoint-related information (VI) as information indicating the specified viewpoint image region. Thus, the region extraction unit 53 is capable of extracting the viewpoint image region (cutting out the viewpoint image) specified by the region-specifying unit 56 on the basis of the viewpoint-related information (VI).

Further, the region-specifying unit 56 is capable of supplying the bus 60 with the viewpoint-related information (VI). In one example, the region-specifying unit 56 is capable of supplying the storage unit 62 via the bus 60 with the viewpoint-related information (VI), causing it to be stored in the storage medium 63. In addition, the region-specifying unit 56 is capable of supplying the communication unit 64 via the bus 60 with the viewpoint-related information (VI), causing it to be transmitted. Furthermore, the region-specifying unit 56 is capable of supplying the filing unit 65 via the bus 60 with the viewpoint-related information (VI), causing it to be filed. In addition, the region-specifying unit 56 is capable of supplying the image reconstruction processing unit 57 via the bus 60 with the viewpoint-related information (VI), causing it to be used for the image reconstruction processing.

In one example, the region-specifying unit 56 can acquire such viewpoint-related information (VI) from the control unit 81 and supply the region extraction unit 53 or the bus 60 with the acquired viewpoint-related information (VI). In this case, the control unit 81 reads out the viewpoint-related information (VI) stored in the storage medium 83 through the storage unit 82 and supplies the region-specifying unit 56. The region-specifying unit 56 supplies the region extraction unit 53 or the bus 60 with the viewpoint-related information (VI). Moreover, the viewpoint-related information (VI) can include the spotlight information (SI).

The viewpoint-related information (VI) supplied for the storage unit 62, the communication unit 64, or the filing unit 65 via the bus 60 as described above is then associated with the image (entire image, viewpoint image, or synthesized image). In one example, the storage unit 62 is capable of associating the supplied viewpoint-related information (VI) with the image (entire image, viewpoint image, or synthesized image), causing it to be stored in the storage medium 63. In addition, the communication unit 64 is capable of associating the supplied viewpoint-related information (VI) with the image (entire image, viewpoint image, or synthesized image), causing it to be transmitted to the outside. Furthermore, the filing unit 65 is capable of associating the supplied viewpoint-related information (VI) with the image (entire image, viewpoint image, or synthesized image), causing to generate one file including the associated data.

Further, the region-specifying unit 56 can acquire the captured RAW format image supplied from the image sensor 51, generate viewpoint-related information (VI') on the basis of the captured image, and supply the region extraction unit 53 or the bus 60 with the viewpoint-related information (VI'). In this case, the region-specifying unit 56 specifies each viewpoint image region from the captured image and generates the viewpoint-related information (VI') indicating the viewpoint image region (e.g., indicating the viewpoint image region by the center coordinates of the viewpoint image region, the resolution of the viewpoint image region in the captured image, and the like). Then, the region-specifying unit 56 supplies the region extraction unit 53 or the bus 60 with the generated viewpoint-related information (VI'). Moreover, the viewpoint-related information (VI') can include the spotlight information (SI') generated by the region-specifying unit 56 on the basis of the captured image.

Furthermore, the region-specifying unit 56 can acquire the viewpoint-related information (VI) from the control unit 81 and acquire the captured RAW format image supplied from the image sensor 51. In addition, the region-specifying unit 56 can generate the spotlight information (SI') on the basis of the captured image, add the spotlight information (SI') to the viewpoint-related information (VI), and supply the region extraction unit 53 or the bus 60. In this case, the control unit 81 reads out the viewpoint-related information (VI) stored in the storage medium 83 through the storage unit 82 and supplies the region-specifying unit 56. The region-specifying unit 56 adds the spotlight information (SI') to the viewpoint-related information (VI) to generate the viewpoint-related information (VI'). The region-specifying unit 56 supplies the region extraction unit 53 or the bus 60 with the viewpoint-related information (VI').

Further, the region-specifying unit 56 can acquire the viewpoint-related information (VI) from the control unit 81, acquires the captured RAW format image supplied from the image sensor 51, and generate the spotlight information (SI') on the basis of the captured image. In addition, the region-specifying unit 56 can correct the viewpoint-related information (VI) using the spotlight information (SI') and supply the region extraction unit 53 or the bus 60 with the corrected viewpoint-related information (VI'). In this case, the control unit 81 reads out the viewpoint-related information (VI) stored in the storage medium 83 through the storage unit 82 and supplies the region-specifying unit 56. The region-specifying unit 56 corrects the viewpoint-related information (VI) using the spotlight information (SI') to generate the viewpoint-related information (VI'). The region-specifying unit 56 supplies the region extraction unit 53 or the bus 60 with the viewpoint-related information (VI').

<Image Reconstruction Processing Unit>

The image reconstruction processing unit 57 performs processing relating to image reconstruction. In one example, the image reconstruction processing unit 57 is capable of acquiring the YC format image (entire image, viewpoint image, or synthesized image) from the camera signal processing unit 54 or the storage unit 62 via the bus 60. In addition, the image reconstruction processing unit 57 is capable of acquiring the viewpoint-related information from the region-specifying unit 56 or the storage unit 62 via the bus 60.

Furthermore, the image reconstruction processing unit 57 is capable of performing, for example, image processing such as the generation of depth information or refocusing (reconstruction) that generate an image focused on any subject, using the acquired image and the viewpoint-related information associated with the acquired image. In one example, in the case where the viewpoint image is considered as a processing target, the image reconstruction processing unit 57 performs the processing such as the generation of depth information or the refocusing using each viewpoint image. In addition, in the case where the captured image or the synthesized image is considered as a processing target, the image reconstruction processing unit 57 extracts each viewpoint image from the captured image or the synthesized image and performs the processing such as the generation of depth information or the refocusing by using the extracted viewpoint image.

The image reconstruction processing unit 57 is capable of supplying the storage unit 62 via the bus 60 with the generated depth information or the refocused image as a processing result, causing it to be stored in the storage medium 63. In addition, the image reconstruction processing unit 57 is capable of supplying the communication unit 64 via the bus 60 with the generated depth information or the refocused image as a processing result, causing it to be transmitted to the outside. Furthermore, the image reconstruction processing unit 57 is capable of supplying the filing unit 65 via the bus 60 with the generated depth information or the refocused image as a processing result, causing it to be filed.

<Bus>

The bus 60 connects the image sensor 51, the RAW signal processing unit 52, the region extraction unit 53, the camera signal processing unit 54, the through-the-lens image generation unit 55, the region-specifying unit 56, the image reconstruction processing unit 57, the display unit 61, the storage unit 62, the communication unit 64, and the filing unit 65 among each other. The bus 60 functions as a transmission medium (transmission path) for various types of data exchanged between these blocks. Moreover, the bus 60 can be implemented by wire or by wireless communication.

<Display Unit>

The display unit 61 is configured with, for example, a liquid crystal panel, an organic electro-luminescence (EL) panel, or the like and is provided integrally with or separately from the housing of the camera 10. In one example, the display unit 61 can be provided on the back surface of the housing of the camera 10 (the surface opposite to the surface on which the multi-ocular optical system 30 is provided).

The display unit 61 performs processing relating to the display of an image. In one example, the display unit 61 is capable of acquiring a through-the-lens image in YC format supplied from the through-the-lens image generation unit 55, and converting and displaying it into an RGB format. Besides, the display unit 61 is also capable of displaying information such as menus and settings of the camera 10.

Further, the display unit 61 is capable of acquiring and displaying the YC format image (captured image, viewpoint image, or synthesized image) supplied from the storage unit 62. In addition, the display unit 61 is capable of acquiring and displaying a thumbnail image in YC format supplied from the storage unit 62. Furthermore, the display unit 61 is capable of acquiring and displaying the YC format image (captured image, viewpoint image, or synthesized image) supplied from the camera signal processing unit 54.

<Storage Unit>

The storage unit 62 controls the storage to the storage medium 63 configured with, for example, semiconductor memory or the like. The storage medium 63 can be a removable storage medium or a storage medium built in the camera 10. In one example, the storage unit 62 is capable of causing the storage medium 63 to store the image (captured image, viewpoint image, or synthesized image) supplied via the bus 60 in response to the control unit 81, the user's operation, or the like.

In one example, the storage unit 62 is capable of acquiring the RAW format image (entire image, viewpoint image, or synthesized image) supplied from the image sensor 51 or the region extraction unit 53, causing it to be stored in the storage medium 63. In addition, the storage unit 62 is capable of acquiring the signal-processed RAW format image (entire image, viewpoint image, or synthesized image) or the compressed (encoded) RAW format image (entire image, viewpoint image, or synthesized image) supplied from the RAW signal processing unit 52, causing it to be stored in the storage medium 63. Furthermore, the storage unit 62 is capable of acquiring the YC format image (entire image, viewpoint image, or synthesized image) supplied from the camera signal processing unit 54, causing it to be stored in the storage medium 63.

In this event, the storage unit 62 is capable of acquiring the viewpoint-related information supplied from the region-specifying unit 56 and associating it with the above-mentioned image (entire image, viewpoint image, or synthesized image). In other words, the storage unit 62 is capable of associating the image (entire image, viewpoint image, or synthesized image) with the viewpoint-related information, causing it to be stored in the storage medium 63. In other words, the storage unit 62 functions as an association unit that associates at least one of the entire image, the viewpoint image, or the synthesized image with the viewpoint-related information.

Further, in one example, the storage unit 62 is capable of acquiring the depth information or the refocused image supplied from the image reconstruction processing unit 57, causing it to be stored in the storage medium 63. Furthermore, the storage unit 62 is capable of acquiring the file supplied from the filing unit 65, causing it to be stored in the storage medium 63. This file includes, for example, the image (entire image, viewpoint image, or synthesized image) and the viewpoint-related information. In other words, in this file, the image (entire image, viewpoint image, or synthesized image) and the viewpoint-related information are associated with each other.

Further, in one example, the storage unit 62 is capable of reading out data, files, or the like stored in the storage medium 63 in response to the control unit 81, the user's operation, or the like. The storage unit 62 is capable of supplying the camera signal processing unit 54, the display unit 61, the communication unit 64, the filing unit 65, the image reconstruction processing unit 57, or the like via the bus 60 with the read data or files. In one example, the storage unit 62 is capable of reading out the YC format image (entire image, viewpoint image, or synthesized image) from the storage medium 63 and supplying the display unit 61, causing it to be displayed. In addition, the storage unit 62 is capable of reading out the RAW format image (entire image, viewpoint image, or synthesized image) from the storage medium 63 and supplying the camera signal processing unit 54, causing it to be subjected to the camera signal processing.

Further, the storage unit 62 is capable of reading out the data or files in which the image (entire image, viewpoint image, or synthesized image) and the viewpoint-related information stored in the storage medium 63 are associated with each other and supplying another processing unit with the data or files. In one example, the storage unit 62 is capable of reading out the image (entire image, viewpoint image, or synthesized image) and the viewpoint-related information associated with each other from the storage medium 63 and supplying the image reconstruction processing unit 57, causing it to be subjected to the processing such as the generation of depth information and refocusing. In addition, the storage unit 62 is capable of reading out the image (entire image, viewpoint image, or synthesized image) and the viewpoint-related information associated with each other from the storage medium 63 and supplying the communication unit 64, causing it to be transmitted. Furthermore, the storage unit 62 is capable of reading out the image (entire image, viewpoint image, or synthesized image) and the viewpoint-related information associated with each other from the storage medium 63 and supplying the filing unit 65, causing it to be filed.

Moreover, the storage medium 63 can be read-only memory (ROM) or rewritable memory such as random-access memory (RAM) or flash memory. In the case of rewritable memory, the storage medium 63 is capable of storing any type of information.

<Communication Unit>

The communication unit 64 communicates with a server on the Internet, a PC on a wired or wireless LAN, other external devices, or the like by any communication scheme. In one example, this communication allows the communication unit 64 to transmit data or files such as the image (captured image, viewpoint image, or synthesized image) or the viewpoint-related information in response to the control unit 81, the user's operation, or the like to the communication partner (external device) using streaming, uploading, or the like.

In one example, the communication unit 64 is capable of acquiring and transmitting the RAW format image (captured image, viewpoint image, or synthesized image) supplied from the image sensor 51 or the region extraction unit 53. In addition, the communication unit 64 is capable of acquiring and transmitting the signal-processed RAW format image (captured image, viewpoint image, or synthesized image) or the compressed (encoded) image (captured image, viewpoint image, or synthesized image) supplied from the RAW signal processing unit 52. Furthermore, the communication unit 64 is capable of acquiring and transmitting the YC format image (captured image, viewpoint image, or synthesized image) supplied from the camera signal processing unit 54.

In this event, the communication unit 64 is capable of acquiring the viewpoint-related information supplied from the region-specifying unit 56 and associating it with the above-mentioned image (entire image, viewpoint image, or synthesized image). In other words, the communication unit 64 is capable of associating the image (entire image, viewpoint image, or synthesized image) with the viewpoint-related information to be transmitted. In one example, in a case of transmitting an image by a streaming method, the communication unit 64 repeats the processing of acquiring an image to be transmitted (entire image, viewpoint image, or synthesized image) from a processing unit that supplies the image, associating the image with the viewpoint-related information supplied from the region-specifying unit 56, and transmitting it. In other words, the communication unit 64 functions as an association unit that associates at least one of the entire image, the viewpoint image, or the synthesized image with the viewpoint-related information.

Further, in one example, the communication unit 64 is capable of acquiring and transmitting the depth information or the refocused image supplied from the image reconstruction processing unit 57. Furthermore, the communication unit 64 is capable of acquiring and transmitting the file supplied from the filing unit 65. This file includes, for example, the image (entire image, viewpoint image, or synthesized image) and the viewpoint-related information. In other words, in this file, the image (entire image, viewpoint image, or synthesized image) and the viewpoint-related information are associated with each other.

<Filing Unit>

The filing unit 65 executes processing related to file generation. In one example, the filing unit 65 is capable of acquiring the RAW format image (entire image, viewpoint image, or synthesized image) supplied from the image sensor 51 or the region extraction unit 53. In addition, the filing unit 65 is capable of acquiring the signal-processed RAW format image (entire image, viewpoint image, or synthesized image) or the compressed (encoded) RAW format image (entire image, viewpoint image, or synthesized image) supplied from the RAW signal processing unit 52. Furthermore, the filing unit 65 is capable of acquiring the YC format image (entire image, viewpoint image, or synthesized image) supplied from the camera signal processing unit 54. In addition, in one example, the filing unit 65 is capable of acquiring the viewpoint-related information supplied from the region-specifying unit 56.

The filing unit 65 is capable of forming a file with the acquired plurality of data and creating one file including the plurality of data to associate the plurality of data with each other. In one example, the filing unit 65 is capable of creating one file from the above-mentioned image (entire image, viewpoint image, or synthesized image) and viewpoint-related information to associate them with each other. In other words, the filing unit 65 functions as an association unit that associates at least one of the entire image, the viewpoint image, or the synthesized image with the viewpoint-related information.

Further, in one example, the filing unit 65 is capable of acquiring and filing the depth information or the refocused image supplied from the image reconstruction processing unit 57. Furthermore, the filing unit 65 is capable of creating one file from the image (entire image, viewpoint image, or synthesized image) and the viewpoint-related information supplied from the storage unit 62 and associated with each other.

Moreover, the filing unit 65 is capable of generating a thumbnail image of an image to be filed (e.g., a viewpoint image) and incorporating it in the created file. In other words, the filing unit 65 is capable of associating this thumbnail image with the image (entire image, viewpoint image, or synthesized image) or the viewpoint-related information by forming the file.

The filing unit 65 is capable of supplying, for example, the storage unit 62 via the bus 60 with the created file (the image and viewpoint-related information associated with each other), causing it to be stored in the storage medium 63. In addition, the filing unit 65 is capable of supplying, for example, the communication unit 64 via the bus 60 with the created file (the image and viewpoint-related information associated with each other), causing it to be transmitted.

<Association Unit>

The storage unit 62, the communication unit 64, and the filing unit 65 described above are also referred to as association units 70. The association unit 70 associates the image (entire image, viewpoint image, or synthesized image) with the viewpoint-related information. In one example, the storage unit 62 is capable of associating at least one of the entire image, the viewpoint image, or the synthesized image with the viewpoint-related information, causing it to be stored in the storage medium 63. In addition, the communication unit 64 is capable of associating at least one of the entire image, the viewpoint image, or the synthesized image with the viewpoint-related information, causing it to be transmitted. Furthermore, the filing unit 65 is capable of associating at least one of the entire image, the viewpoint image, or the synthesized image with the viewpoint-related information by creating one file from them.

<Control Unit>

The control unit 81 performs control processing related to the camera 10. In other words, the control unit 81 is capable of controlling each component of the camera 10, causing the processing to be executed. In one example, the control unit 81 is capable of controlling the multi-ocular optical system 30 (each monocular optical system 31 thereof) via the optical system control unit 84, for causing the multi-ocular optical system 30 to set the optical system related to image capturing such as a diaphragm or focus position. In addition, the control unit 81 is capable of controlling the image sensor 51 for causing the image sensor 51 to perform image capturing (photoelectric conversion) to generate a captured image.

Furthermore, the control unit 81 is capable of supplying the region-specifying unit 56 with the viewpoint-related information (VI) so that the region to be extracted from the captured image can be specified. Moreover, the viewpoint-related information (VI) can include the spotlight information (SI). In addition, the control unit 81 can read out the viewpoint-related information (VI) stored in the storage medium 83 through the storage unit 82 and supply the region-specifying unit 56.

Further, the control unit 81 is capable of acquiring an image via the bus 60 and controlling the diaphragm through the optical system control unit 84 on the basis of the brightness of the acquired image. Furthermore, the control unit 81 is capable of controlling the focus through the optical system control unit 84 on the basis of the sharpness of the image. In addition, the control unit 81 is capable of controlling the camera signal processing unit 54 on the basis of the RGB ratio of the image to control the white balance gain.

<Storage Unit>

The storage unit 82 controls the storage to the storage medium 83 configured with, for example, semiconductor memory or the like. The storage medium 83 can be a removable storage medium or a built-in memory. In one example, the viewpoint-related information (VI) is stored in the storage medium 83. This viewpoint-related information (VI) is information corresponding to the multi-ocular optical system 30 (each monocular optical system 31 thereof) and the image sensor 51. In other words, the viewpoint-related information (VI) is information regarding a viewpoint image with each monocular optical system 31 of the multi-ocular optical system 30 as a viewpoint and is information used to specify the viewpoint image region. In one example, this viewpoint-related information (VI) can include the spotlight information (SI).

In one example, the storage unit 82 is capable of reading out the viewpoint-related information (VI) stored in the storage medium 83 and supplying the control unit 81, in response to the control unit 81, the user's operation, or the like.

Moreover, the storage medium 83 can be ROM or rewritable memory such as RAM or flash memory. In the case of rewritable memory, the storage medium 83 is capable of storing any type of information.

Further, the storage unit 82 and the storage medium 83 can be substituted for the storage unit 62 and the storage medium 63, respectively. In other words, the information to be stored in the storage medium 83 described above (such as the viewpoint-related information (VI)) can be stored in the storage medium 63. In this case, the storage unit 82 and the storage medium 83 can be omitted.

<Optical System Control Unit>

The optical system control unit 84 controls the multi-ocular optical system 30 (each monocular optical system 31 thereof) under the control of the control unit 81. In one example, the optical system control unit 84 is capable of controlling the lens group or a diaphragm of each monocular optical system 31 to control one or both of a focal length or F-stop of each monocular optical system 31. Moreover, in the case where the camera 10 has an electrically-driven focus adjustment function, the optical system control unit 84 is capable of controlling the focus (focal length) of the multi-ocular optical system 30 (each monocular optical system 31 thereof). In addition, the optical system control unit 84 can be configured to be capable of controlling the diaphragm (F-stop) of each monocular optical system 31.

Moreover, instead of having such an electrically-driven focus adjustment function, the camera 10 can be provided with a mechanism (physical configuration) for controlling the focal length by manually operating a focus ring provided on the lens barrel. In this case, the optical system control unit 84 can be omitted.

<Association of Viewpoint-Related Information>

In the above-mentioned camera 10, as described above, a subject is captured by the image sensor 51 through the multi-ocular optical system 30 (the plurality of monocular optical systems 31), and a captured image including the monocular image that is the image corresponding to each monocular optical system 31 is generated. A viewpoint image using the monocular optical system 31 as a viewpoint is generated by extracting the entirety or a part of this monocular image from such a captured image. The plurality of viewpoint images extracted from one captured image is the images of different viewpoints, so the use of these viewpoint images makes it possible, for example, to perform processing such as depth estimation by multi-ocular matching and correction to suppress mounting error of multi-lens. However, to perform such processing, information such as the relative position between viewpoint images is necessary.

However, the related art does not teach that such information described above is associated with the entire image, the viewpoint image, the synthesized image, or the like. In addition, the related art fails to perform the image processing using the viewpoint image, such as the depth estimation and correction for suppressing the mounting error of the multi-lens, using the entire image, viewpoint image, synthesized image, or the like, recorded or transmitted to other devices. In other words, offline processing is not considered.

Therefore, viewpoint-related information is associated with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

In one example, in an image-capturing apparatus, an association unit is included to associate viewpoint-related information with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

In one example, the association unit 70 acquires the viewpoint-related information corresponding to the image (entire image, viewpoint image, or synthesized image) from the region-specifying unit 56 and associates the image and the viewpoint-related information with the viewpoint-related information. In one example, the storage unit 62 associates at least one of the entire image, the viewpoint image, or the synthesized image with the viewpoint-related information, causing it to be stored in the storage medium 63. In addition, the communication unit 64 associates at least one of the entire image, the viewpoint image, or the synthesized image with the viewpoint-related information, causing it to be transmitted. Furthermore, the filing unit 65 associates at least one of the entire image, the viewpoint image, or the synthesized image with the viewpoint-related information by creating one file from them.

By doing so, it is possible to perform the processing on the basis of the viewpoint-related information. Thus, it is possible to perform the image processing using the viewpoint image.

The term used herein "associate" means, for example, to make one data available (linkable) upon processing the other data. In other words, the form of the captured image and the viewpoint-related information as data (file) is optional. In one example, the captured image and the viewpoint-related information can be brought together as one data item (file) or can be individual data (file). In one example, the viewpoint-related information associated with the captured image can be transmitted on a transmission path different from that of the captured image. In addition, in one example, the viewpoint-related information associated with the captured image can be recorded on a recording medium (or other recording areas of the same recording medium) different from that on which the captured image is stored. Of course, the captured image and the viewpoint-related information can be brought together into one stream data or one file.

Moreover, the image associated with the viewpoint-related information can be a still image or a moving image. In the case of a moving image, in each frame image, it is possible to perform extraction of a region, association with viewpoint-related information, or the like, similarly to the case of a still image.

Further, the "association" can be a part of the data (file) instead of the entire data. In one example, in the case where the captured image is a moving image including a plurality of frames, the viewpoint-related information can be associated with any unit of the captured image, such as multiple frames, one frame, or a part in the frame.

Moreover, in the case where the captured image and the viewpoint-related information are separate data items (files), it is possible to associate the captured image and the viewpoint-related information with each other, for example, by assigning the same identification number to both the captured image and the viewpoint-related information. In addition, in the case where the captured image and the viewpoint-related information are brought together into one file, the viewpoint-related information can be assigned to, for example, the header of the captured image. Moreover, the target with which the viewpoint-related information is associated can be a captured image (entire image), a viewpoint image, or a synthesized image of the viewpoint image.

<Output of Entire Image>

Figure 4:
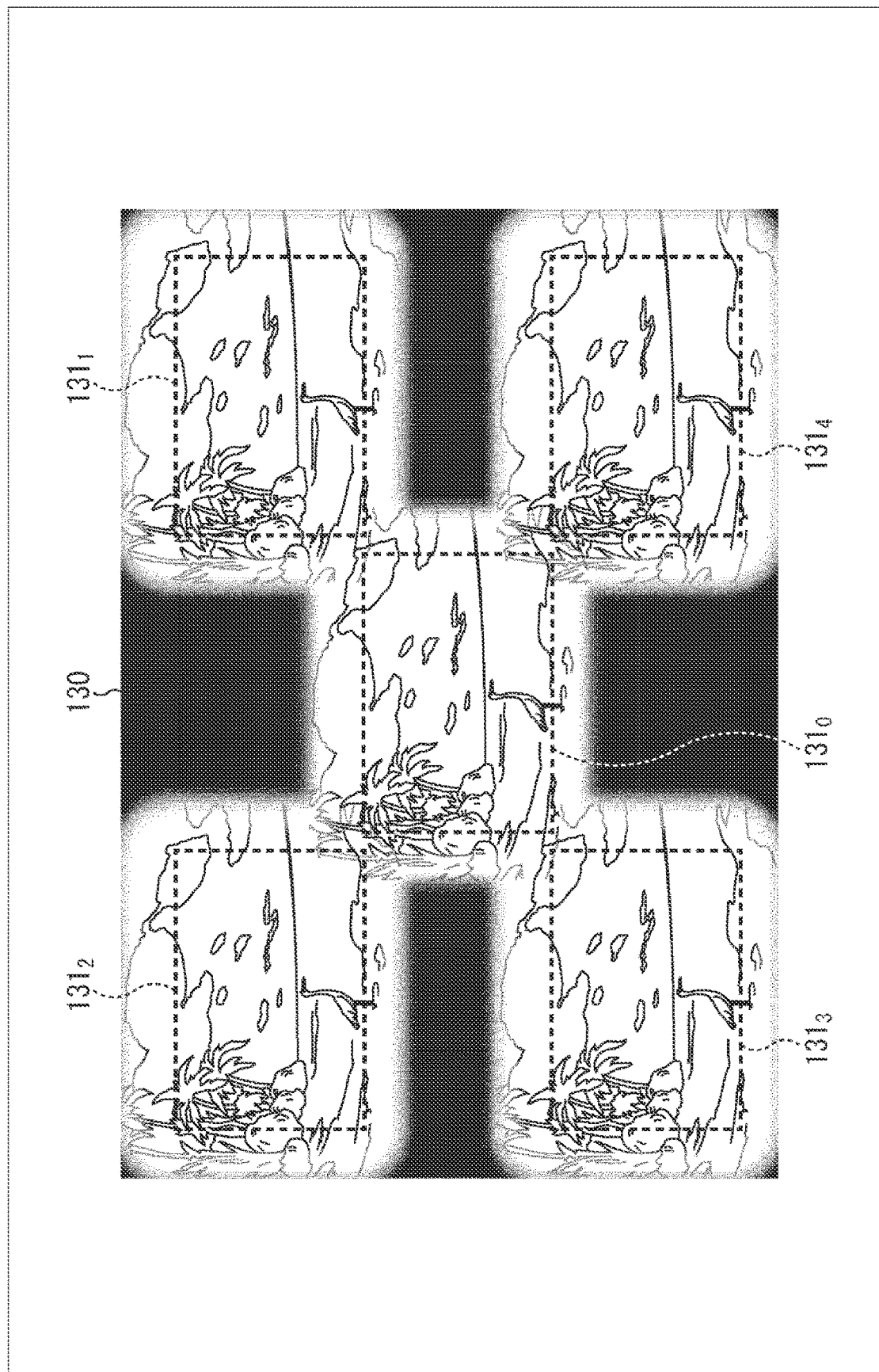
FIG. 4 is a diagram illustrating an example of a captured image.

The case of outputting the entire image is described. An example of the entire image is illustrated in FIG. 4. As illustrated in FIG. 4, an entire image 130 includes monocular images corresponding to respective monocular optical systems 31 (images obtained by photoelectric conversion of light from a subject incident through each monocular optical system 31). In one example, the central image of the entire image 130 is the monocular image corresponding to a monocular optical system $31_0$. In addition, the upper right image of the entire image 130 is a monocular image corresponding to a monocular optical system $31_1$. Furthermore, the upper left image of the entire image 130 is a monocular image corresponding to a monocular optical system $31_2$. In addition, the lower left image of the entire image 130 is a monocular image corresponding to a monocular optical system $31_3$. Furthermore, the lower right image of the entire image 130 is a monocular image corresponding to a monocular optical system $31_4$.

The entire image 130 can be the entire captured image generated by the image sensor 51 or a partial image (but including all the monocular images) that is cut out from the captured image. In addition, the entire image 130 can be an image in RAW format or an image in YC format.

From the viewpoint region information, a part (effective part) of each monocular image is specified as the viewpoint image region for the entire image 130. In one example, in the case of FIG. 4, the region surrounded by the dotted line frame of the entire image 130 is the viewpoint image region. In other words, a part (effective part) of the monocular image corresponding to the monocular optical system $31_0$ is specified as the viewpoint image region $131_0$. Similarly, a part (effective part) of the monocular image corresponding to the monocular optical system $31_1$ is specified as the viewpoint image region $131_1$. In addition, a part (effective part) of the monocular image corresponding to the monocular optical system $31_2$ is specified as the viewpoint image region $131_2$. Furthermore, a part (effective part) of the monocular image corresponding to the monocular optical system $31_3$ is specified as the viewpoint image region $131_3$. In addition, a part (effective part) of the monocular image corresponding to the monocular optical system $31_4$ is specified as the viewpoint image region $131_4$. Moreover, in the case where it is not necessary to distinguish the viewpoint image regions $131_0$ to $131_4$ from each other in the description, they are hereinafter referred to as a viewpoint image region 131.

In the case of outputting such an entire image 130, the association unit 70 acquires the entire image 130 from the image sensor 51, the RAW signal processing unit 52, or the camera signal processing unit 54 and associates The viewpoint-related information corresponding to the multi-ocular optical system 30 supplied from the region-specifying unit 56 with the entire image 130. Then, the association unit 70 outputs the entire image and the viewpoint-related information in association with each other. As an example of the output, for example, the storage unit 62 can store the entire image and the viewpoint-related information associated with each other in the storage medium 63. In addition, the communication unit 64 can transmit the entire image and the viewpoint-related information associated with each other. Furthermore, the filing unit 65 can file the entire image and the viewpoint-related information in association with each other.

Moreover, the association between the entire image and the viewpoint-related information can be performed in the region extraction unit 53. In other words, the region extraction unit 53 can associate the viewpoint-related information supplied from the region-specifying unit 56 with the entire image to be output and can supply the bus 60, the RAW signal processing unit 52, or the camera signal processing unit 54 with the entire image and the viewpoint-related information in association with each other.

The viewpoint-related information in this case includes the plurality of viewpoint region information indicating the viewpoint image region in the captured image. The viewpoint region information can represent the viewpoint image region in any way. In one example, the viewpoint image region can be represented by coordinates indicating the position corresponding to the optical axis of the monocular optical system 31 in the captured image (the center coordinates of the viewpoint image region) and the resolution (number of pixels) of the viewpoint image (viewpoint image region). In other words, the viewpoint region information can include the center coordinates of the viewpoint image region in the captured image and the resolution of the viewpoint image region. In this case, it is possible to specify the location of the viewpoint image region in the entire image 130 from the center coordinates of the viewpoint image region and the resolution (number of pixels) of the viewpoint image region.

The association of such viewpoint-related information with the captured image makes it possible to use the viewpoint-related information in the extraction of viewpoint images as pre-processing for the subsequent stage processing, such as depth estimation by multi-ocular matching or processing for suppressing errors that occur in mounting (installing) the multi-ocular optical system 30. In one example, the image reconstruction processing unit 57 extracts each viewpoint image on the basis of the viewpoint region information included in the viewpoint-related information. Then, the image reconstruction processing unit 57 is capable of performing the processing of the subsequent stage such as depth estimation by multi-ocular matching, refocusing, or processing for suppressing errors that occur in mounting (installing) the multi-ocular optical system 30.

Moreover, in one example, even if the viewpoint-related information is not associated with the entire image 130, the image reconstruction processing unit 57 is likely to specify the viewpoint image region included in the entire image 130 by image processing. However, there is a possibility that it is not easy to accurately specify the viewpoint image region in the captured image depending on the imaging conditions or the like. Thus, the association of the viewpoint-related information with the entire image 130 as described above makes it possible for the image reconstruction processing unit 57 to extract the viewpoint image region more easily and more accurately from the above-mentioned entire image 130 on the basis of the viewpoint-related information.

Figure 5:
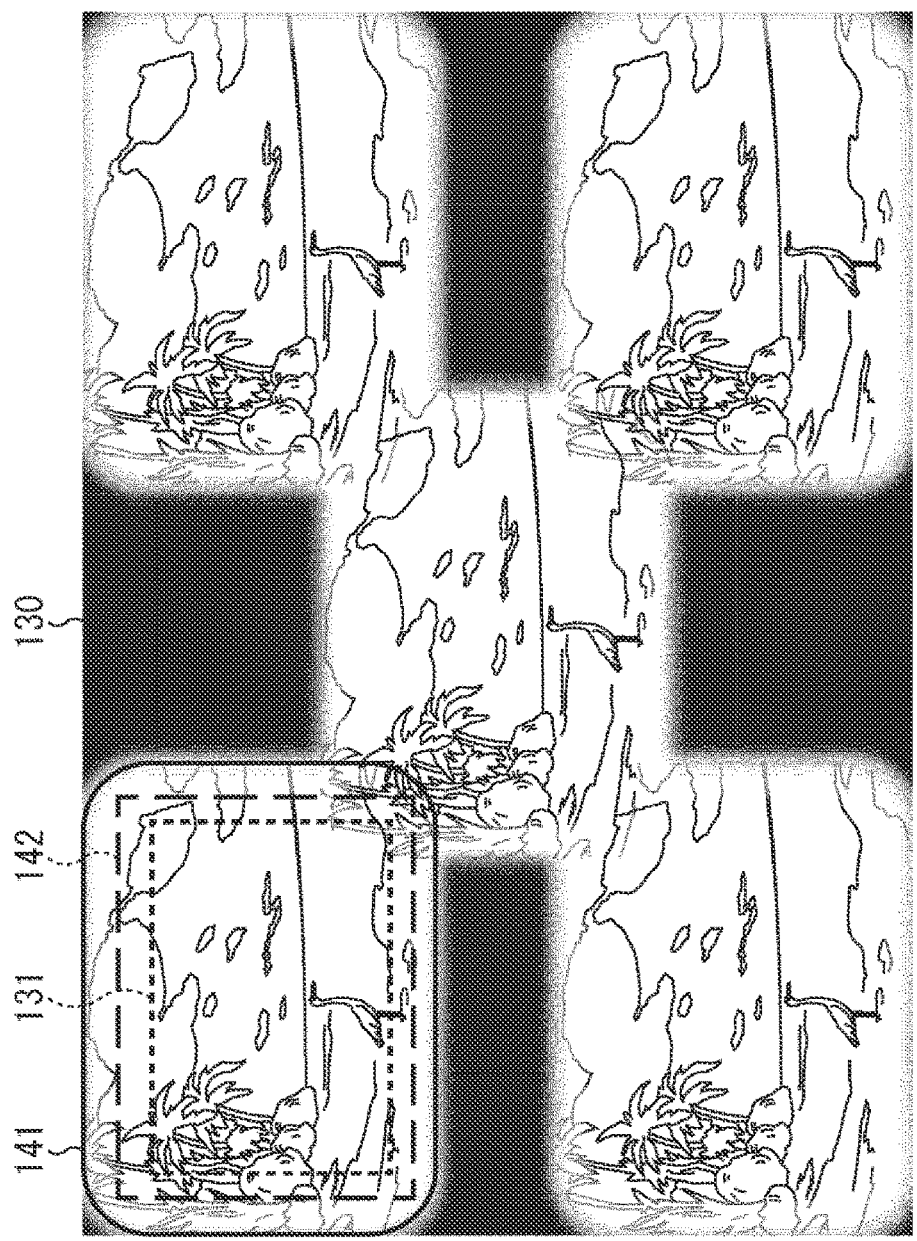
FIG. 5 is a diagram illustrating an example of a viewpoint image inclusion region.

Moreover, the size and shape of the region that is cut out from the entire image 130 for the purpose of generating the viewpoint image is optional as long as the viewpoint image region is included (nested). In one example, as illustrated in FIG. 5, a viewpoint image inclusion region 142 that includes (nests) the viewpoint image region 131 is set in a monocular region 141 that is a region of the monocular image. The viewpoint image inclusion region 142 can be extracted from the entire image 130 (the image of the viewpoint image inclusion region 142 is cut out). Then, if necessary, the viewpoint image (the image of the viewpoint image region 131) can be extracted from the cutout image of the viewpoint image inclusion region 142.

Moreover, the viewpoint image inclusion region 142 can be larger than the monocular region 141 (a region outside the monocular region 141 can be included in the viewpoint image inclusion region 142). In addition, the viewpoint-related information can include viewpoint image inclusion region-specifying information indicating the viewpoint image inclusion region 142.

In this viewpoint-related information (the viewpoint image inclusion region-specifying information thereof), the viewpoint image inclusion region 142 can be represented in any way. In one example, the viewpoint image inclusion region 142 can be represented by the coordinates indicating the position of a predetermined location (e.g., such as the upper left corner and the center) and the resolution (number of pixels) of the viewpoint image inclusion region 142. In other words, the viewpoint image inclusion region-specifying information can include the coordinates indicating the position of a predetermined location of the viewpoint image inclusion region 142 and the resolution (number of pixels) of the viewpoint image inclusion region 142. The association of the viewpoint-related information including the viewpoint image inclusion region-specifying information with the entire image 130 makes it possible to perform processing with reference to the viewpoint image inclusion region-specifying information in a processing unit in the subsequent stage. Thus, it is possible to cut out the image of the viewpoint image inclusion region 142 more easily.

Moreover, similarly to the case of the viewpoint image, the monocular image can be cut out from the captured image and can be processed or recorded.

<Procedure of Image-Capturing Processing>

Figure 6:
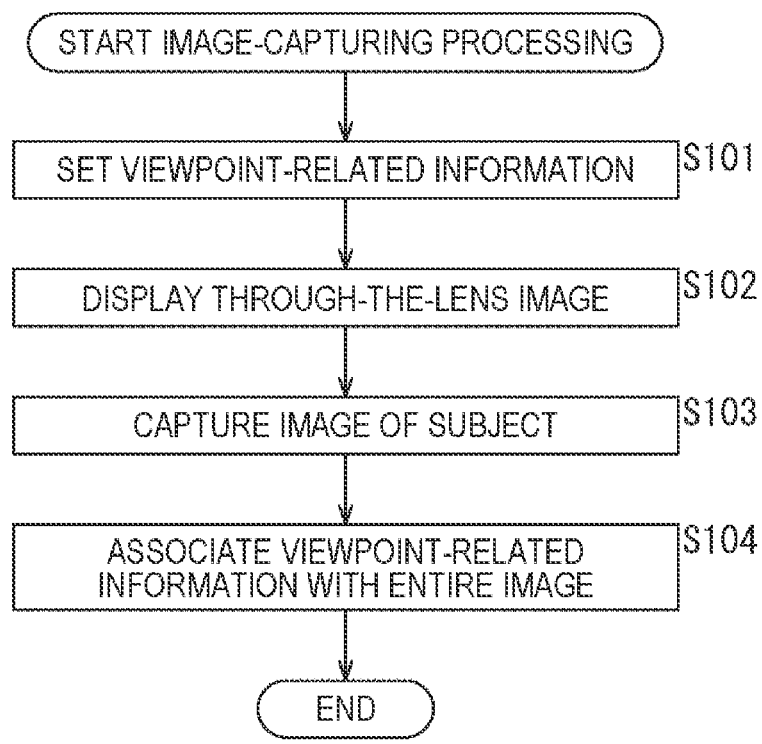
FIG. 6 is a flowchart illustrating an example of the procedure of image-capturing processing.

An example of the procedure of processing relating to the image capturing in a case of outputting the entire image as described above is described with reference to the flowchart of the image-capturing processing in the case of capturing a still image as illustrated in FIG. 6. In one example, in the case where the user or the like turns on the power of the camera 10 or the operation mode of the camera 10 is switched to the image-capturing mode of performing the image capturing, the image-capturing processing of FIG. 6 begins. When the image-capturing processing begins, in step S101, the control unit 81 reads the viewpoint-related information from the storage medium 83 through the storage unit 82 and sets it in the region-specifying unit 56. Moreover, the region-specifying unit 56 is capable of acquiring the captured RAW format image from the image sensor 51, specifying a region to be extracted (e.g., such as a viewpoint image region) on the basis of the captured image, generating the viewpoint-related information having information that indicates the specified region, and setting it. In addition, the region-specifying unit 56 is also capable of correcting the set viewpoint-related information on the basis of the captured image acquired from the image sensor. The region-specifying unit 56 controls the extraction of a partial region (cutting out a partial image) by the region extraction unit 53 by supplying the region extraction unit 53 or the like with the set viewpoint-related information.

In step S102, the display unit 61 displays a through-the-lens image. This processing is executed in the state before performing the image capturing to generate a captured image for recording. In other words, the display unit 61 displays the through-the-lens image in the state before the user operates the shutter button.

The through-the-lens image is an image for display generated in the through-the-lens image generation unit 55 and can be sufficient to have lower resolution than the image for recording. This through-the-lens image can be any image for display. In one example, the display unit 61 can display, as a through-the-lens image, the entire image, a single viewpoint image, a plurality of viewpoint images, a single monocular viewpoint image, a plurality of monocular images, or a synthesized image. In addition, the display unit 61 can display a combination of different types of images as a through-the-lens image, such as a viewpoint image and a monocular image. Furthermore, the display unit 61 can select and display one of the various types of images (or a combination of a plurality of images) described above on the basis of, for example, a request from an application or an operation by a user or the like. In other words, the display unit 61 can be capable of switching (selecting) an image to be displayed as a through-the-lens image.

In one example, in the case where the display unit 61 displays the entire image (entire captured image) as a through-the-lens image, the image sensor 51 supplies the region extraction unit 53 with the captured RAW format image (entire image). The region extraction unit 53 supplies the camera signal processing unit 54 with the captured image (with no cutout of a partial image). The camera signal processing unit 54 performs the camera signal processing on the captured image in RAW format, generates a captured image (entire image) in YC format, and supplies the through-the-lens image generation unit 55. The through-the-lens image generation unit 55 generates a through-the-lens image for displaying the entire image (entire captured image) from the captured YC format image (entire image), for example, by lowering its resolution. The through-the-lens image generation unit 55 supplies the display unit 61 with the generated through-the-lens image. The display unit 61 displays the through-the-lens image (displays the entire captured image as the through-the-lens image).

Further, in one example, in the case where the display unit 61 displays an entire image (a partial image including all monocular images that are cut out from the captured image) as a through-the-lens image, the image sensor 51 supplies the region extraction unit 53 with the captured RAW format image (entire image). The region extraction unit 53 extracts an image (entire image) of a part of the region including all the monocular images from the captured image, for example, on the basis of the viewpoint-related information supplied from the region-specifying unit 56 and supplies the camera signal processing unit 54. The camera signal processing unit 54 performs the camera signal processing on the entire image in RAW format, generates an entire image in YC format, and supplies the through-the-lens image generation unit 55. The through-the-lens image generation unit 55 generates a through-the-lens image for displaying the entire image from the entire image in YC format, for example, by lowering its resolution. The through-the-lens image generation unit 55 supplies the display unit 61 with the generated through-the-lens image. The display unit 61 displays the through-the-lens image (displays the entire image as the through-the-lens image).

Furthermore, in one example, in the case where the display unit 61 displays the viewpoint image that is cut out from the captured image as a through-the-lens image, the image sensor 51 supplies the region extraction unit 53 with the captured RAW format image (entire image). The region extraction unit 53 extracts each viewpoint image from the captured image on the basis of, for example, the viewpoint-related information supplied from the region-specifying unit 56 and supplies the camera signal processing unit 54. The camera signal processing unit 54 performs the camera signal processing on each of the viewpoint images in RAW format, generates a viewpoint image in YC format, and supplies the through-the-lens image generation unit 55 with the generated viewpoint image. The through-the-lens image generation unit 55 uses a single or plurality of viewpoint images to generate a through-the-lens image for displaying the single or plurality of viewpoint images by, for example, lowering the resolution. The through-the-lens image generation unit 55 supplies the display unit 61 with the generated through-the-lens image. The display unit 61 displays the through-the-lens image (displays a single or plurality of viewpoint images as the through-the-lens image).

In addition, in one example, in the case where the display unit 61 displays monocular images that is cut out from the captured image as a through-the-lens image, the image sensor 51 supplies the region extraction unit 53 with the captured RAW format image (entire image). The region extraction unit 53 extracts each monocular image from the captured image, for example, on the basis of the viewpoint-related information supplied from the region-specifying unit 56 (information indicating the region of each monocular image) and supplies the camera signal processing unit 54. The camera signal processing unit 54 performs the camera signal processing on each of the monocular images in RAW format, generates a monocular image in YC format, and supplies the through-the-lens image generation unit 55 with the generated viewpoint image. The through-the-lens image generation unit 55 uses a single or plurality of monocular images to generate a through-the-lens image for displaying the single or plurality of monocular images by, for example, lowering the resolution. The through-the-lens image generation unit 55 supplies the display unit 61 with the generated through-the-lens image. The display unit 61 displays the through-the-lens image (displays a single or plurality of monocular images as the through-the-lens image).

Furthermore, in one example, in the case where the display unit 61 displays the synthesized image of viewpoint image that is cut out from the captured image as a through-the-lens image, the image sensor 51 supplies the region extraction unit 53 with the captured RAW format image (entire image). The region extraction unit 53 extracts the viewpoint images from the captured image on the basis of, for example, the viewpoint-related information supplied from the region-specifying unit 56 and synthesizes them to generate a synthesized image. The region extraction unit 53 supplies the camera signal processing unit 54 with the generated synthesized image. The camera signal processing unit 54 performs the camera signal processing on the synthesized image in RAW format, generates a synthesized image in YC format, and supplies the through-the-lens image generation unit 55. The through-the-lens image generation unit 55 uses the synthesized image to generate a through-the-lens image for displaying the synthesized image by, for example, lowering the resolution. The through-the-lens image generation unit 55 supplies the display unit 61 with the generated through-the-lens image. The display unit 61 displays the through-the-lens image (displays the synthesized image as the through-the-lens image).

Moreover, in the case where the display unit 61 switches (selects) an image to be displayed as a through-the-lens image, for example, the region extraction unit 53 switches a way to be employed from the ways described above under the control of the control unit 81.

In one example, in the case where a user or the like operating the shutter button instructs the image capturing to be performed, in step S103, the image sensor 51 captures an image of a subject through the multi-ocular optical system 30 (the plurality of monocular optical systems 31). The image sensor 51 generates a captured image (entire image) in RAW format (for recording) under the control of the control unit 81.

In one example, the region extraction unit 53 uses the entire captured image in RAW format generated by the image sensor 51 as the entire image to supply the camera signal processing unit 54. In addition, in one example, the region extraction unit 53 extracts a part of the region including all the monocular images from the captured image in RAW format generated by the image sensor 51 and supplies the camera signal processing unit 54 with it as the entire image. The camera signal processing unit 54 performs the camera signal processing on the entire image in RAW format and generates an entire image in YC format. The camera signal processing unit 54 supplies the association unit 70 (the storage unit 62, the communication unit 64, or the filing unit 65) with the entire image. In addition, the region-specifying unit 56 supplies the association unit 70 with the viewpoint-related information that is set in step S101.

In step S104, the association unit 70 associates the viewpoint-related information that is set in the region-specifying unit 56 in step S101 with the entire image generated in step S103.

In one example, the storage unit 62 can store the entire image and the viewpoint-related information in the storage medium 63 in association with each other. In addition, the communication unit 64 can transmit the entire image and the viewpoint-related information in association with each other. Furthermore, the filing unit 65 can associate the entire image and the viewpoint-related information with each other by creating it as one file.

Moreover, the display unit 61 can display a checking image used to check the entire image to be output. In this case, the through-the-lens image generation unit 55 uses the entire image in YC format generated by the camera signal processing unit 54 to generate a checking image of the entire image to be output, for example, by lowering the resolution. The display unit 61 displays the checking image. Then, in one example, in the case where a predetermined time elapses after the checking image is displayed or a predetermined operation is performed by a user or the like, the association unit 70 can associate the entire image with the viewpoint-related information and outputs the image.

When the processing of step S104 is completed, the image-capturing processing ends.

The processing performed in each step described above makes it possible to associate the viewpoint-related information with the entire image, allowing image processing using the viewpoint image more easily.

<Output of Viewpoint Image>

Figure 7:
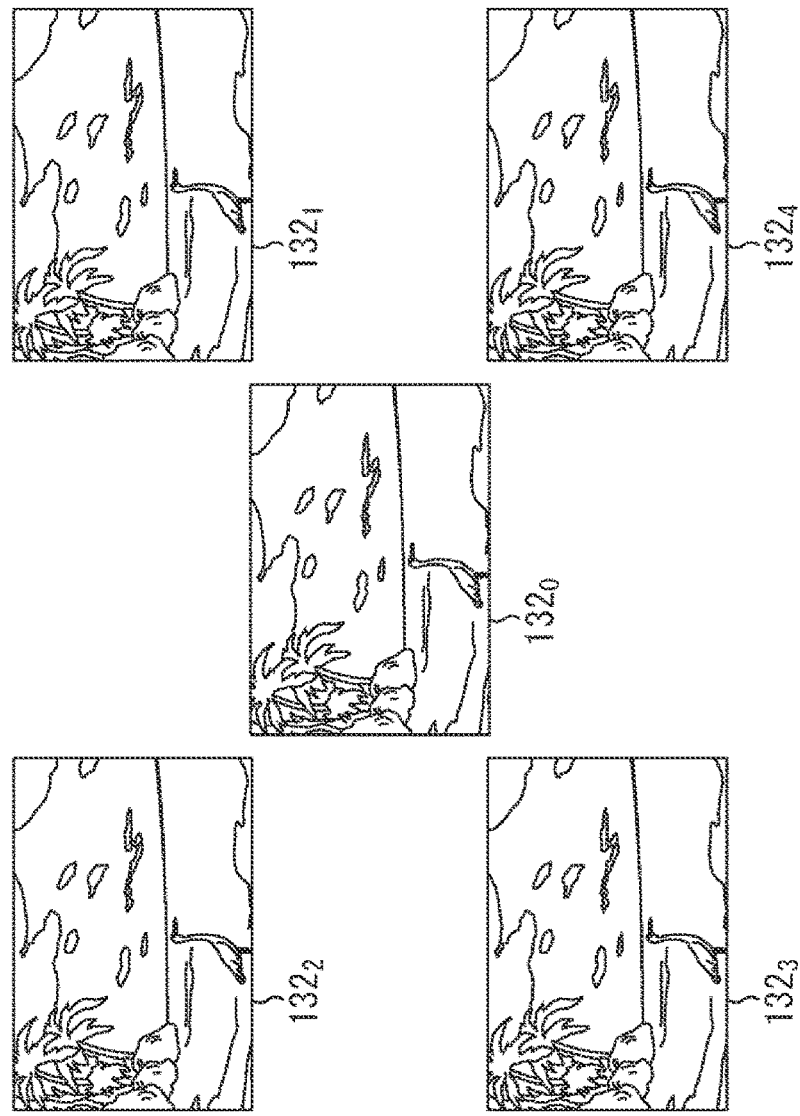
FIG. 7 is a diagram illustrating an example of a monocular image.

A case of outputting the viewpoint image is now described. FIG. 7 is a diagram illustrating an example of cutout viewpoint images. In FIG. 7, a viewpoint image $132_0$ is an image obtained by extracting the viewpoint image region $131_0$ from the entire image 130. A viewpoint image $132_1$ is an image obtained by extracting the viewpoint image region $131_1$ from the entire image 130. A viewpoint image $132_2$ is an image obtained by extracting the viewpoint image region $131_2$ from the entire image 130. A viewpoint image $132_3$ is an image obtained by extracting the viewpoint image region $131_3$ from the entire image 130. A viewpoint image $132_4$ is an image obtained by extracting the viewpoint image region $131_4$ from the entire image 130. In the case where it is not necessary to distinguish the viewpoint images $132_0$ to $132_4$ from each other, they are hereinafter referred to as a viewpoint image 132.

In the case of outputting such a viewpoint image, the region extraction unit 53 outputs each viewpoint image 132 that is cut out as in the example of FIG. 7 as independent data (or file).

In one example, the region extraction unit 53 cuts out a viewpoint image from the captured image (entire image) according to the viewpoint-related information supplied from the region-specifying unit 56. The region extraction unit 53 assigns viewpoint identification information (e.g., an identification number) used to identify each viewpoint to each of the cutout viewpoint images. The region extraction unit 53 supplies the camera signal processing unit 54 with each viewpoint image to which the viewpoint identification information is assigned. The camera signal processing unit 54 performs the camera signal processing on each viewpoint image in RAW format to generate each viewpoint image in YC format. The camera signal processing unit 54 supplies the association unit 70 with each viewpoint image in YC format. In addition, the region-specifying unit 56 supplies the association unit 70 with the viewpoint-related information supplied for the region extraction unit 53.

The association unit 70 associates each viewpoint image with viewpoint-related information corresponding to the viewpoint image. The viewpoint-related information can include the viewpoint identification information (e.g., a viewpoint identification number) used to identify each viewpoint. The association unit 70 associates each viewpoint image with viewpoint-related information corresponding to the viewpoint image on the basis of the viewpoint identification information. The reference of the viewpoint identification information makes it possible for the association unit 70 to know which viewpoint-related information corresponds to which viewpoint image easily. In other words, the viewpoint identification information used by the association unit 70 enables correct association between each viewpoint image and the viewpoint-related information more easily.

Then, the association unit 70 outputs each of the viewpoint images and the viewpoint-related information in association with each other. In one example, the storage unit 62 can store each of the viewpoint images and the viewpoint-related information in association with each other in the storage medium 63. In addition, the communication unit 64 can transmit each of the viewpoint images and the viewpoint-related information in association with each other. Furthermore, the filing unit 65 can file each of the viewpoint images and the viewpoint-related information in association with each other.

Moreover, the association between each viewpoint image and the viewpoint-related information can be performed in the region extraction unit 53. In other words, the region extraction unit 53 can associate the viewpoint-related information supplied from the region-specifying unit 56 with each viewpoint image to be output and can supply the bus 60, the RAW signal processing unit 52, or the camera signal processing unit 54 with each viewpoint image and the viewpoint-related information in association with each other.

The viewpoint-related information can include the viewpoint region information and the viewpoint image inclusion region-specifying information, similarly to the case of <Output of entire image> described above. Thus, it is possible to obtain a similar effect to the case of outputting the entire image.

Further, the viewpoint-related information can include viewpoint time information indicating the time and order in which the captured images from which the viewpoint images are extracted are captured. In the case where the viewpoint images extracted from a plurality of captured images are mixed or the case where the moving image or the continuous shooting image is used, it is likely to be difficult to identify which viewpoint image is extracted from which captured image. The association of the viewpoint time information indicating the generation time and order of the captured images with the viewpoint image makes it possible to more easily identify the captured image corresponding to each viewpoint image (the captured image from which each viewpoint image is extracted). In other words, it is possible to specify a plurality of viewpoint images extracted from the same captured images more easily. In addition, even in the case where the recorded files are not collectively managed, it is possible to specify each viewpoint image at the same time.

<Procedure of Image-Capturing Processing>

Figure 8:
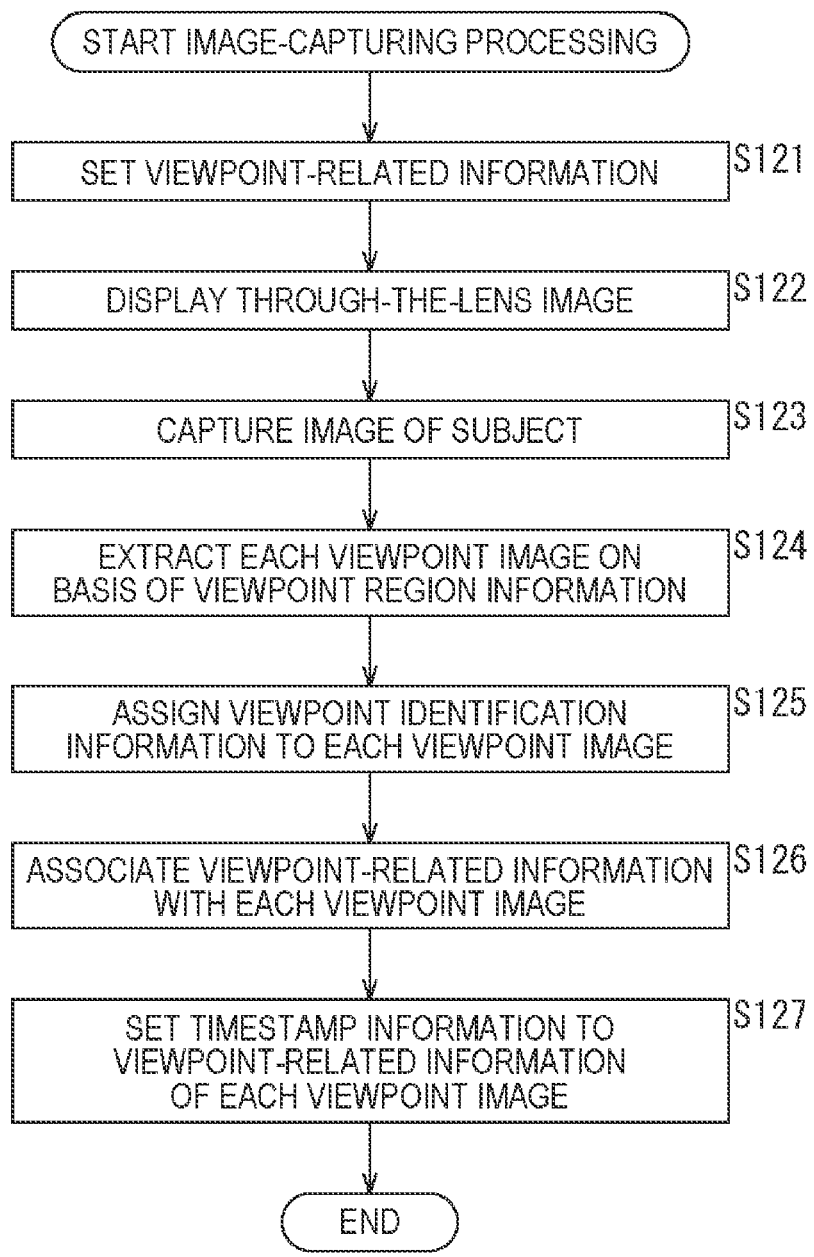
FIG. 8 is a flowchart illustrating an example of the procedure of image-capturing processing.

The description below is given of an example of the procedure of processing relating to the image capturing in the case described above with reference to the flowchart of image-capturing processing in a case of capturing a still image illustrated in FIG. 8. In one example, in the case where the user or the like turns on the power of the camera 10 or the operation mode of the camera 10 is switched to the image-capturing mode of performing the image capturing, the image-capturing processing of FIG. 8 begins. When the image-capturing processing begins, in step S121, the control unit 81 reads out the viewpoint-related information from the storage medium 83 through the storage unit 82 and sets it in the region-specifying unit 56.

Moreover, the region-specifying unit 56 is capable of acquiring the captured RAW format image from the image sensor 51, specifying a viewpoint image region to be extracted on the basis of the captured image, generating the viewpoint-related information having viewpoint region information that indicates the specified viewpoint image region, and setting it. In addition, the region-specifying unit 56 is also capable of correcting the set viewpoint-related information on the basis of the captured image acquired from the image sensor. The region-specifying unit 56 controls the extraction of a viewpoint image region (cutting out a viewpoint image image) by the region extraction unit 53 by supplying the region extraction unit 53 or the like with the set viewpoint-related information.

Moreover, the viewpoint identification information (e.g., an identification number) used to identify each viewpoint image is assigned to each viewpoint region information included in the viewpoint-related information. In other words, the viewpoint-related information includes the viewpoint identification information.

In step S122, the display unit 61 displays a through-the-lens image. This processing is executed in the state before performing the image capturing to generate a captured image for recording. In other words, the display unit 61 displays the through-the-lens image in the state before the user operates the shutter button. The through-the-lens image is similar to that of the case described in step S102 of FIG. 6.

Similarly to the case of step S102 in FIG. 6, the display unit 61 can display, as a through-the-lens image, the entire image, a single viewpoint image, a plurality of viewpoint images, a single monocular viewpoint image, a plurality of monocular images, or a synthesized image. In addition, the display unit 61 can display a combination of different types of images as a through-the-lens image, such as a viewpoint image and a monocular image. Furthermore, the display unit 61 can select and display one of the various types of images (or a combination of a plurality of images) described above on the basis of, for example, a request from an application or an operation by a user or the like. In other words, the display unit 61 can be capable of switching (selecting) an image to be displayed as a through-the-lens image.

In one example, in the case where a user or the like operating the shutter button instructs the image capturing to be performed, in step S123, the image sensor 51 captures an image of a subject through the multi-ocular optical system 30 (the plurality of monocular optical systems 31). The image sensor 51 generates a captured image (entire image) in RAW format (for recording) under the control of the control unit 81.

In step S124, the region extraction unit 53 extracts each viewpoint image from the captured image obtained in step S123 on the basis of the viewpoint-related information (the viewpoint region information thereof) set in the region-specifying unit 56 in step S121.

In step S125, the region extraction unit 53 assigns the viewpoint identification information (e.g., an identification number) used to identify each viewpoint image to each of the extracted viewpoint images. In one example, the viewpoint identification information is added to each viewpoint image. In other words, this processing causes the viewpoint identification information to be included in each viewpoint image.

The region extraction unit 53 supplies the camera signal processing unit 54 with each viewpoint image to which the viewpoint identification information is assigned. The camera signal processing unit 54 performs the camera signal processing on each viewpoint image in RAW format to generate each viewpoint image in YC format. As described above, the viewpoint identification information is assigned to each viewpoint image in YC format. The camera signal processing unit 54 supplies the association unit 70 (the storage unit 62, the communication unit 64, or the filing unit 65) with each viewpoint image. In addition, the region-specifying unit 56 supplies the association unit 70 with the viewpoint-related information set in step S121.

In step S126, the association unit 70 associates each viewpoint image with the viewpoint-related information set in the region-specifying unit 56 in step S121. The association unit 70 associates each viewpoint image with the viewpoint-related information (the viewpoint region information thereof) using the viewpoint identification information.

In step S127, the association unit 70 sets timestamp information, which indicates the image-capturing timing of the captured image from which the viewpoint image is extracted, in the viewpoint-related information associated with each viewpoint image in step S126. In other words, this processing causes the timestamp information to be included in the viewpoint-related information.

In one example, the storage unit 62 can store each viewpoint image and the viewpoint-related information in the storage medium 63 in association with each other. In addition, the communication unit 64 can transmit each viewpoint image and the viewpoint-related information in association with each other. Furthermore, the filing unit 65 can associate each viewpoint image and the viewpoint-related information with each other by creating it as one file.

Moreover, the display unit 61 can display a checking image used to check each viewpoint image to be output. In this case, the through-the-lens image generation unit 55 uses each viewpoint image in YC format generated by the camera signal processing unit 54 to generate a checking image of each viewpoint image to be output, for example, by lowering the resolution. The display unit 61 displays the checking image. Then, in one example, in the case where a predetermined time elapses after the checking image is displayed or a predetermined operation is performed by a user or the like, the association unit 70 can associate each viewpoint image with the viewpoint-related information and outputs the image.

When the processing of step S127 is completed, the image-capturing processing ends.

The processing performed in each step described above makes it possible to associate the viewpoint-related information with each viewpoint image, allowing image processing using the viewpoint image more easily.

<Output of Synthesized Image>

Figure 9:
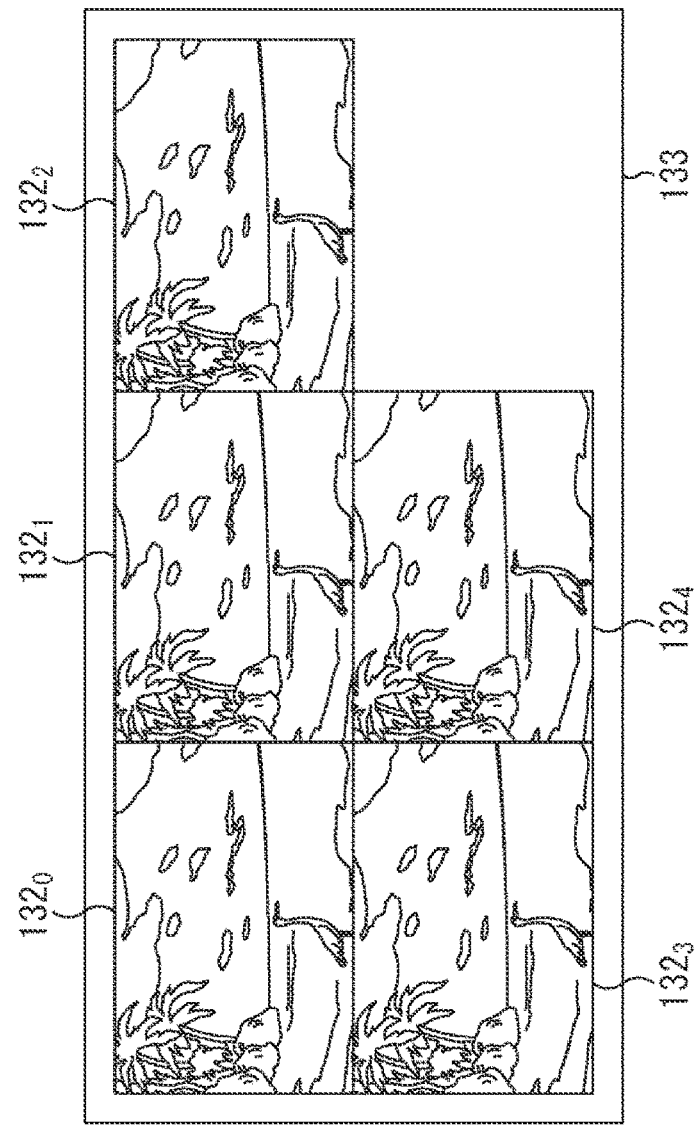
FIG. 9 is a diagram illustrating an example of a synthesized image.

A case of outputting a synthesized image is now described. FIG. 9 is a diagram illustrating an example of a synthesized image obtained by synthesizing the respective viewpoint images. In the case of the example of FIG. 9, one synthesized image 133 is generated by synthesizing the viewpoint images $132_0$ to $132_4$ extracted in the example of FIG. 7 to be displayed side by side in one image. In other words, the synthesized image 133 is obtained by synthesizing the respective viewpoint images 132 into one data (one frame) or one file.

Moreover, in FIG. 9, a margin area is shown around the viewpoint images $132_0$ to $132_4$ of the synthesized image 133, but the synthesized image 133 can have such margin area or not. In addition, the shape of the synthesized image 133 can be rectangular, and the arrangement method (way of alignment) of each viewpoint image 132 is optional. As in the example of FIG. 9, the blank area (an area corresponding to the sixth viewpoint image 132) generated in the case where five viewpoint images 132 are arranged in two rows by three columns can be represented by null data or a fixed value.

In one example, the region extraction unit 53 cuts out a viewpoint image from the captured image (entire image) according to the viewpoint-related information supplied from the region-specifying unit 56. The region extraction unit 53 generates a synthesized image by synthesizing the cutout viewpoint images to be displayed side by side in one image. In this event, predetermining the arrangement order (position) of each viewpoint image makes it possible to easily know which viewpoint image each viewpoint image included in the synthesized image is.

In addition, the viewpoint identification information (e.g., the identification number) can be assigned to each viewpoint image before synthesis. Also in this case, it is also possible to easily know which viewpoint image each viewpoint image included in the synthesized image is. It is hereinafter assumed that the order of arranging the viewpoint images in the synthesized image is predetermined.

The region extraction unit 53 supplies the camera signal processing unit 54 with the synthesized image to which the viewpoint identification information is assigned. The camera signal processing unit 54 performs the camera signal processing on the synthesized RAW format image to generate a synthesized image in YC format. The camera signal processing unit 54 supplies the association unit 70 with the synthesized image in YC format. In addition, the region-specifying unit 56 supplies the association unit 70 with the viewpoint-related information supplied for the region extraction unit 53.

The association unit 70 associates the viewpoint-related information with the synthesized image. The viewpoint of each viewpoint image included in the synthesized image is obvious from the position of the viewpoint image in the synthesized image. In other words, it is possible to easily know which viewpoint region information of the viewpoint-related information corresponds to each viewpoint image.

Then, the association unit 70 outputs the synthesized image and the viewpoint-related information in association with each other. In one example, the storage unit 62 can store the synthesized image and the viewpoint-related information in association with each other in the storage medium 63. In addition, the communication unit 64 can transmit the synthesized image and the viewpoint-related information associated with each other. Furthermore, the filing unit 65 can file the image and the viewpoint-related information in association with each other.

Moreover, the association between the synthesized image and the viewpoint-related information can be performed in the region extraction unit 53. In other words, the region extraction unit 53 can associate the viewpoint-related information supplied from the region-specifying unit 56 with the synthesized image to be output and can supply the bus 60, the RAW signal processing unit 52, or the camera signal processing unit 54 with the synthesized image and the viewpoint-related information in association with each other.

The viewpoint-related information can include the viewpoint region information and the viewpoint image inclusion region-specifying information, similarly to the case of <Output of entire image> and <Output of viewpoint image> described above. Thus, it is possible to obtain a similar effect to the case of outputting the entire image or the viewpoint image.

<Procedure of Image-Capturing Processing>

Figure 10:
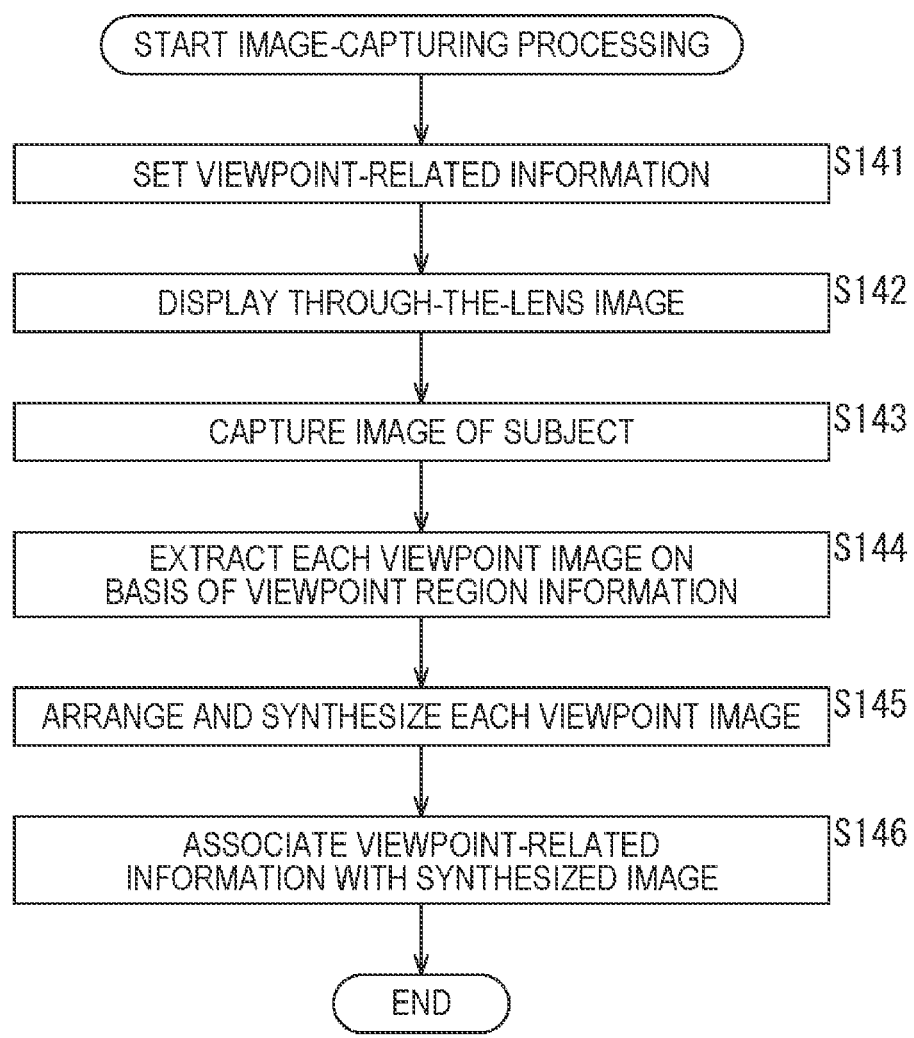
FIG. 10 is a flowchart illustrating an example of the procedure of image-capturing processing.

The description below is given of an example of the procedure of processing relating to the image capturing in the case described above with reference to the flowchart of image-capturing processing in a case of capturing a still image illustrated in FIG. 10. In one example, in the case where the user or the like turns on the power of the camera 10 or the operation mode of the camera 10 is switched to the image-capturing mode of performing the image capturing, the image-capturing processing of FIG. 10 begins. When the image-capturing processing begins, the processing tasks of steps S141 to S144 are executed similarly to those of steps S121 to S124 (FIG. 8).

In step S145, the region extraction unit 53 arranges and synthesizes each viewpoint image extracted from the captured image in step S144 to generate a synthesized image.

The region extraction unit 53 supplies the camera signal processing unit 54 with the synthesized image. The camera signal processing unit 54 performs the camera signal processing on the synthesized RAW format image to generate a synthesized image in YC format. The camera signal processing unit 54 supplies the association unit 70 (the storage unit 62, the communication unit 64, or the filing unit 65) with the synthesized image. In addition, the region-specifying unit 56 supplies the association unit 70 with the viewpoint-related information set in step S141.

In step S146, the association unit 70 associates the synthesized image with the viewpoint-related information set in the region-specifying unit 56 in step S141.

In one example, the storage unit 62 can store the synthesized image and the viewpoint-related information in the storage medium 63 in association with each other. In addition, the communication unit 64 can transmit the synthesized image and the viewpoint-related information in association with each other. Furthermore, the filing unit 65 can associate the synthesized image and the viewpoint-related information with each other by creating it as one file.

Moreover, the display unit 61 can display a checking image used to check the synthesized image to be output. In this case, the through-the-lens image generation unit 55 uses the synthesized image in YC format generated by the camera signal processing unit 54 to generate a checking image of the synthesized image to be output, for example, by lowering the resolution. The display unit 61 displays the checking image. Then, in one example, in the case where a predetermined time elapses after the checking image is displayed or a predetermined operation is performed by a user or the like, the association unit 70 can associate the synthesized image with the viewpoint-related information and outputs the image.

When the processing of step S146 is completed, the image-capturing processing ends.

The processing performed in each step described above makes it possible to associate the viewpoint-related information with the synthesized image, allowing image processing using the viewpoint image more easily.

<Comparison Between Entire Image, Viewpoint Image, and Synthesized Image>

As mentioned above, in the case of outputting the entire image, it is less different from the existing system that employs a monocular optical system, and the compatibility between them is high. Thus, it is possible to more easily achieve an image-capturing apparatus that outputs the entire image in this way. In addition, it is highly versatile. Similarly, the playback device that plays back the output entire image as described above is also less different from the existing system that employs a monocular optical system, and the compatibility between them is high. Thus, it is possible to more easily achieve a playback device that plays back the output entire image as described above.

Further, in the case of outputting each viewpoint image, it is possible to use the viewpoint image not only for processing such as the generation of depth information or the refocusing but also for the generation or display of a thumbnail. In this event, it is possible to display the pattern (display it in an identifiable manner) with an image size smaller than that of the captured image or the synthesized image.

Furthermore, in the case of outputting a synthesized image, it is possible to reduce an unnecessary area, and only one file or stream is necessary. Thus, it is possible to reduce or eliminate an increase in data capacity. In addition, the data management is made easier than the case where each viewpoint image is output in recording or transmitting an image. Furthermore, similarly to the case of the entire image, it is less different from the existing system that employs a monocular optical system, and the compatibility between them is high. Thus, it is possible to more easily achieve an image-capturing apparatus that outputs the synthesized image in this way. In addition, it is highly versatile. Similarly, the playback device that plays back the output synthesized image as described above is also less different from the existing system that employs a monocular optical system, and the compatibility between them is high. Thus, it is possible to more easily achieve a playback device that plays back the output synthesized image as described above.

<Combination>

Moreover, the methods described above are applicable in combination. In other words, plural ones of the entire image, the viewpoint image, and the synthesized image can be output. In this case, it is sufficient to execute necessary one of the image-capturing processing tasks described with reference to the flowcharts of FIGS. 6, 8, and 10.

In one example, the viewpoint image can be output for display, and the entire image or the synthesized image can be output for image processing or recording. Of course, combinations other than the example described above are achievable. Outputting a plurality of images in combination in this way makes it possible to output images suitable for a wider variety of usages.

<Selection of Output>

Further, the image to be output is selectable. In one example, the image to be output is selectable depending on applications, an instruction by the user or the like, usage, and the like.

Figure 11:
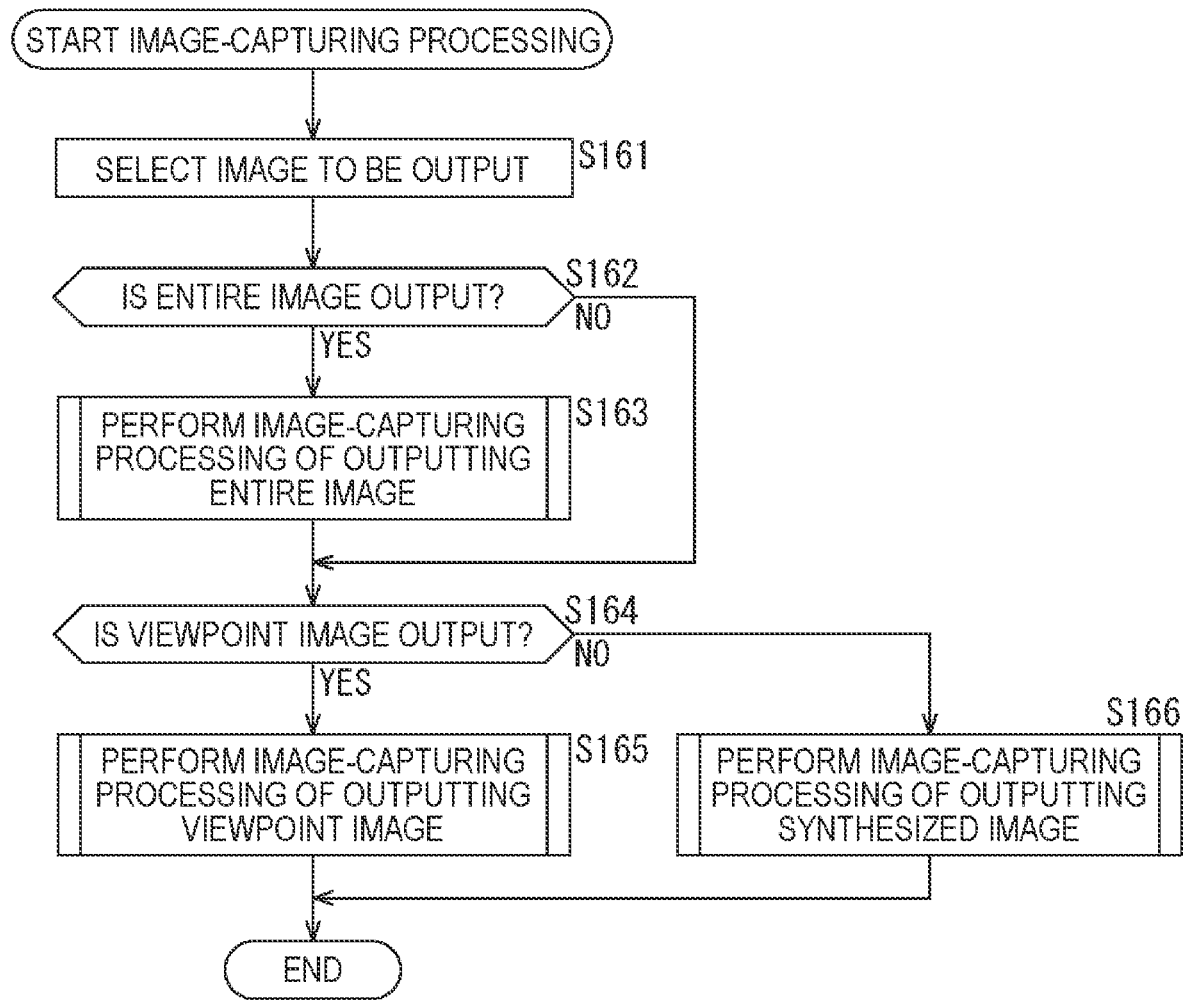
FIG. 11 is a flowchart illustrating an example of the procedure of image-capturing processing.

The description below is given of an example of the procedure of processing relating to the image capturing in the case described above with reference to the flowchart of image-capturing processing in a case of capturing a still image illustrated in FIG. 11. In one example, in the case where the user or the like turns on the power of the camera 10 or the operation mode of the camera 10 is switched to the image-capturing mode of performing the image capturing, the image-capturing processing of FIG. 6 begins. When the image-capturing processing begins, in step S161, the control unit 81 selects an image to be output. In other words, the control unit 81 selects whether to output the entire image, the viewpoint image, or the synthesized image. Of course, plural ones can be selected. The control unit 81 performs the selection depending on, for example, applications, an instruction from the user or the like, usage, and the like. Moreover, the instruction by the user can be performed through the menu setting before starting the image-capturing processing.

In step S162, the control unit 81 determines whether or not to output the entire image. In a case where the entire image is determined to be output, the processing proceeds to step S163.

In step S163, each processing unit of the camera 10 executes an image-capturing processing of outputting the entire image (e.g., the image-capturing processing described with reference to the flowchart of FIG. 6). When the processing of step S163 is completed, the processing proceeds to step S164.

Further, in a case where it is determined in step S162 that the entire image is not output, the processing of step S163 is skipped, and the processing proceeds to step S164.

In step S164, the control unit 81 determines whether or not to output the viewpoint image. In a case where it is determined that the viewpoint image is output, the processing proceeds to step S165.

In step S165, each processing unit of the camera 10 executes an image-capturing processing of outputting each viewpoint image (e.g., the image-capturing processing described with reference to the flowchart of FIG. 8). When the processing of step S165 is completed, the image-capturing processing ends.

Further, in a case where it is determined in step S164 that the viewpoint image is not output, the processing proceeds to step S166.

In step S166, each processing unit of the camera 10 executes an image-capturing processing of outputting the synthesized image (e.g., the image-capturing processing described with reference to the flowchart of FIG. 10). When the processing of step S166 is completed, the image-capturing processing ends.

The processing executed in each step as described above makes it possible to select any image as the image to be output. Thus, the control unit 81 is capable of outputting an image suitable for a wider variety of usages.

2. Second Embodiment

<Use of Spotlight>

Moreover, the correction for the captured image can be performed in the rotation direction. As illustrated in FIG. 1, the lens barrel of the camera 10 is provided with two light sources 32L and 32R as plural components in addition to five monocular optical systems $31_0$ to $31_4$. The light sources 32L and 32R are provided respectively at positions of the right end and the left end of the lens barrel when viewing the camera 10 from the front side.

The light sources 32L and 32R are configured with, for example, a light-emitting diode (LED), a laser, or the like, and emit spotlight from the front side to the back side of the camera 10.

Thus, the image sensor 51 of the camera 10 receives the spotlight emitted by the light sources 32L and 32R.

Figure 12:
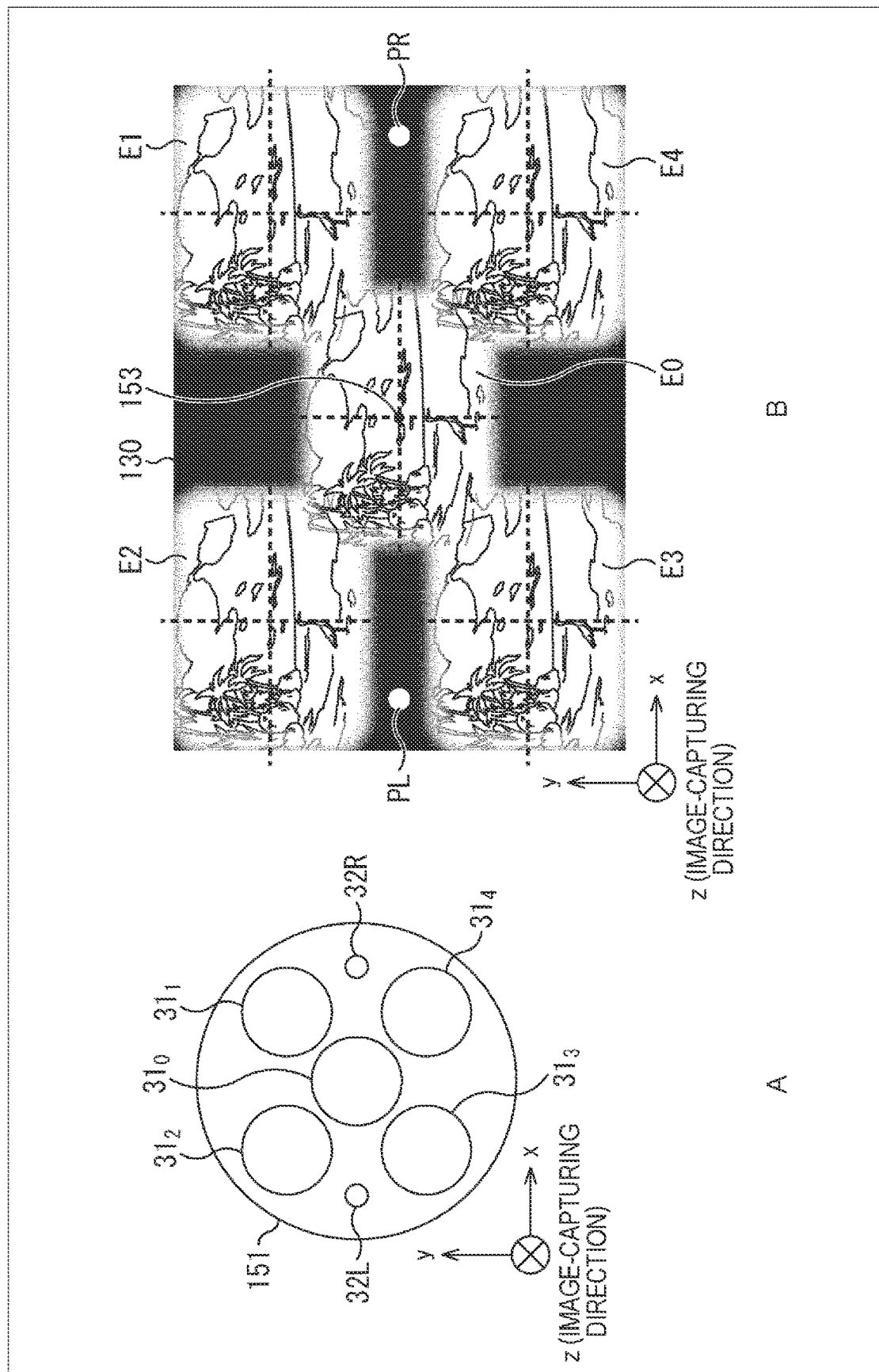
FIG. 12 is a diagram illustrating an example of an image of spotlight.

FIG. 12 illustrates an example of the arrangement of the monocular optical systems $31_0$ to $31_4$ and the light sources 32L and 32R in the lens barrel of the camera 10, and the captured image obtained by image capturing of the multi-ocular optical system 30.

In FIG. 12, the diagrammatic portion A is a rear view illustrating an example of the arrangement of the monocular optical systems $31_0$ to $31_4$ and the light sources 32L and 32R in a lens barrel 151.

In the diagrammatic portion A of FIG. 12, the monocular optical systems $31_0$ to $31_4$ are arranged in such a way that the monocular optical system $31_0$ is located at the center and the other four monocular optical systems $31_1$ to $31_4$ form vertices of the rectangle in the two-dimensional plane parallel to the light-receiving surface of the image sensor 51 as described with reference to FIG. 1.

In other words, in one example, if the monocular optical system $31_0$ of the monocular optical systems $31_0$ to $31_4$ is used as the reference, the monocular optical system $31_1$ and the monocular optical system $31_2$ are respectively arranged at the upper right and the upper left of the monocular optical system $31_0$ in FIG. 12. Furthermore, the monocular optical system $31_3$ is arranged at the lower left of the monocular optical system $31_0$, and the monocular optical system $31_4$ is arranged at the lower right of the monocular optical system $31_0$.

Further, in the diagrammatic portion A of FIG. 12, the light source 32L is arranged at the position of the left end of the lens barrel 151 with a substantially circular plane. The light source 32R is arranged at the position of the right end on the opposite side of the light source 32L with respect to the center (middle) of the lens barrel 151 with a substantially circular plane.

Moreover, the light sources 32L and 32R can be arranged at any various positions on the lens barrel 151.

However, the light sources 32L and 32R can be arranged in such a way that spotlight images PL and PR of the spotlight emitted respectively by the light sources 32L and 32R are located outside the region of the monocular image included in the captured image (outside the range where the light passing through the monocular optical system $31_1$ is illuminated), on the captured image obtained by image capturing of the image sensor 51. In this case, it is possible to prevent the spotlight image PL or PR from being overlaid on the monocular image, deteriorating the image quality of the monocular image.

In FIG. 12, the diagrammatic portion B illustrates an example of a captured image obtained by image capturing of the image sensor 51 of the camera 10 provided with the lens barrel 151 in which the monocular optical systems $31_0$ to $31_4$ and the light sources 32L and 32R are arranged as in the diagrammatic portion A of FIG. 12.

The image captured by the image sensor 51 of the camera 10 provided with the lens barrel 151 having the monocular optical systems $31_0$ to $31_4$ and the light sources 32L and 32R includes monocular images E0 to E4 and the spotlight images PL and PR. The monocular images E0 to E4 correspond to the images formed by the light rays focused by the monocular optical systems $31_0$ to $31_4$, respectively. The spotlight images PL and PR are images of the spotlight of the light sources 32L and 32R, respectively.

<Error in Mounting Positions of Multi-Ocular Optical System 30>

The mounting position of the multi-ocular optical system 30 with respect to the light-receiving surface of the image sensor 51 of the camera 10 is likely to be shifted. The error of the actual mounting position with respect to the mounting position in designing the multi-ocular optical system 30 is hereinafter referred to as a mounting error. In one example, in mounting the multi-ocular optical system 30 to the housing of the camera 10, the mounting position is likely to be shifted from the mounting position upon designing. In other words, an error is likely to occur in the mounting position of the multi-ocular optical system 30.

Further, the mounting position of the multi-ocular optical system 30 sometimes varies, for example, due to a large impact being applied to the camera 10 to which the multi-ocular optical system 30 is mounted. In other words, an error is likely to occur in the mounting position of the multi-ocular optical system 30.

In one example, in the diagrammatic portion A of FIG. 12, an error is likely to occur in at least one of the x-direction, y-direction, or z-direction of the mounting position of the multi-ocular optical system 30. In addition, in one example, an error is likely to occur in the rotation direction of the surface parallel to the image sensor 51 at the mounting position of the multi-ocular optical system 30.

In one example, in the diagrammatic portion A of FIG. 12, an error is likely to occur in at least one of the x-direction, y-direction, or z-direction of the mounting position of the multi-ocular optical system 30. In addition, in one example, an error is likely to occur in the rotation direction of the surface parallel to the image sensor 51 at the mounting position of the multi-ocular optical system 30.

In the diagrammatic portion B of FIG. 12, the monocular image E #i is an image similar to the image obtained by the image capturing with the position of the monocular optical system $31_1$ as the viewpoint. Thus, the monocular images E0 to E4 are images with different points of view.

In one example, in the case where parallax information is obtained using the monocular images E0 to E4 that are images with different viewpoints, the baseline length and the baseline angle are necessary for each of the monocular optical systems $31_0$ to $31_4$. The baseline angle varies depending on the mounting error of the multi-ocular optical system 30. Thus, the use of the monocular images E0 to E4 to obtain accurate parallax information necessitates dealing with the mounting error.

Thus, the mounting error (e.g., relative rotation error (lens rotation amount)) upon the image capturing is derived by using the spotlight images PL and PR, and the position of the entire image 130 is corrected to reduce or eliminate the mounting error.

<Case of Outputting the Entire Image>

As illustrated in the diagrammatic portion B of FIG. 12, the entire image includes the spotlight images PL and PR. Thus, in the case of outputting the entire image, the image before the correction of position is output. The entire image is associated with spotlight information, which is information regarding a spotlight image formed in a region that is not the viewpoint image of the entire image, in such a way that the correction of position can be performed later.

Figure 13:
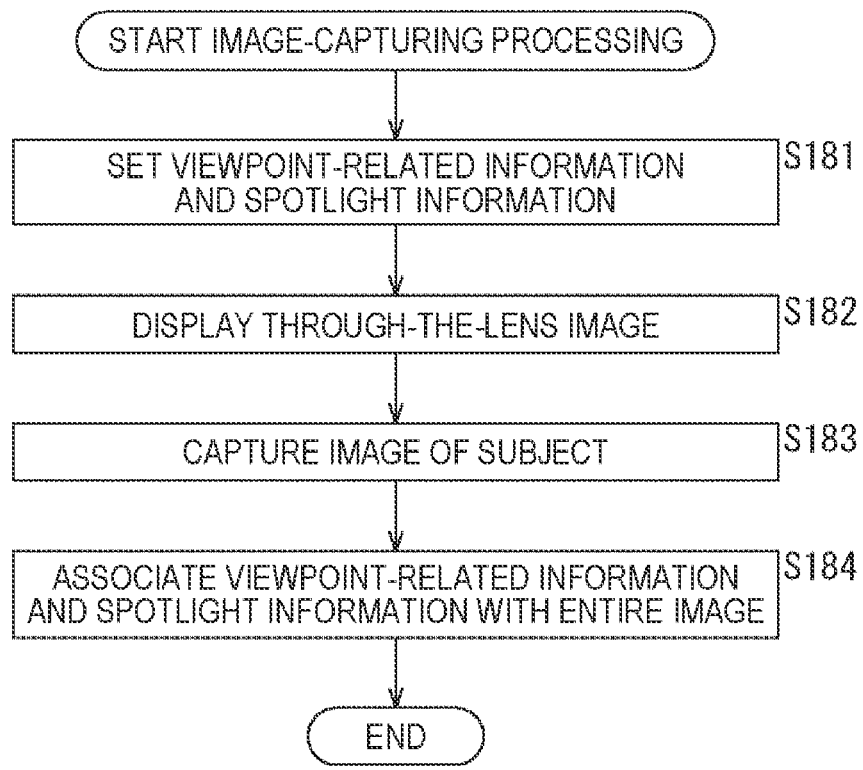
FIG. 13 is a flowchart illustrating an example of the procedure of image-capturing processing.

An example of the procedure of processing relating to the image capturing in the case described above is described with reference to the flowchart of image-capturing processing in the case of capturing a still image as illustrated in FIG. 13. In one example, in the case where the user or the like turns on the power of the camera 10 or the operation mode of the camera 10 is switched to the image-capturing mode of performing the image capturing, the image-capturing processing of FIG. 13 begins.

When the image-capturing processing begins, the control unit 81 reads out the viewpoint-related information and the spotlight information from the storage medium 83 through the storage unit 82 in step S181 and sets them in the region-specifying unit 56.

In this event, the spotlight information can be included in the viewpoint-related information. In addition, the spotlight information can include, for example, spotlight identification information used for identifying each of a plurality of spotlight images formed in the captured image.

Further, the spotlight information can include spotlight image-forming position information indicating the position of the spotlight image in the captured image. How the position of the spotlight image is indicated in the spotlight image-forming position information is optional. In one example, it can be indicated as the center coordinates of the spotlight and the magnitude of the spotlight. In other words, the spotlight image-forming position information can include information indicating the center coordinates of the spotlight and the magnitude of the spotlight in the captured image. In addition, the spotlight image-forming position information can include only the center coordinates of the spotlight in the captured image (or with no information indicating the magnitude of the spotlight). Furthermore, the spotlight image-forming position information can include two pieces of angle information of the spotlight.

In step S182, the display unit 61 displays a through-the-lens image. This processing is executed in the state before performing the image capturing to generate a captured image for recording. In other words, the display unit 61 displays the through-the-lens image in the state before the user operates the shutter button, similarly to the case of FIG. 6.

In one example, in the case where a user or the like operating the shutter button instructs the image capturing to be performed, in step S183, the image sensor 51 captures an image of a subject through the multi-ocular optical system 30 (the plurality of monocular optical systems 31). The image sensor 51 generates a captured image (entire image) in RAW format (for recording) according to the control of the control unit 81.

In one example, the region extraction unit 53 uses the entire captured image in RAW format generated by the image sensor 51 as the entire image to supply the camera signal processing unit 54. In addition, in one example, the region extraction unit 53 extracts a part of the region including all the monocular images from the captured image in RAW format generated by the image sensor 51 and supplies the camera signal processing unit 54 with it as the entire image. The camera signal processing unit 54 performs the camera signal processing on the entire image in RAW format and generates an entire image in YC format. The camera signal processing unit 54 supplies the association unit 70 (the storage unit 62, the communication unit 64, or the filing unit 65) with the entire image. In addition, the region-specifying unit 56 supplies the association unit 70 with the viewpoint-related information set in step S181 (including the spotlight information).

In step S184, the association unit 70 associates the viewpoint-related information and the spotlight information, which are set in step S181, with the entire image. In one example, the association unit 70 associates the viewpoint-related information including the spotlight information with the entire image.

In one example, the storage unit 62 can store the entire image and the viewpoint-related information (including the spotlight information) in the storage medium 63 in association with each other. In addition, the communication unit 64 can transmit the entire image and the viewpoint-related information (including the spotlight information) in association with each other. Furthermore, the filing unit 65 can associate the entire image and the viewpoint-related information (including the spotlight information) with each other by creating it as one file.

Moreover, similarly to the case of FIG. 6, the display unit 61 can display a checking image used for checking the entire image to be output.

When the processing of step S184 is completed, the image-capturing processing ends.

The captured image includes the spotlight images PL and PR, so the association of the spotlight information with the captured image as described above makes it possible to compare the position of the spotlight image detected from the captured image to the position of the spotlight image indicated by the spotlight information. Thus, it is possible to correct the captured image later on the basis of the comparison result.

<Case of Outputting Viewpoint Image>
<Case of Outputting without Position Correction>

The viewpoint image does not include the spotlight image PL and the spotlight image PR. Thus, in the case where the position correction is performed later, in addition to the viewpoint image and the viewpoint-related information, the spotlight image that is an image of the region including the spotlight image PL or the spotlight image PR can be output together with the spotlight information.

Figure 14:
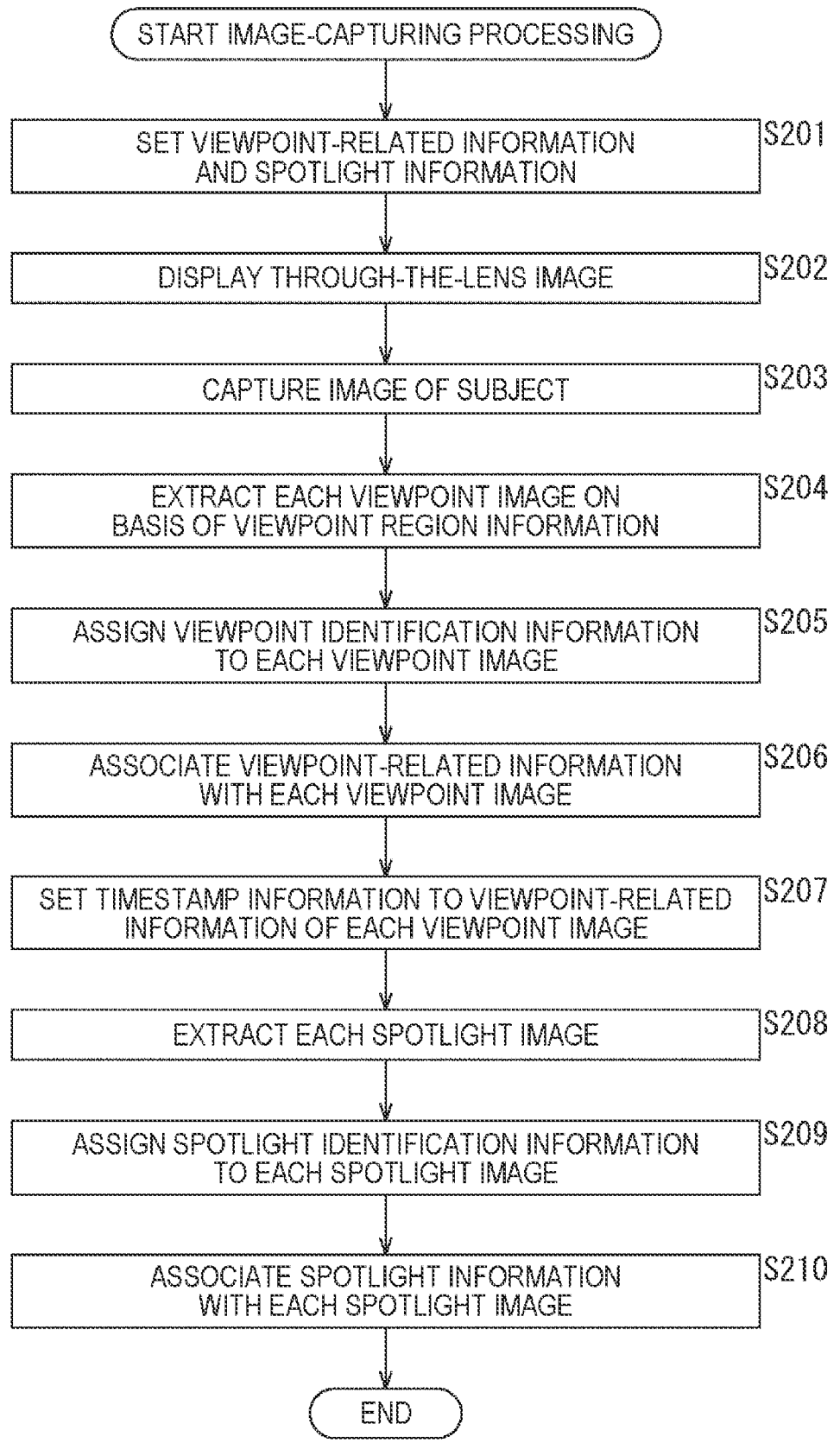
FIG. 14 is a flowchart illustrating an example of the procedure of image-capturing processing.

An example of the procedure of processing relating to the image capturing in the case described above is described with reference to the flowchart of image-capturing processing in the case of capturing a still image as illustrated in FIG. 14. In one example, in the case where the user or the like turns on the power of the camera 10 or the operation mode of the camera 10 is switched to the image-capturing mode of performing the image capturing, the image-capturing processing of FIG. 14 begins.

When the image-capturing processing begins, the control unit 81 reads out the viewpoint-related information and the spotlight information from the storage medium 83 through the storage unit 82 in step S201 and sets them in the region-specifying unit 56.

In this event, the spotlight information can be included in the viewpoint-related information. This spotlight information is similar to that described in the above item <Case of outputting the entire image>.

In step S202, the display unit 61 displays a through-the-lens image. This processing is executed in the state before performing the image capturing to generate a captured image for recording. In other words, the display unit 61 displays the through-the-lens image in the state before the user operates the shutter button, similarly to the case of FIG. 8.

In one example, in the case where a user or the like operating the shutter button instructs the image capturing to be performed, in step S203, the image sensor 51 captures an image of a subject through the multi-ocular optical system 30 (the plurality of monocular optical systems 31). The image sensor 51 generates a captured image in RAW format (for recording) according to the control of the control unit 81.

In step S204, the region extraction unit 53 extracts each viewpoint image from the captured image obtained in step S203 on the basis of the viewpoint-related information (the viewpoint region information thereof) set in the region-specifying unit 56 in step S201.

In step S205, the region extraction unit 53 assigns the viewpoint identification information (e.g., an identification number) used to identify each viewpoint image to each of the extracted viewpoint images. In one example, the viewpoint identification information is added to each viewpoint image. In other words, this processing causes the viewpoint identification information to be included in each viewpoint image.

The region extraction unit 53 supplies the camera signal processing unit 54 with each viewpoint image to which the viewpoint identification information is assigned. The camera signal processing unit 54 performs the camera signal processing on each viewpoint image in RAW format to generate each viewpoint image in YC format. As described above, the viewpoint identification information is assigned to each viewpoint image in YC format. The camera signal processing unit 54 supplies the association unit 70 (the storage unit 62, the communication unit 64, or the filing unit 65) with each viewpoint image. In addition, the region-specifying unit 56 supplies the association unit 70 with the viewpoint-related information and the spotlight information set in step S201.

In step S206, the association unit 70 associates each viewpoint image with the viewpoint-related information set in the region-specifying unit 56 in step S201. The association unit 70 associates each viewpoint image with the viewpoint-related information (the viewpoint region information thereof) using the viewpoint identification information.

In step S207, the association unit 70 sets timestamp information (the viewpoint time information), which indicates the image-capturing timing of the captured image from which the viewpoint image is extracted, in the viewpoint-related information associated with each viewpoint image in step S206. In other words, this processing causes the timestamp information to be included in the viewpoint-related information.

In step S208, the region extraction unit 53 extracts each spotlight image from the captured image on the basis of the spotlight information set in the region-specifying unit 56 in step S201.

In step S209, the region extraction unit assigns spotlight identification information (e.g., an identification number) used for identifying the spotlight to each spotlight image extracted in step S208. In one example, the spotlight identification information is added to each spotlight image. In other words, this processing allows each spotlight image to include the spotlight identification information.

In step S210, the association unit 70 associates the spotlight information of the viewpoint-related information with each spotlight image. The association unit 70 associates each spotlight image with the spotlight information by using the spotlight identification information. The spotlight information can be included in the viewpoint-related information.

When the processing of step S210 is completed, the image-capturing processing ends.

As described above, the processing executed in each step and the association of each spotlight image and each piece of spotlight information with each viewpoint image make it possible to perform position correction (e.g., rotation correction) later for each viewpoint image.

Moreover, the above description is given that the spotlight image and the spotlight information are also output in the case where the position correction (e.g., rotation correction) is not performed, but it is not limited to this example. In one example, if a position correction amount (a lens rotation amount) is known, it is possible to correct the positional shift of the viewpoint region information (the viewpoint region information can be made to correspond to the viewpoint image). In other words, instead of the spotlight image and the spotlight information, this position correction amount (the lens rotation amount) can be associated and output with the synthesized image. Moreover, it is possible to derive the position correction amount (the lens rotation amount) from the spotlight image, the spotlight information, or the like.

<Case of Outputting with Position Correction>

In the case of performing the position correction (e.g., rotation correction) on the viewpoint image, the spotlight image or the like is unnecessary after the correction. Thus, in this case, the spotlight image or the spotlight information is not output, and each viewpoint image and the viewpoint-related information associated with the viewpoint image are output in a similar manner to the case of the first embodiment.

Figure 15:
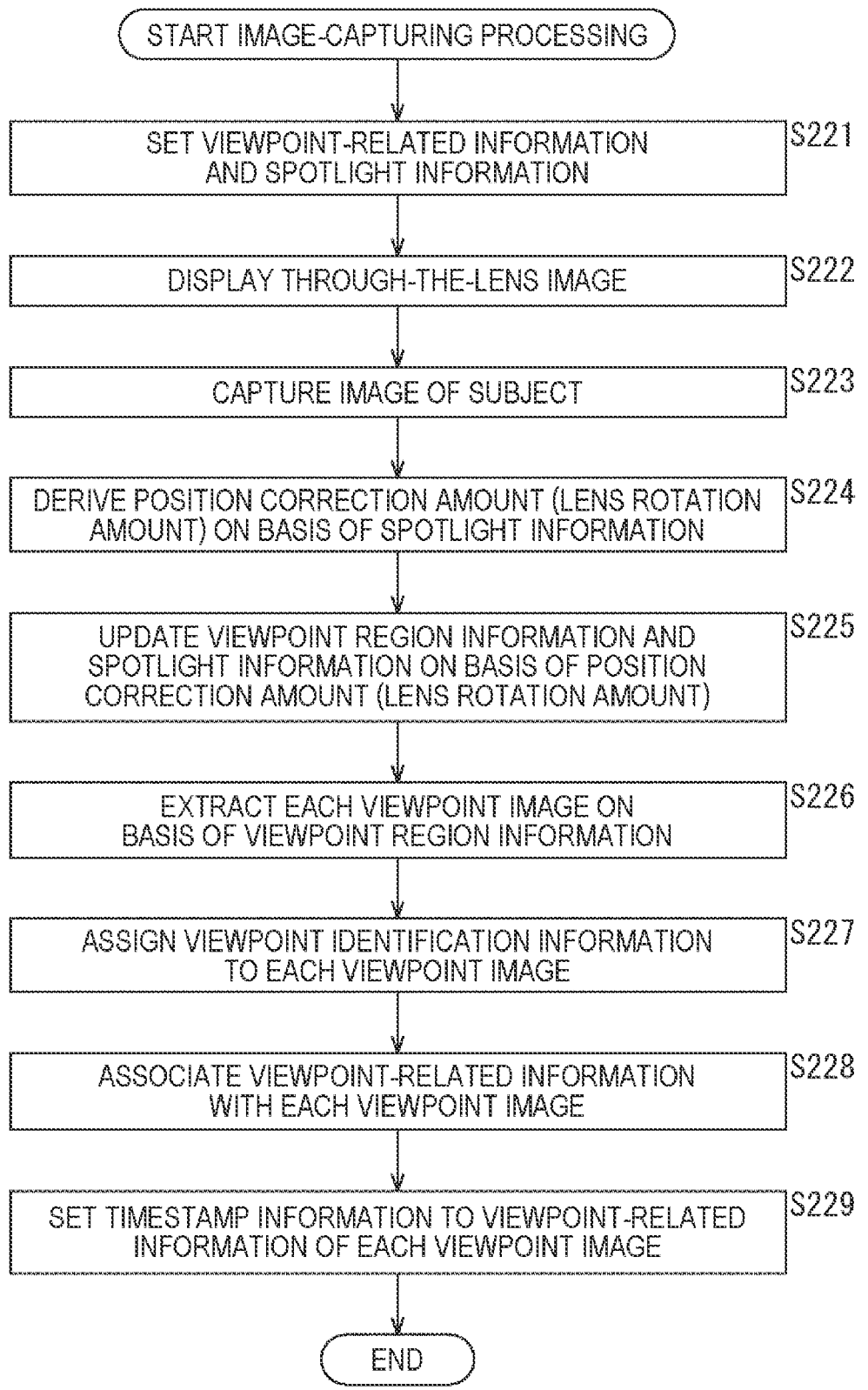
FIG. 15 is a flowchart illustrating an example of the procedure of image-capturing processing.

An example of the procedure of processing relating to the image capturing in the case described above is described with reference to the flowchart of image-capturing processing in the case of capturing a still image as illustrated in FIG. 15. In one example, in the case where the user or the like turns on the power of the camera 10 or the operation mode of the camera 10 is switched to the image-capturing mode of performing the image capturing, the image-capturing processing of FIG. 15 begins.

When the image-capturing processing begins, the control unit 81 reads out the viewpoint-related information and the spotlight information from the storage medium 83 through the storage unit 82 in step S221 and sets them in the region-specifying unit 56.

In this event, the spotlight information can be included in the viewpoint-related information. This spotlight information is similar to that described in the above item <Case of outputting the entire image> and <Case of outputting without position correction>.

In step S222, the display unit 61 displays a through-the-lens image. This processing is executed in the state before performing the image capturing to generate a captured image for recording. In other words, the display unit 61 displays the through-the-lens image in the state before the user operates the shutter button, similarly to the case of FIG. 8.

In one example, in the case where a user or the like operating the shutter button instructs the image capturing to be performed, in step S223, the image sensor 51 captures an image of a subject through the multi-ocular optical system 30 (the plurality of monocular optical systems 31). The image sensor 51 generates a captured image in RAW format (for recording) according to the control of the control unit 81.

In step S224, the region-specifying unit 56 derives the position correction amount (e.g., the lens rotation amount) on the basis of the spotlight information.

In step S225, the region-specifying unit 56 performs the position correction (e.g., rotation correction) and the updating for the viewpoint region information, on the basis of the position correction amount (e.g., the lens rotation amount).

In step S226, the region extraction unit 53 extracts each viewpoint image from the captured image generated in step S223 on the basis of the updated viewpoint region information.

In step S227, the region extraction unit 53 assigns the viewpoint identification information (e.g., an identification number) used to identify each viewpoint image to each of the extracted viewpoint images. In one example, the viewpoint identification information is added to each viewpoint image. In other words, this processing causes the viewpoint identification information to be included in each viewpoint image.

The region extraction unit 53 supplies the camera signal processing unit 54 with each viewpoint image to which the viewpoint identification information is assigned. The camera signal processing unit 54 performs the camera signal processing on each viewpoint image in RAW format to generate each viewpoint image in YC format. As described above, the viewpoint identification information is assigned to each viewpoint image in YC format. The camera signal processing unit 54 supplies the association unit 70 (the storage unit 62, the communication unit 64, or the filing unit 65) with each viewpoint image. In addition, the region-specifying unit 56 supplies the association unit 70 with the viewpoint-related information and the spotlight information set in step S221.

In step S228, the association unit 70 associates each viewpoint image with the viewpoint-related information set in the region-specifying unit 56 in step S201. The association unit 70 associates each viewpoint image with the viewpoint-related information (the viewpoint region information thereof) using the viewpoint identification information.

In step S229, the association unit 70 sets the timestamp information (the viewpoint time information) in the viewpoint-related information associated with each viewpoint image in step S206. In other words, this processing causes the timestamp information to be included in the viewpoint-related information.

When the processing of step S229 is completed, the image-capturing processing ends.

As described above, the processing executed in each step makes it possible to extract each viewpoint image, associate it with the viewpoint-related information, and output the image, after performing the position correction. Thus, it is possible to perform the image processing using the viewpoint image more easily.

<Case of Outputting Synthesized Image>
<Case of Outputting without Rotation Correction>

The synthesized image does not include the spotlight image PL and the spotlight image PR. Thus, in the case where the rotation correction is performed later, in addition to the synthesized image and the viewpoint-related information, the spotlight image that is an image of the region including the spotlight image PL or the spotlight image PR is output together with the spotlight information.

Figure 16:
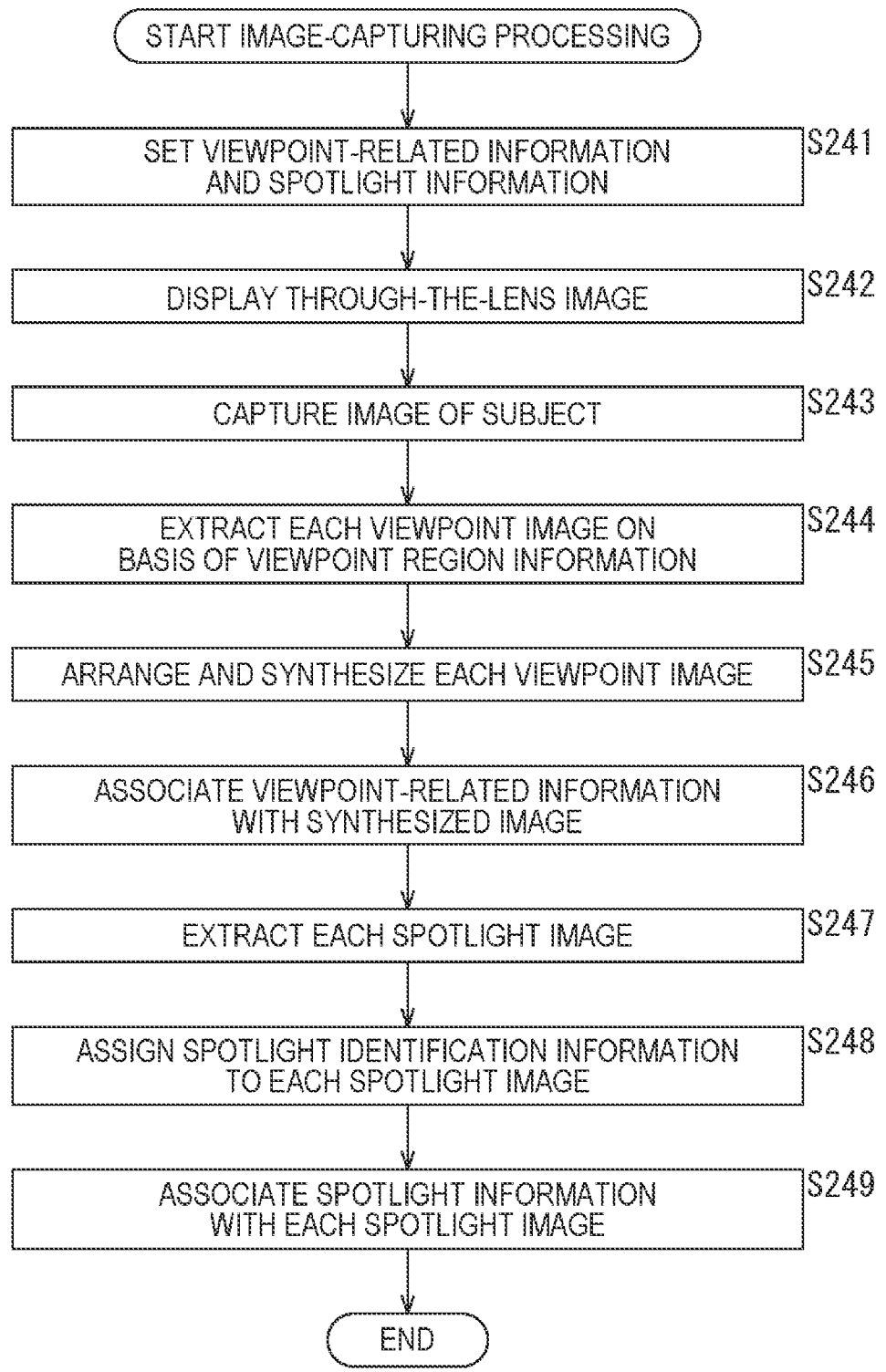
FIG. 16 is a flowchart illustrating an example of the procedure of image-capturing processing.

An example of the procedure of processing relating to the image capturing in the case described above is described with reference to the flowchart of image-capturing processing in the case of capturing a still image as illustrated in FIG. 16. In one example, in the case where the user or the like turns on the power of the camera 10 or the operation mode of the camera 10 is switched to the image-capturing mode of performing the image capturing, the image-capturing processing of FIG. 16 begins.

When the image-capturing processing begins, the control unit 81 reads out the viewpoint-related information and the spotlight information from the storage medium 83 through the storage unit 82 in step S241 and sets them in the region-specifying unit 56.

In this event, the spotlight information can be included in the viewpoint-related information. This spotlight information is similar to that described in the above item <Case of outputting the entire image> and <Case of outputting viewpoint image>.

In step S242, the display unit 61 displays a through-the-lens image. This processing is executed in the state before performing the image capturing to generate a captured image for recording. In other words, the display unit 61 displays the through-the-lens image in the state before the user operates the shutter button, similarly to the case of FIG. 10.

In one example, in the case where a user or the like operating the shutter button instructs the image capturing to be performed, in step S243, the image sensor 51 captures an image of a subject through the multi-ocular optical system 30 (the plurality of monocular optical systems 31). The image sensor 51 generates a captured image in RAW format (for recording) according to the control of the control unit 81.

In step S244, the region extraction unit 53 extracts each viewpoint image from the captured image on the basis of the viewpoint-related information (the viewpoint region information thereof) set in the region-specifying unit 56 in step S241.

In step S245, the region extraction unit 53 arranges and synthesizes each viewpoint image extracted in step S244 to generate a synthesized image.

The region extraction unit 53 supplies the camera signal processing unit 54 with the generated synthesized image. The camera signal processing unit 54 performs the camera signal processing on the synthesized RAW format image to generate a synthesized image in YC format. The camera signal processing unit 54 supplies the association unit 70 (the storage unit 62, the communication unit 64, or the filing unit 65) with the synthesized image. In addition, the region-specifying unit 56 supplies the association unit 70 with the viewpoint-related information set in step S241.

In step S246, the association unit 70 associates the synthesized image with the viewpoint-related information set in the region-specifying unit 56 in step S241.

In step S247, the region extraction unit 53 extracts each spotlight image from the captured image on the basis of the spotlight information set in the region-specifying unit 56 in step S241.

In step S248, the region extraction unit 53 assigns spotlight identification information (e.g., an identification number) used for identifying each spotlight image to each spotlight image extracted in step S247. In one example, the spotlight identification information is added to each spotlight image. In other words, this processing allows each spotlight image to include the spotlight identification information.

The region extraction unit 53 supplies the camera signal processing unit 54 with each spotlight image. The camera signal processing unit 54 performs the camera signal processing on the spotlight image in RAW format to generate a spotlight image in YC format. The camera signal processing unit 54 supplies the association unit 70 (the storage unit 62, the communication unit 64, or the filing unit 65) with the spotlight image. In addition, the region-specifying unit 56 supplies the association unit 70 with the spotlight information set in step S241.

In step S249, the association unit 70 associates the spotlight information with each spotlight image. The association unit 70 associates each spotlight image with the spotlight information by using the spotlight identification information.

When the processing of step S249 is completed, the image-capturing processing ends.

As described above, the processing executed in each step and the association of each spotlight image and each piece of spotlight information with the synthesized image make it possible to perform position correction (e.g., rotation correction) later for the synthesized image.

Moreover, the above description is given that the spotlight image and the spotlight information are also output in the case where the position correction (e.g., rotation correction) is not performed, but it is not limited to this example. In one example, if a position correction amount (a lens rotation amount) is known, it is possible to correct the positional shift of the viewpoint region information (the viewpoint region information can be made to correspond to the viewpoint image). In other words, instead of the spotlight image and the spotlight information, this position correction amount (the lens rotation amount) can be associated and output with the synthesized image. Moreover, it is possible to derive the position correction amount (the lens rotation amount) from the spotlight image, the spotlight information, or the like.

<Case of Outputting with Position Correction>

In the case of performing the position correction (e.g., rotation correction) on the synthesized image, the spotlight image or the like is unnecessary after the correction. Thus, in this case, the spotlight image or the spotlight information is not output, and the synthesized image and the viewpoint-related information associated with the synthesized image are output in a similar manner to the case of the first embodiment.

Figure 17:
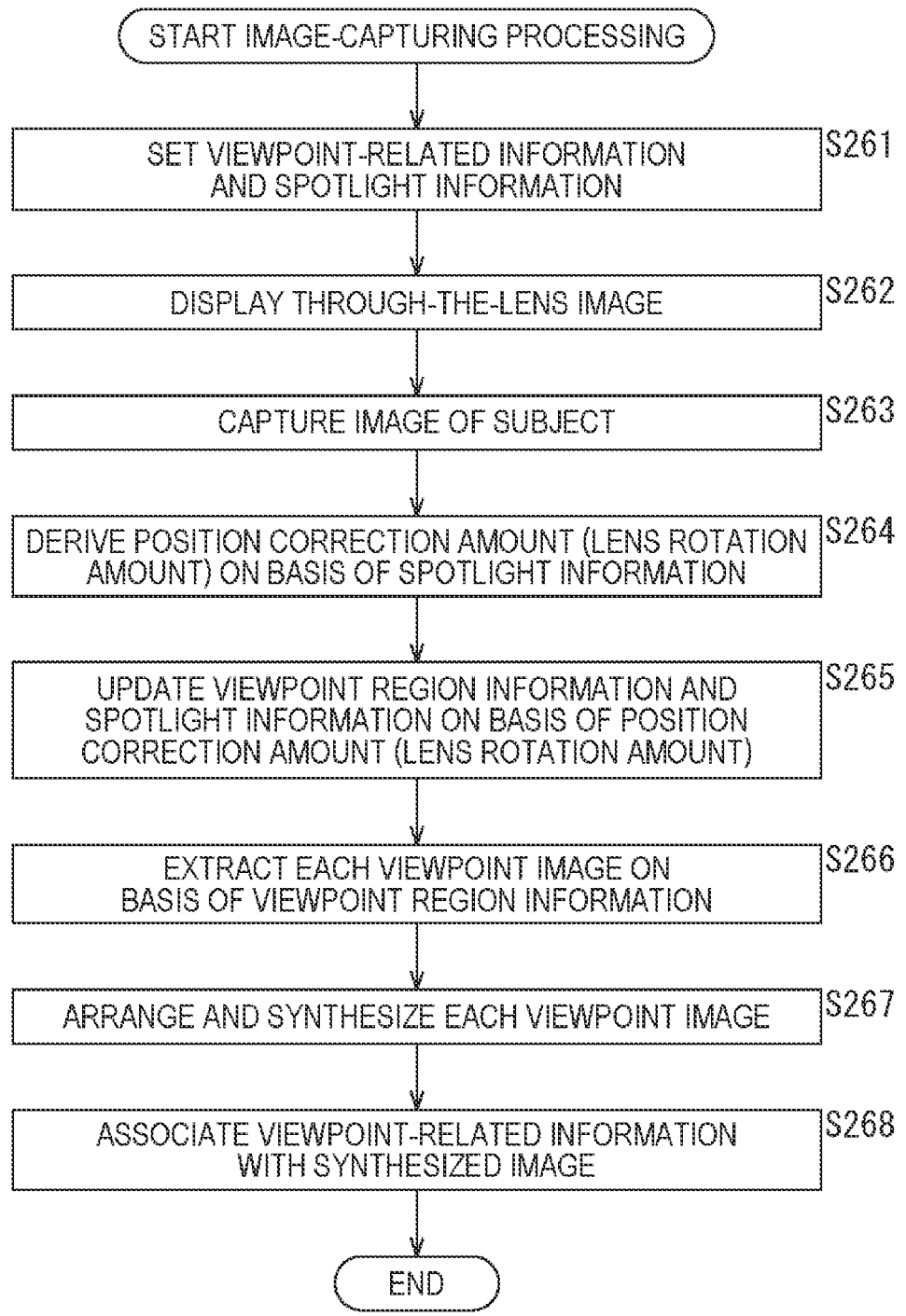
FIG. 17 is a flowchart illustrating an example of the procedure of image-capturing processing.

An example of the procedure of processing relating to the image capturing in the case described above is described with reference to the flowchart of image-capturing processing in the case of capturing a still image as illustrated in FIG. 17. In one example, in the case where the user or the like turns on the power of the camera 10 or the operation mode of the camera 10 is switched to the image-capturing mode of performing the image capturing, the image-capturing processing of FIG. 17 begins.

When the image-capturing processing begins, the control unit 81 reads out the viewpoint-related information and the spotlight information from the storage medium 83 through the storage unit 82 in step S261 and sets them in the region-specifying unit 56.

In this event, the spotlight information can be included in the viewpoint-related information. This spotlight information is similar to that described in the above item <Case of outputting the entire image> and <Case of outputting viewpoint image>.

In step S262, the display unit 61 displays a through-the-lens image. This processing is executed in the state before performing the image capturing to generate a captured image for recording. In other words, the display unit 61 displays the through-the-lens image in the state before the user operates the shutter button, similarly to the case of FIG. 10.

In one example, in the case where a user or the like operating the shutter button instructs the image capturing to be performed, in step S263, the image sensor 51 captures an image of a subject through the multi-ocular optical system 30 (the plurality of monocular optical systems 31). The image sensor 51 generates a captured image in RAW format (for recording) according to the control of the control unit 81.

In step S264, the region-specifying unit 56 derives the position correction amount (e.g., the lens rotation amount) on the basis of the spotlight information.

In step S265, the region-specifying unit 56 performs the position correction (e.g., rotation correction) and the updating for the viewpoint region information, on the basis of the position correction amount (e.g., the lens rotation amount).

In step S266, the region extraction unit 53 extracts each viewpoint image from the captured image generated in step S263 on the basis of the updated viewpoint region information.

In step S267, the region extraction unit 53 arranges and synthesizes each viewpoint image extracted to generate a synthesized image.

The region extraction unit 53 supplies the camera signal processing unit 54 with the generated synthesized image. The camera signal processing unit 54 performs the camera signal processing on the synthesized RAW format image to generate a synthesized image in YC format. The camera signal processing unit 54 supplies the association unit 70 (the storage unit 62, the communication unit 64, or the filing unit 65) with the synthesized image. In addition, the region-specifying unit 56 supplies the association unit 70 with the viewpoint-related information set in step S241.

In step S268, the association unit 70 associates the synthesized image with the viewpoint-related information set in the region-specifying unit 56 in step S261.

When the processing of step S268 is completed, the image-capturing processing ends.

As described above, the processing executed in each step makes it possible to extract each viewpoint image, generate the synthesized image, associate it with the viewpoint-related information, and output the image, after performing the position correction (the rotation correction). Thus, it is possible to perform the image processing using the synthesized image more easily.

3. Third Embodiment

<Image Processing Apparatus>

The use of the viewpoint-related information that is output as described above is now described. As described in the first embodiment or the second embodiment, in the image capturing using the multi-ocular optical system, the association and output of the entirety or a part of the captured image with the viewpoint-related information make it possible to specify the position of the viewpoint image on the light-receiving surface of the image sensor 51 after image capturing. In addition, it is possible to specify the positional relationship between the captured viewpoint images on the light-receiving surface of the image sensor 51. The clarified positional relationship between the viewpoint images makes it possible to use the positional relationship in the subsequent processing such as depth estimation by multi-ocular matching or correction of a mounting error of the multi-lens lens. In addition, it is possible to acquire an RGB image (for a color image sensor) and depth information (Depth) at the same time. Thus, applications using such RGBD are also applicable to the field of video production such as lens emulation, computer graphics (CG), and synthesis using the depth of live-action.

Figure 18:
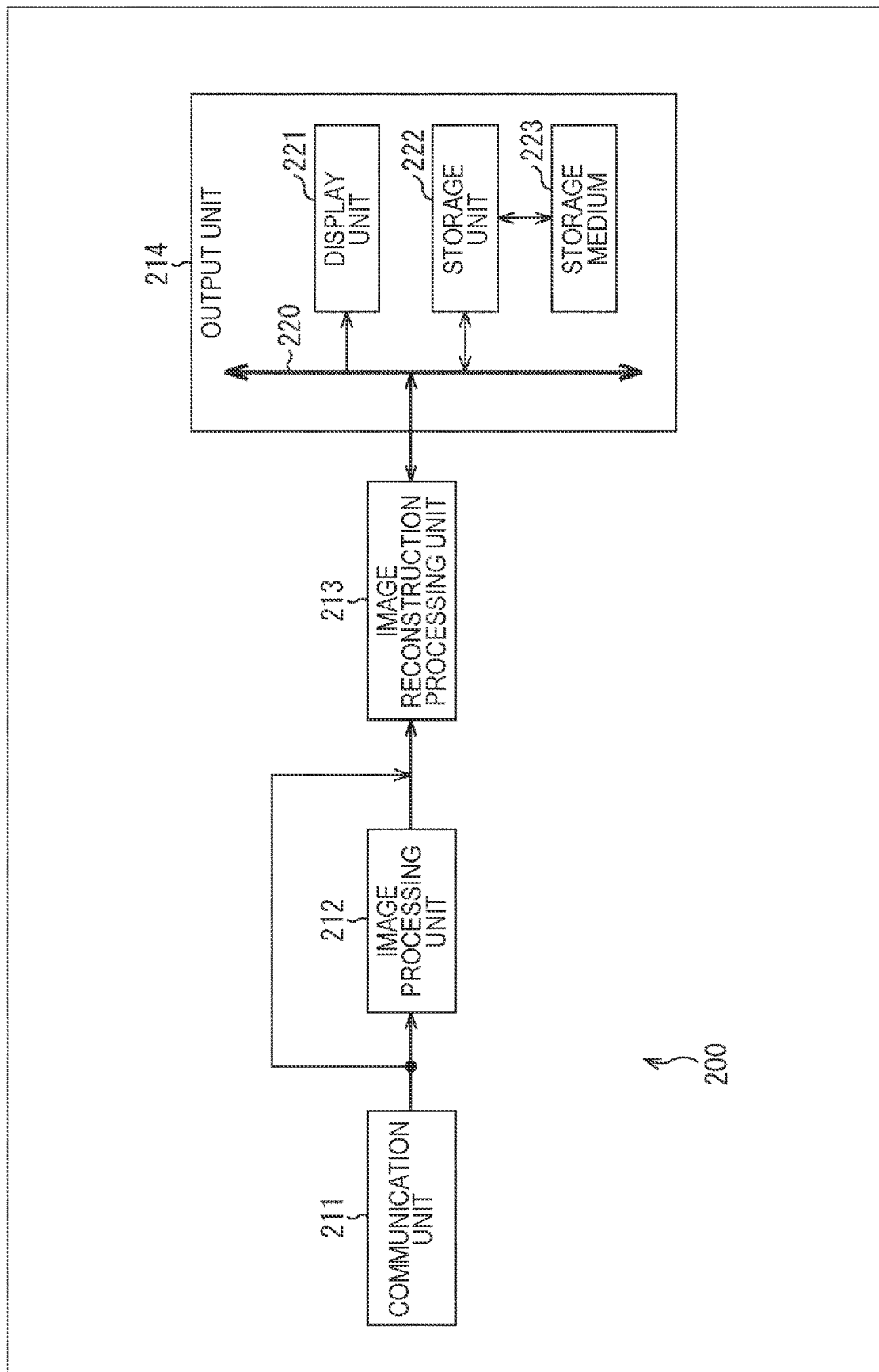
FIG. 18 is a block diagram illustrating an exemplary main configuration of an image processing apparatus.

FIG. 18 is a block diagram illustrating an exemplary main configuration of an image processing apparatus according to an embodiment to which the present technology is applied. The image processing apparatus 200 is a device that acquires an image or the like output from the camera 10 and performs image processing or the like. Moreover, the configuration illustrated in FIG. 18 can be a part of the configuration of the camera 10.

As illustrated in FIG. 18, the image processing apparatus 200 includes a communication unit 211, an image processing unit 212, an image reconstruction processing unit 213, and an output unit 214.

The communication unit 211 communicates with the communication unit 64 of the camera 10 and acquires an image (entire image, viewpoint image, or synthesized image) or the like associated with the viewpoint-related information. The communication unit 211 supplies the image processing unit 212 with the acquired image or the like. Moreover, the image (entire image, viewpoint image, or synthesized image) with which the viewpoint-related information is associated can be supplied for the image processing apparatus 200 through the recording medium. In one example, the image processing apparatus 200 can have a storage unit instead of the communication unit 211, and the storage unit can read an image from a storage medium (e.g., a removable storage medium) and supply the image processing unit 212.

The image processing unit 212 performs any image processing on the image (entire image, viewpoint image, or synthesized image) supplied from the communication unit 211. In one example, the image processing unit 212 is capable of performing image processing using the viewpoint-related information associated with the image with respect to the image supplied from the communication unit 211.

In one example, the image processing unit 212 is capable of cutting out a viewpoint image from the entire image or the synthesized image by using the viewpoint identification information, the viewpoint region information, or the like included in the viewpoint-related information. In addition, in one example, it is possible to correct the positional shift (e.g., perform the rotation correction) of each piece of the viewpoint region information. In addition, in one example, in the case where an image is compressed (encoded) and supplied, the image processing unit 212 is capable of decoding (decompressing) the encoded data by using a predetermined method corresponding to the compression (encoding) scheme.

The image processing unit 212 is capable of supplying the image reconstruction processing unit 213 with the image subjected to the image processing. Moreover, the image processing by the image processing unit can be skipped. In other words, the communication unit 211 is also capable of supplying the image reconstruction processing unit 213 with the acquired image or the like.

The image reconstruction processing unit 213 is a processing unit similar to the image reconstruction processing unit 57. The image reconstruction processing unit 213 performs, for example, image processing such as the generation of depth information or refocusing for generating (reconstructing) an image focused on any subject. In this event, the image reconstruction processing unit 213 can perform this processing using the viewpoint-related information. In one example, the image reconstruction processing unit 213 is capable of acquiring, for example, an image or the like supplied from the communication unit 211 or the image processing unit 212 and performing the processing such as the generation of depth information and refocusing with respect to the acquired image. In addition, the image reconstruction processing unit 213 is capable of acquiring an image or the like stored in a storage medium 223 through a storage unit 222 described later and performing the processing such as the generation of depth information and refocusing with respect to the acquired image. The image reconstruction processing unit 213 supplies the output unit 214 with data such as the processed image.

The output unit 214 performs processing relating to the output of the data supplied from the image reconstruction processing unit 213. The output unit 214 has, for example, a bus 220, a display unit 221, and the storage unit 222.

The bus 220 connects the display unit 221, the storage unit 222, and the image reconstruction processing unit 213 among each other. The bus 220 is used to transmit data exchanged between these processing units.

The display unit 221 is a processing unit similar to the display unit 61, and is configured with, for example, a liquid crystal panel, an organic EL panel, or the like. The display unit 221 displays, for example, a captured image, a viewpoint image, or a synthesized image supplied from the image reconstruction processing unit 213 or the storage unit 222.

The storage unit 222 controls the storage to the storage medium 223 configured with, for example, semiconductor memory or the like. The storage medium 223 can be a removable storage medium or a storage medium built in the image processing apparatus 200. In one example, the storage unit 222 is capable of causing the storage medium 223 to store the image (captured image, viewpoint image, or synthesized image) of the viewpoint-related information or the like supplied via the bus 220 in response to the user's operation, or the like.

Further, the storage unit 222 is capable of reading out an image or the like stored in the storage medium 223 and supplying the image reconstruction processing unit 213, causing to perform the generation of depth information or processing such as refocusing. Furthermore, the storage unit 222 is capable of reading out an image or the like stored in the storage medium 223 and supplying the display unit 221, causing it to be displayed.

Figure 19:
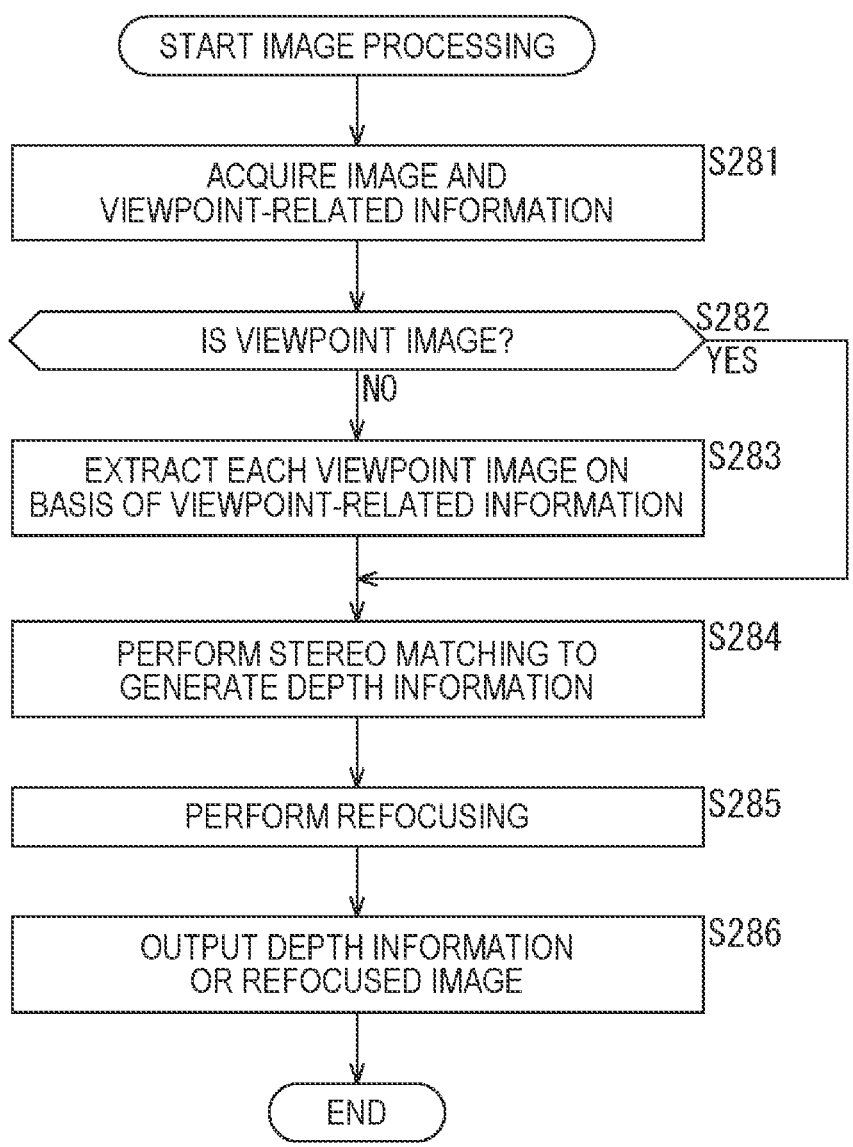
FIG. 19 is a flowchart illustrated to describe an example of the procedure of image processing.

An example of the procedure of the image processing executed by the image processing apparatus 200 as described above is described with reference to the flowchart of FIG. 19. The image processing apparatus 200, which executes the image processing, performs the image reconstruction processing on the image output from the camera 10 and performs the generation of depth information and the processing such as refocusing.

When the image processing begins, the communication unit 211 acquires the image and the viewpoint-related information associated with each other and transmitted from the camera 10 in step S281 and supplies the image processing unit 212.

The image processing unit 212 generates a viewpoint image to be subjected to the image reconstruction processing. In other words, in step S282, the image processing unit 212 determines whether or not the acquired image is a viewpoint image. In a case where it is determined that the acquired image is not a viewpoint image, that is, the acquired image is an entire image or a synthesized image, the processing proceeds to step S283.

In step S283, the image processing unit 212 extracts each viewpoint image from the entire image or the synthesized image on the basis of the viewpoint region information. When the processing of step S283 is completed, the processing proceeds to step S284.

Moreover, in a case where it is determined in step S282 that the acquired image is a viewpoint image, the processing of step S283 (extraction of viewpoint image) is omitted, and the processing proceeds to step S284. Then, the image processing unit 212 supplies the image reconstruction processing unit 213 with each viewpoint image and the viewpoint region information.

In step S284, the image reconstruction processing unit 213 performs multi-ocular matching of matching the image supplied from the image processing unit 212 at multiple viewpoints to generate depth information. In addition, in step S285, the image reconstruction processing unit 213 performs refocusing on the image supplied from the image processing unit 212.

In step S286, the output unit 214 outputs an image in which the generation of depth information and processing such as refocusing is performed in steps S284 and S285.

When the processing of step S286 is completed, the image processing ends.

As described above, the image processing apparatus 200 is capable of performing the generation of depth information or processing such as refocusing using the viewpoint-related information associated with the image. Thus, the image processing apparatus 200 is capable of performing the image processing using the viewpoint image.

Moreover, the image processing apparatus 200, which is the receiving side (decoding side) of the bit stream, is capable of correcting the viewpoint-related information or the like. In one example, the image processing unit 212 is capable of correcting the positional shift of the viewpoint region information included in the viewpoint-related information (e.g., performing the rotation correction).

Figure 20:
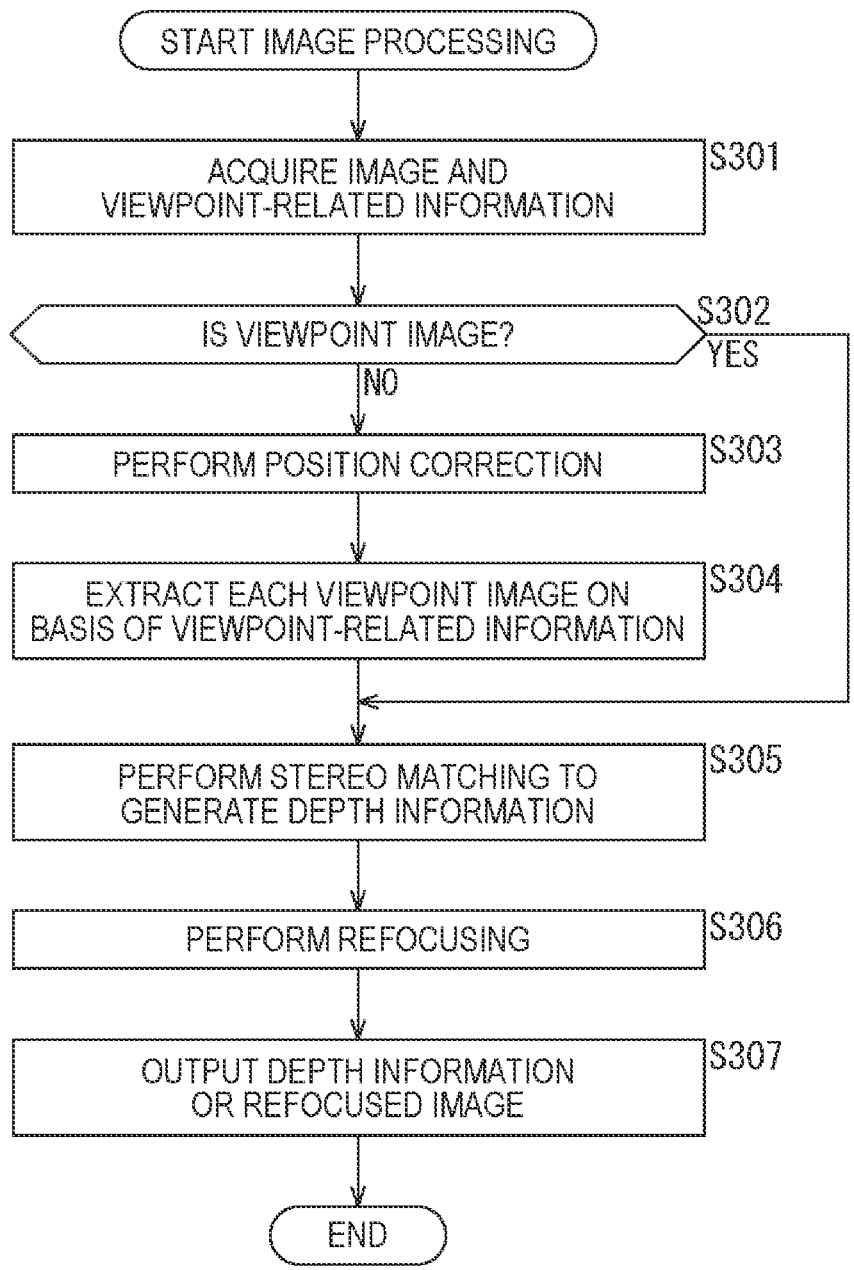
FIG. 20 is a flowchart illustrated to describe an example of the procedure of image processing.

An example of the procedure of the image processing in the case described above is described with reference to the flowchart of FIG. 20.

When the image processing begins, the communication unit 211 acquires the image and the viewpoint-related information associated with each other and transmitted from the camera 10 in step S301 and supplies the image processing unit 212.

The image processing unit 212 generates a viewpoint image to be subjected to the image reconstruction processing. In other words, in step S302, the image processing unit 212 determines whether or not the acquired image is a viewpoint image. In a case where it is determined that the acquired image is not a viewpoint image, that is, the acquired image is an entire image or a synthesized image, the processing proceeds to step S303.

In step S303, the image processing unit 212 performs position correction. In one example, the image processing unit 212 detects spotlight from the acquired image. In addition, the image processing unit 212 derives a position correction amount (e.g., a lens rotation amount) on the basis of the detected image of spotlight (i.e., the spotlight image) and the spotlight information included in the viewpoint-related information. Then, the image processing unit 212 corrects the viewpoint region information using the derived position correction amount and adjusts it to fit the image. This allows the positional shift between the viewpoint image and the viewpoint region information to be reduced.

In step S304, the image processing unit 212 extracts each viewpoint image from the entire image or the synthesized image on the basis of the viewpoint-related information. When the processing of step S304 is completed, the processing proceeds to step S305.

Moreover, in a case where it is determined in step S302 that the acquired image is a viewpoint image, the processing of step S303 and step S304 (extraction of viewpoint image) is omitted, and the processing proceeds to step S305. Then, the image processing unit 212 supplies the image reconstruction processing unit 213 with each viewpoint image and the viewpoint-related information.

In step S305, the image reconstruction processing unit 213 performs the multi-ocular matching of matching the image supplied from the image processing unit 212 with respect to the image supplied from the image processing unit 212 at multiple viewpoints to generate depth information. In addition, in step S306, the image reconstruction processing unit 213 performs refocusing on the image supplied from the image processing unit 212.

In step S307, the output unit 214 outputs an image in which the generation of depth information and processing such as refocusing is performed in steps S305 and S306.

When the processing of step S307 is completed, the image processing ends.

As described above, also in this case, the image processing apparatus 200 is capable of performing the generation of depth information or processing such as refocusing using the viewpoint-related information associated with the image. Thus, the image processing apparatus 200 is capable of performing the image processing using the viewpoint image.

4. Fourth Embodiment

<Appearance of Camera System>

Figure 21:
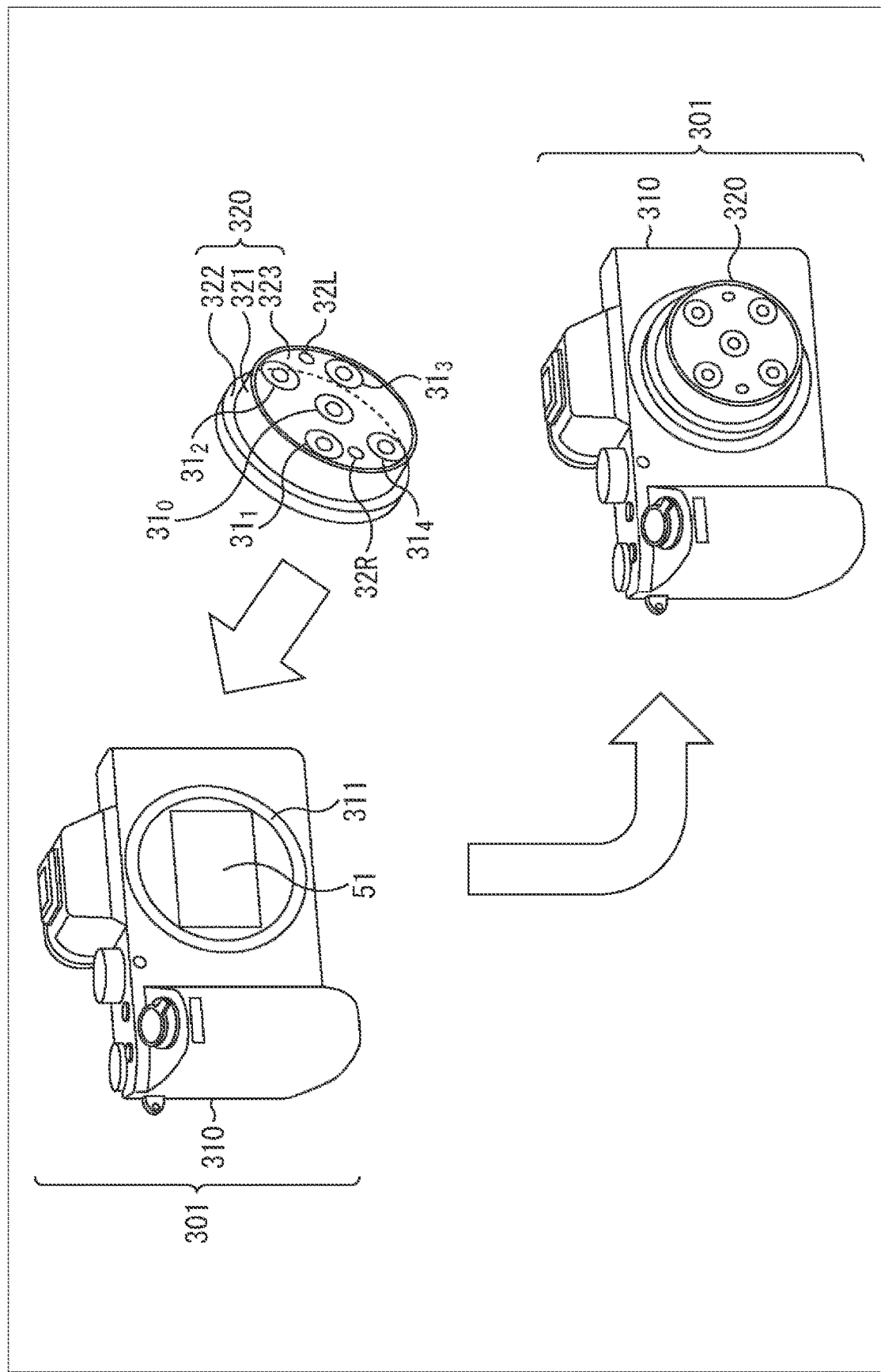
FIG. 21 is a perspective view illustrating an exemplary configuration of an embodiment of a camera system to which the present technology is applied.

The multi-ocular optical system 30 can be configured to be detachable from the camera 10. FIG. 21 is a perspective view illustrating an exemplary configuration of an embodiment of a camera system to which the present technology is applied. A camera system 301 illustrated in FIG. 21 includes a camera body $31_0$ and a multi-ocular interchangeable lens 320 (a lens unit). In a state where the multi-ocular interchangeable lens 320 is attached to the camera body $31_0$, the camera system 301 has a configuration similar to that of the camera 10 and performs basically similar processing. In other words, the camera system 301 functions as an image-capturing apparatus that captures an image of a subject and generates image data of the captured image, which is similar to the camera 10.

The camera body $31_0$ has the multi-ocular interchangeable lens 320 detachable to the camera body $31_0$. In other words, the camera body $31_0$ has a camera mount $31_1$, and the multi-ocular interchangeable lens 320 (a lens mount 322 thereof) is mounted to the camera mount $31_1$ so that the multi-ocular interchangeable lens 320 is attached to the camera body $31_0$. Moreover, a typical interchangeable lens other than the multi-ocular interchangeable lens 320 can be detachable to the camera body $31_0$.

The camera body $31_0$ has the built-in image sensor 51. The image sensor 51 captures an image of a subject by receiving light rays focused by the multi-ocular interchangeable lens 320 or other interchangeable lenses mounted on the camera body $31_0$ (the camera mount $31_1$ thereof) and by performing the photoelectric conversion.

The multi-ocular interchangeable lens 320 has a lens barrel 321 and the lens mount 322. In addition, the multi-ocular interchangeable lens 320 has five monocular optical systems $31_0$, $31_1$, $31_2$, $31_3$, and $31_4$ as plural components.

Similarly to the case of the camera 10, the plurality of monocular optical systems 31 in this case has the optical paths of light passing individually through the monocular optical systems independent of each other. In other words, different positions on a light-receiving surface (e.g., an effective pixel region) of the image sensor 51 are irradiated with the light passing through the corresponding monocular optical system 31, without being incident on the other monocular optical system 31. Optical axes of the monocular optical system 31 are located at least at different positions on the light-receiving surface of the image sensor 51, and different positions on the light-receiving surface of the image sensor 51 are irradiated with at least a part of the light rays passing through each monocular optical system 31.

Thus, similarly to the case of the camera 10, in the captured image generated by the image sensor 51 (the entire image output by the image sensor 51), the subject's images formed through the respective monocular optical systems 31 are formed at different positions. Specifically, from the captured image, a captured image in which each monocular optical system 31 is used as a viewpoint (also referred to as a viewpoint image) is obtained. In other words, attaching the multi-ocular interchangeable lens 320 to the camera body 310 and capturing an image of the subject make it possible to obtain a plurality of viewpoint images.

The lens barrel 321 has a substantially cylindrical shape, and the lens mount 322 is formed on one bottom surface side of the cylindrical shape. The lens mount 322 is mounted on the camera mount 311 of the camera body 310 when the multi-ocular interchangeable lens 320 is attached to the camera body 310.

The five monocular optical systems 31 are provided on a two-dimensional plane orthogonal to the optical axis of a lens barrel (parallel to the light-receiving surface (image-capturing surface) of the image sensor 51). These optical systems are arranged in the multi-ocular interchangeable lens 320 in such a way that the monocular optical system $31_0$ is located at the center (center of gravity) and the other four monocular optical systems $31_1$ to $31_4$ form rectangular vertices. Of course, the arrangement illustrated in FIG. 21 is merely illustrative, and the positional relationship between the monocular optical systems 31 is optional as long as the optical paths are independent of each other.

<Exemplary Electrical Configuration of Camera System>

Figure 22:
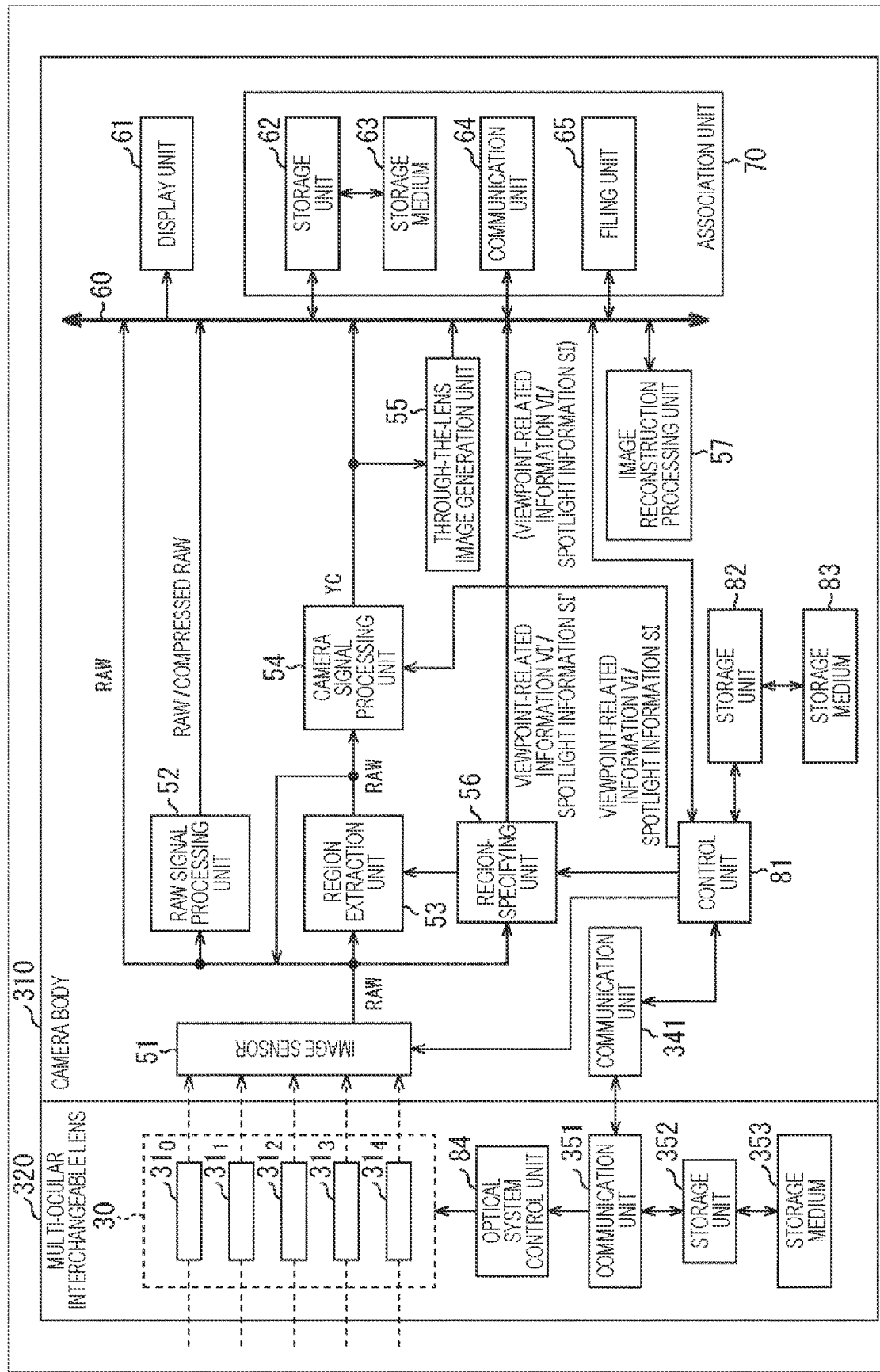
FIG. 22 is a block diagram illustrating an exemplary electrical configuration of a camera system.

FIG. 22 is a block diagram illustrating an exemplary electrical configuration of a camera system 301 in FIG. 21.

<Camera Body>

In the camera system 301, the camera body 310 includes an image sensor 51, a RAW signal processing unit 52, a region extraction unit 53, a camera signal processing unit 54, a through-the-lens image generation unit 55, a region-specifying unit 56, an image reconstruction processing unit 57, a bus 60, a display unit 61, a storage unit 62, a communication unit 64, a filing unit 65, a control unit 81, and a storage unit 82. In other words, the camera body 310 has the configuration other than the multi-ocular optical system 30 and the optical system control unit 84 provided in the lens barrel portion of the camera 10.

Moreover, the camera body 310 has a communication unit 341 in addition to the components described above. The communication unit 341 is a processing unit that communicates with the multi-ocular interchangeable lens 320 (a communication unit 351 thereof) that is correctly mounted on the camera body 310 to exchange information or the like. The communication unit 341 is capable of communicating with the multi-ocular interchangeable lens 320 by any communication scheme. In this case, the communication can be wired communication or wireless communication.

In one example, the communication unit 341 performs the communication under the control of the control unit 81 and acquires the information supplied from the multi-ocular interchangeable lens 320. In addition, in one example, the communication unit 341 performs the communication to supply the multi-ocular interchangeable lens 320 with the information supplied from the control unit 81. The information exchanged with the multi-ocular interchangeable lens 320 is optional. In one example, it can be data or control information such as a command or a control parameter.

<Multi-Ocular Interchangeable Lens>

In the camera system 301, the multi-ocular interchangeable lens 320 has the communication unit 351 and a storage unit 352 in addition to the multi-ocular optical system 30 and the optical system control unit 84. The communication unit 351 communicates with the communication unit 341 in the multi-ocular interchangeable lens 320 correctly attached to the camera body 310. Such communication allows the exchange of information between the camera body 310 and the multi-ocular interchangeable lens 320. The communication scheme of the communication unit 351 is optional and can be wired communication or wireless communication. In addition, the information exchanged by this communication can be data or control information such as a command and a control parameter.

In one example, the communication unit 351 acquires the control information transmitted from the camera body 310 through the communication unit 341. The communication unit 351 is capable of supplying the optical system control unit 84 with the information acquired in this way, if necessary, for causing it to be used for controlling the multi-ocular optical system 30.

Further, the communication unit 351 is capable of supplying the storage unit 352 with the acquired information, causing it to be stored in the storage medium 353. In addition, the communication unit 351 is capable of reading out the information stored in the storage medium 353 through the storage unit 352 and transmitting it to the camera body 310 (the communication unit 341 thereof).

<Example 1 of Storing Viewpoint-Related Information>

In the camera system 301 having such a configuration, the storage location of the viewpoint-related information corresponding to the multi-ocular interchangeable lens 320 (i.e., the multi-ocular optical system 30) is optional. In one example, it can be stored in the storage medium 353 of the multi-ocular interchangeable lens 320. Then, for example, the control unit 81 of the camera body 310 can access the storage unit 352 through the communication unit 351 and the communication unit 341 and can cause the storage unit 352 to read the viewpoint-related information from the storage medium 353. Then, the control unit 81, when acquiring the viewpoint-related information, can supply the region-specifying unit 56 with the viewpoint-related information, causing it to be set.

In one example, in attaching correctly the multi-ocular interchangeable lens 320 to the camera body 310, at any timing or trigger prior to the image capturing, such as the case where the power of the camera system 301 is turned on or the case where the operation mode of the camera system 301 is switched to the image-capturing mode capable of capturing an image of a subject, such processing can be performed.

By doing so, the camera body 310 is capable of performing the image processing using the viewpoint image by the use of the viewpoint-related information corresponding to the multi-ocular interchangeable lens 320 (i.e., the multi-ocular optical system 30).

<Example 2 of Storing Viewpoint-Related Information>

Further, the control unit 81 supplies the storage unit 82 with the viewpoint-related information of the multi-ocular interchangeable lens 320 acquired from the multi-ocular interchangeable lens 320, causing it to be stored, together with the identification information (hereinafter referred to as ID) of the multi-ocular interchangeable lens 320. In this case, the storage unit 82 stores the supplied identification information and viewpoint-related information in the storage medium 83 in association with each other. In other words, the camera body 310 is capable of managing the viewpoint-related information and an ID of the multi-ocular interchangeable lens 320. Thus, the camera body 310 is capable of managing the viewpoint-related information of the plurality of multi-ocular interchangeable lenses 320.

By doing so, from the next time, the control unit 81, when acquiring an ID of the multi-ocular interchangeable lens 320, is capable of reading out the viewpoint-related information corresponding to the ID from the storage unit 82 (the storage medium 83). In other words, it is possible for the control unit 81 to acquire easily the viewpoint-related information corresponding to the multi-ocular interchangeable lens 320.

<Example 3 of Storing Viewpoint-Related Information>

Further, the storage medium 83 can store the viewpoint-related information of the plurality of multi-ocular interchangeable lenses 320 in advance in association with the ID of the multi-ocular interchangeable lens 320. In other words, in this case, the camera body 310 manages the viewpoint-related information of the plurality of multi-ocular interchangeable lenses 320 in advance.

By doing so, the control unit 81 is capable of easily reading out the viewpoint-related information corresponding to the ID from the storage unit 82 (the storage medium 83) by using the ID of the multi-ocular interchangeable lens 320 correctly mounted on the camera body 310.

5. Additional Remark

<Computer>

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 23:
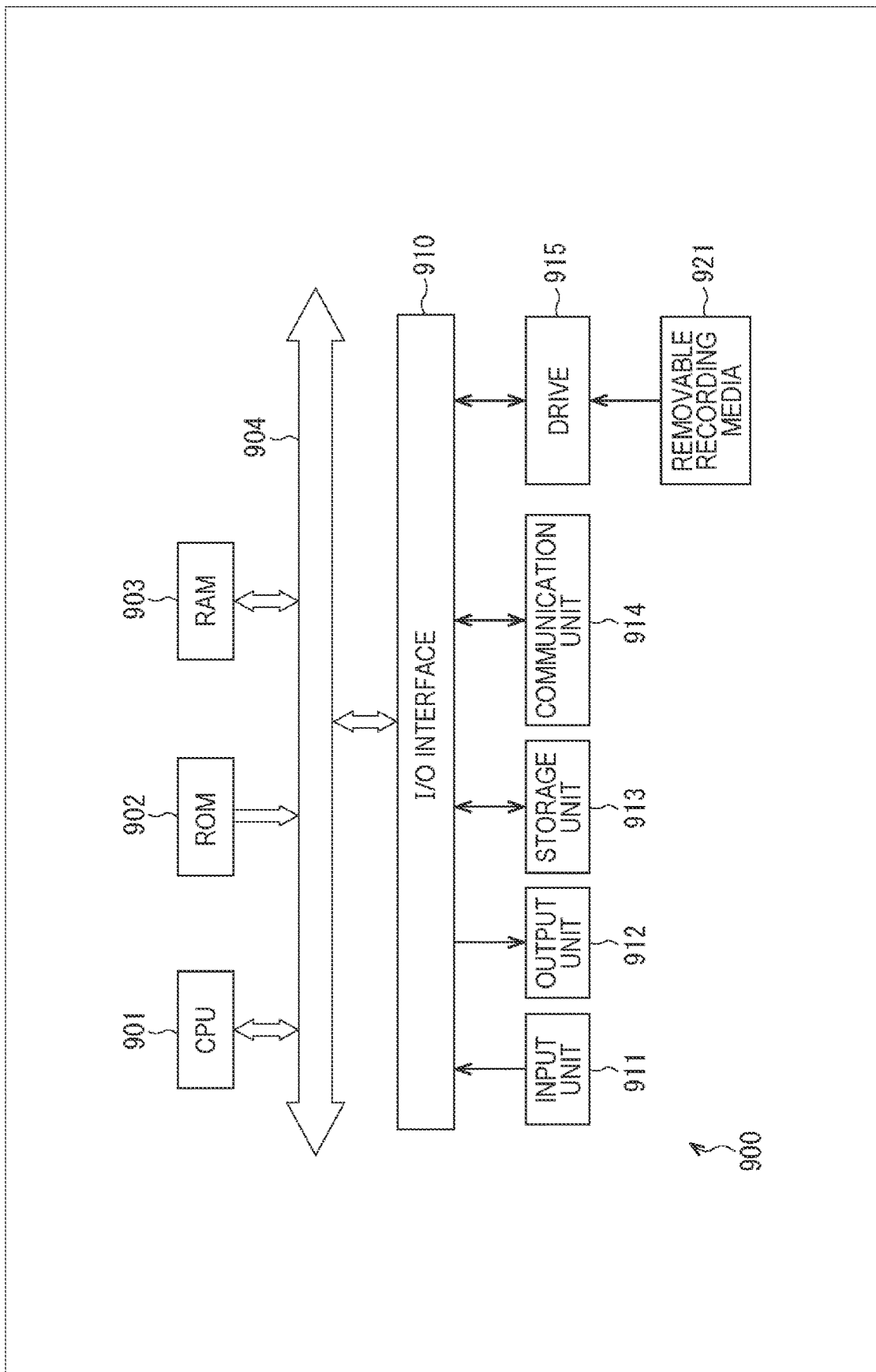
FIG. 23 is a block diagram illustrating an exemplary main configuration of a computer.

FIG. 23 is a block diagram illustrating an exemplary hardware configuration of a computer that executes the series of processes described above according to a program.

In the computer 900 illustrated in FIG. 23, a central processing unit (CPU) 901, read-only memory (ROM) 902, and random access memory (RAM) 903 are interconnected through a bus 904.

Additionally, an input/output interface 910 is also connected to the bus 904. An input unit 911, an output unit 912, a storage unit 913, a communication unit 914, and a drive 915 are connected to the input/output interface 910.

The input unit 911 includes a keyboard, a mouse, a microphone, a touch panel, an input terminal, and the like, for example. The output unit 912 includes a display, a speaker, an output terminal, and the like, for example. The storage unit 913 includes a hard disk, a RAM disk, non-volatile memory, and the like, for example. The communication unit 914 includes a network interface, for example. The drive 915 drives a removable medium 921 such as a magnetic disk, an optical disc, a magneto-optical disc, or semiconductor memory.

In a computer configured as above, the series of processes described above are performed by having the CPU 901 load a program stored in the storage unit 913 into the RAM 903 via the input/output interface 910 and the bus 904, and execute the program, for example. Additionally, data required for the CPU 901 to execute various processes and the like is also stored in the RAM 903 as appropriate.

The program executed by the computer may be applied by being recorded onto the removable medium 921 as an instance of packaged media or the like, for example. In this case, the program may be installed in the storage unit 913 via the input/output interface 910 by inserting the removable medium 921 into the drive 915.

In addition, the program may also be provided via a wired or wireless transmission medium such as a local area network, the Internet, or digital satellite broadcasting. In this case, the program may be received by the communication unit 914 and installed in the storage unit 913.

Otherwise, the program may also be preinstalled in the ROM 902 or the storage unit 913.

<Application Target of Present Technology>

The present technology can be applied to an arbitrary configuration. For example, the present technology can also be executed as any configuration mounted on an apparatus included in an arbitrary apparatus or system such as a processor serving as a system large scale integration (LSI) or the like, a module that uses a plurality of processors or the like, a unit that uses a plurality of modules or the like, or a set obtained by further adding another function to a unit, or the like.

Further, in one example, the present technology is applicable to a network system having a plurality of devices. In one example, the present technology is implementable as cloud computing in which a plurality of devices performs processing in a sharing or joint manner over a network. In one example, the present technology is implementable in a cloud service in which the services are delivered to any terminals such as computers, portable information processing terminals, and Internet of things (IoT) devices.

Note that in this specification, a system means a set of a plurality of constituent elements (e.g., devices or modules (parts)), regardless of whether or not all the constituent elements are in the same housing. Accordingly, a plurality of devices that is contained in different housings and connected via a network and one device in which a plurality of modules is contained in one housing are both systems.

<Field and Application to which Present Technology is Applied>

Note that a system, an apparatus, a processing unit, or the like to which the present technology is applied can be used in an arbitrary field such as, for example, transportation, a medical field, crime prevention, an agriculture industry, a livestock industry, a mining industry, a beauty industry, an industrial plant, home electronics, a weather field, and nature monitoring. Furthermore, the use application of the system, the apparatus, the processing unit, or the like may be any use application.

<Others>

Embodiments of the present technology are not limited to the above described embodiments, and various modifications can be made to them without departing from the scope of the present technology.

Further, for example, an element described as a single device (or processing unit) may be divided and configured as a plurality of devices (or processing units). Conversely, elements described as a plurality of devices (or processing units) above may be configured collectively as a single device (or processing unit). Further, an element other than those described above may be added to the configuration of each device (or processing unit). Furthermore, a part of the configuration of a given device (or processing unit) may be included in the configuration of another device (or another processing unit) as long as the configuration or operation of the system as a whole is substantially the same.

In addition, for example, the program described above can be executed in any device. In this case, it is sufficient if the device has a necessary function (functional block or the like) and can obtain necessary information.

In addition, for example, each step of one flowchart can be executed by one device or executed by being allocated to a plurality of devices. Furthermore, in the case where a plurality of processes is included in one step, the plurality of processes can be executed by one device or executed by being allocated to a plurality of devices. In other words, a plurality of processes included in one step can be executed as a plurality of steps. In contrast, processes described as a plurality of steps can also be collectively executed as one step.

Further, for example, in a program executed by a computer, processing in steps describing the program may be executed chronologically along the order described in this specification, or may be executed concurrently, or individually at necessary timing such as when a call is made. In other words, unless otherwise a contradiction arises, the processes in the respective steps may be executed in an order different from the above-described order. Furthermore, processing in steps describing the program may be executed concurrently with processing of another program, or may be executed in combination with processing of another program.

Further, for example, the plurality of technologies according to the present technology can be performed alone independently of each other, unless a contradiction arises. Of course, any plurality of the present technologies can be performed in combination. In one example, a part or whole of the present technology described in any of the embodiments can be performed in combination with a part or whole of the present technology described in another embodiment. In addition, a part or whole of any of the present technologies described above can be performed in combination with another technology that is not described above.

Additionally, the present technology may also be configured as below.

(1) An image-capturing apparatus including:
an association unit configured to associate viewpoint-related information with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

(2) The image-capturing apparatus according to (1), in which
the viewpoint-related information includes viewpoint region information indicating the region of the plurality of viewpoint images in the captured image.

(3) The image-capturing apparatus according to (2), in which
the viewpoint region information includes coordinates corresponding to an optical axis of the monocular optical system in the captured image and resolution of the viewpoint image.

(4) The image-capturing apparatus according to any one of (1) to (3), in which
the viewpoint-related information includes cutout region-specifying information indicating a partial region cut out from the viewpoint image.

(5) The image-capturing apparatus according to any one of (1) to (4), in which
the viewpoint-related information includes viewpoint identification information used to identify each of the plurality of viewpoint images extracted from the captured image in a case where the viewpoint-related information is associated with the plurality of viewpoint images or the synthesized image.

(6) The image-capturing apparatus according to any one of (1) to (5), in which
the viewpoint-related information includes viewpoint time information indicating a time when the captured image is captured in a case where the viewpoint-related information is associated with the plurality of viewpoint images.

(7) The image-capturing apparatus according to any one of (1) to (5), in which
at least one of the captured image, the viewpoint image, or the synthesized image is a RAW image.

(8) The image-capturing apparatus according to any one of (1) to (7), in which
at least one of the captured image, the viewpoint image, or the synthesized image is a YC image.

(9) The image-capturing apparatus according to any one of (1) to (8), in which
the association unit associates spotlight information with the captured image, the plurality of viewpoint images, or the synthesized image, the spotlight information being related to an image of spotlight formed in a region of the captured image that is not the plurality of viewpoint images.

(10) The image-capturing apparatus according to (9), in which
the spotlight information includes spotlight identification information used to identify each of a plurality of the images of spotlight formed in the captured image.

(11) The image-capturing apparatus according to (9) or (10), in which
the spotlight information includes spotlight image-forming position information indicating a position of the image of spotlight in the captured image.

(12) The image-capturing apparatus according to any one of (9) to (11), in which
the association unit extracts a spotlight image that is an image of a region including the spotlight from the captured image and associates the spotlight image with the plurality of viewpoint images or the synthesized image to which the spotlight information is associated.

(13) The image-capturing apparatus according to any one of (1) to (12), in which
the association unit uses an image of spotlight formed in a region of the captured image that is not the plurality of viewpoint images to perform rotation correction on the captured image and associates the viewpoint-related information with the captured image subjected to the rotation correction, the plurality of viewpoint images extracted from the captured image subjected to the rotation correction, or the synthesized image obtained by synthesizing the plurality of viewpoint images extracted from the captured image subjected to the rotation correction.

(14) The image-capturing apparatus according to any one of (1) to (13), further including:
a storage unit configured to store the captured image, the plurality of viewpoint images, or the synthesized image and the viewpoint-related information in association with each other by the association unit.

(15) The image-capturing apparatus according to any one of (1) to (14), further including:

a communication unit configured to communicate with another device and transmit the captured image, the plurality of viewpoint images, or the synthesized image and the viewpoint-related information in association with each other by the association unit to the another device.

(16) The image-capturing apparatus according to any one of (1) to (15), further including:

an image reconstruction processing unit configured to perform image reconstruction processing using the viewpoint-related information and the plurality of viewpoint images.

(17) The image-capturing apparatus according to any one of (1) to (16), further including:

a selection unit configured to select any of the captured image, the plurality of viewpoint images, or the synthesized image to be associated with the viewpoint-related information, in which the association unit associates the viewpoint-related information with an image selected by the selection unit among the captured image, the plurality of viewpoint images, and the synthesized image.

(18) The image-capturing apparatus according to any one of (1) to (17), further including:

an image-capturing unit configured to capture the subject's image through the plurality of monocular optical systems with the optical paths independent of each other to generate the captured image, in which the association unit associates the viewpoint-related information with the captured image generated by the image-capturing unit, the plurality of viewpoint images extracted from the captured image generated by the image-capturing unit, or the synthesized image obtained by synthesizing the plurality of viewpoint images extracted from the captured image generated by the image-capturing unit.

(19) An information processing method including:

associating viewpoint-related information with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

(20) A program causing a computer to function as:

an association unit configured to associate viewpoint-related information with a captured image, a plurality of viewpoint images, or a synthesized image, the captured image being generated by capturing an image of a subject with a single image sensor through a plurality of monocular optical systems with optical paths independent of each other, the plurality of viewpoint images being extracted from the captured image and having each of the plurality of monocular optical systems as a viewpoint, the synthesized image being obtained by synthesizing the plurality of viewpoint images respectively corresponding to the plurality of monocular optical systems, and the viewpoint-related information being used to specify a region of the plurality of viewpoint images in the captured image.

REFERENCE SIGNS LIST

10 Camera
30 Multi-ocular optical system
31 Monocular optical systems
51 Image sensor
52 RAW signal processing unit
53 Region extraction unit
54 Camera signal processing unit
55 Through-the-lens image generation unit
56 Region-specifying unit
57 Image reconstruction processing unit
60 Bus
61 Display unit
62 Storage unit
63 Storage medium
64 Communication unit
65 Filing unit
70 Association unit
81 Control unit
82 Storage unit
83 Storage medium
84 High price control unit
200 Image processing apparatus
211 Communication unit
212 Image processing unit
213 Image reconstruction processing unit
214 Output unit
220 Bus
221 Display unit
222 Storage unit
223 Storage medium
301 Camera system
310 Camera body
320 Multi-ocular interchangeable lens
341 Communication unit
351 Communication unit
352 Storage unit
353 Storage medium

The invention claimed is:

1. An image-capturing apparatus comprising:
an association unit configured to associate viewpoint-related information with a captured image generated by capturing an image of a subject with a single image sensor through a plurality of monocular optical systems with optical paths independent of each other, a plurality of viewpoint images extracted from the captured image and having each of the plurality of monocular optical systems as a viewpoint, or a synthesized image obtained by synthesizing the plurality of viewpoint images respectively corresponding to the plurality of monocular optical systems,
wherein the viewpoint-related information is used to specify a region of the plurality of viewpoint images in the captured image, and
the association unit associates spotlight information with the captured image, the plurality of viewpoint images, or the synthesized image, the spotlight information being related to an image of spotlight formed in a region of the captured image that is not the plurality of viewpoint images.

2. The image-capturing apparatus according to claim 1, wherein
the viewpoint-related information includes viewpoint region information indicating the region of the plurality of viewpoint images in the captured image.

3. The image-capturing apparatus according to claim 2, wherein
the viewpoint region information includes coordinates corresponding to an optical axis of the monocular optical system in the captured image and resolution of the viewpoint image.

4. The image-capturing apparatus according to claim 1, wherein
the viewpoint-related information includes cutout region-specifying information indicating a partial region cut out from the viewpoint image.

5. The image-capturing apparatus according to claim 1, wherein
the viewpoint-related information includes viewpoint identification information used to identify each of the plurality of viewpoint images extracted from the captured image in a case where the viewpoint-related information is associated with the plurality of viewpoint images or the synthesized image.

6. The image-capturing apparatus according to claim 1, wherein
the viewpoint-related information includes viewpoint time information indicating a time when the captured image is captured in a case where the viewpoint-related information is associated with the plurality of viewpoint images.

7. The image-capturing apparatus according to claim 1, wherein
at least one of the captured image, the viewpoint image, or the synthesized image is a RAW image.

8. The image-capturing apparatus according to claim 1, wherein
at least one of the captured image, the viewpoint image, or the synthesized image is a YC image.

9. The image-capturing apparatus according to claim 1, wherein
the spotlight information includes spotlight identification information used to identify each of a plurality of the images of spotlight formed in the captured image.

10. The image-capturing apparatus according to claim 1, wherein
the spotlight information includes spotlight image-forming position information indicating a position of the image of spotlight in the captured image.

11. The image-capturing apparatus according to claim 1, wherein
the association unit extracts a spotlight image that is an image of a region including the spotlight from the captured image and associates the spotlight image with the plurality of viewpoint images or the synthesized image to which the spotlight information is associated.

12. The image-capturing apparatus according to claim 1, wherein
the association unit uses an image of spotlight formed in a region of the captured image that is not the plurality of viewpoint images to perform rotation correction on the captured image and associates the viewpoint-related information with the captured image subjected to the rotation correction, the plurality of viewpoint images extracted from the captured image subjected to the rotation correction, or the synthesized image obtained by synthesizing the plurality of viewpoint images extracted from the captured image subjected to the rotation correction.

13. The image-capturing apparatus according to claim 1, further comprising:
a memory configured to store the captured image, the plurality of viewpoint images, or the synthesized image and the viewpoint-related information in association with each other by the association unit.

14. The image-capturing apparatus according to claim 1, further comprising:
communication circuitry configured to communicate with another device and transmit the captured image, the plurality of viewpoint images, or the synthesized image and the viewpoint-related information in association with each other by the association unit to the another device.

15. The image-capturing apparatus according to claim 1, further comprising:
an image reconstruction processing unit configured to perform image reconstruction processing using the viewpoint-related information and the plurality of viewpoint images.

16. The image-capturing apparatus according to claim 1, further comprising:
a selector configured to select any of the captured image, the plurality of viewpoint images, or the synthesized image to be associated with the viewpoint-related information,
wherein the association unit associates the viewpoint-related information with an image selected by the selector among the captured image, the plurality of viewpoint images, and the synthesized image.

17. The image-capturing apparatus according to claim 1, further comprising:
an image-capturing circuitry configured to capture the subject's image through the plurality of monocular optical systems with the optical paths independent of each other to generate the captured image,
wherein the association unit associates the viewpoint-related information with the captured image generated by the image-capturing circuitry, the plurality of viewpoint images extracted from the captured image generated by the image-capturing circuitry, or the synthesized image obtained by synthesizing the plurality of viewpoint images extracted from the captured image generated by the image-capturing circuitry.

18. An information processing method comprising:
associating viewpoint-related information with a captured image generated by capturing an image of a subject with a single image sensor through a plurality of monocular optical systems with optical paths independent of each other, a plurality of viewpoint images extracted from the captured image and having each of the plurality of monocular optical systems as a viewpoint, or a synthesized image obtained by synthesizing the plurality of viewpoint images respectively corresponding to the plurality of monocular optical systems, wherein the viewpoint-related information is used to specify a region of the plurality of viewpoint images in the captured image; and
associating spotlight information with the captured image, the plurality of viewpoint images, or the synthesized image, the spotlight information being related to an image of spotlight formed in a region of the captured image that is not the plurality of viewpoint images.

19. A non-transitory computer readable medium storing a program that, when executed by a computer, causes the computer to perform a set of operations comprising:
associating viewpoint-related information with a captured image generated by capturing an image of a subject with a single image sensor through a plurality of monocular optical systems with optical paths independent of each other, a plurality of viewpoint images extracted from the captured image and having each of the plurality of monocular optical systems as a viewpoint, or a synthesized image obtained by synthesizing the plurality of viewpoint images respectively corresponding to the plurality of monocular optical systems, wherein the viewpoint-related information is used to specify a region of the plurality of viewpoint images in the captured image; and associating spotlight information with the captured image, the plurality of viewpoint images, or the synthesized image, the spotlight information being related to an image of spotlight formed in a region of the captured image that is not the plurality of viewpoint images.

20. An image-capturing apparatus comprising:

an association unit configured to associate viewpoint-related information with a captured image generated by capturing an image of a subject with a single image sensor through a plurality of monocular optical systems with optical paths independent of each other, a plurality of viewpoint images extracted from the captured image and having each of the plurality of monocular optical systems as a viewpoint, or a synthesized image obtained by synthesizing the plurality of viewpoint images respectively corresponding to the plurality of monocular optical systems, wherein the viewpoint-related information is used to specify a region of the plurality of viewpoint images in the captured image, and the association unit uses an image of spotlight formed in a region of the captured image that is not the plurality of viewpoint images to perform rotation correction on the captured image and associates the viewpoint-related information with the captured image subjected to the rotation correction, the plurality of viewpoint images extracted from the captured image subjected to the rotation correction, or the synthesized image obtained by synthesizing the plurality of viewpoint images extracted from the captured image subjected to the rotation correction.

21. An image-capturing apparatus comprising:

an association unit configured to associate viewpoint-related information with a captured image generated by capturing an image of a subject with a single image sensor through a plurality of monocular optical systems with optical paths independent of each other, a plurality of viewpoint images extracted from the captured image and having each of the plurality of monocular optical systems as a viewpoint, or a synthesized image obtained by synthesizing the plurality of viewpoint images respectively corresponding to the plurality of monocular optical systems, wherein the viewpoint-related information is used to specify a region of the plurality of viewpoint images in the captured image; and a selector configured to select any of the captured image, the plurality of viewpoint images, or the synthesized image to be associated with the viewpoint-related information, wherein the association unit associates the viewpoint-related information with an image selected by the selector among the captured image, the plurality of viewpoint images, and the synthesized image.

* * * * *